(12) United States Patent
Eidenschink et al.

(10) Patent No.: US 8,148,551 B2
(45) Date of Patent: Apr. 3, 2012

(54) TRICYCLIC AROMATICS AND LIQUID-CRYSTALLINE MEDIUM

(75) Inventors: Rudolf Eidenschink, Mainz (DE); Holger Kretzschmann, Ruemmelsheim (DE)

(73) Assignee: Merck Patent Gesellschaft MIT Beschraenkter Haftung, Darmstadt (DE)

( * ) Notice: Subject to any disclaimer, the term of this patent is extended or adjusted under 35 U.S.C. 154(b) by 857 days.

(21) Appl. No.: 12/162,188

(22) PCT Filed: Dec. 29, 2006

(86) PCT No.: PCT/EP2006/012593
§ 371 (c)(1),
(2), (4) Date: Jul. 25, 2008

(87) PCT Pub. No.: WO2007/085297
PCT Pub. Date: Aug. 2, 2007

(65) Prior Publication Data
US 2009/0131689 A1    May 21, 2009

(30) Foreign Application Priority Data
Jan. 28, 2006  (DE) .......................... 10 2006 004 059

(51) Int. Cl.
*C07C 69/75*   (2006.01)
*C07C 41/00*   (2006.01)
*C09K 19/52*   (2006.01)
*C09K 19/00*   (2006.01)

(52) U.S. Cl. ............ 549/280; 549/389; 549/390; 560/8; 560/102; 568/660; 568/661; 552/544; 252/299.62

(58) Field of Classification Search .................. 549/280, 549/389, 390; 560/8, 102; 568/660, 661; 552/544; 252/299.62
See application file for complete search history.

(56) References Cited

U.S. PATENT DOCUMENTS 6,515,163 B2 *   2/2003   Wingen et al. ..................... 560/8
7,067,179 B1 *   6/2006   Ogawa et al. ..................... 428/1.1

FOREIGN PATENT DOCUMENTS

| DE | 103 41 154 A1 | 3/2005 |
| EP | 1 162 185 A1 | 12/2001 |
| EP | 1 201 632 A1 | 5/2002 |

OTHER PUBLICATIONS

International Search Report completed Apr. 11, 2007 in International Patent Application No. PCT/EP2006/012593 filed Dec. 29, 2006.

* cited by examiner

*Primary Examiner* — Andrew D Kosar
*Assistant Examiner* — Raymond Covington
(74) *Attorney, Agent, or Firm* — Millen, White, Zelano & Branigan, P.C.

(57) ABSTRACT

The invention relates to tricyclic aromatics of the general formula I

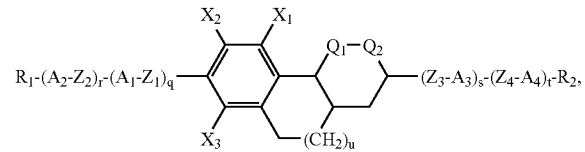

in which $A_1$, $A_2$, $A_3$, $A_4$, $Q_1$-$Q_2$, $R_1$, $R_2$, $X_1$, $X_2$, $X_3$, $Z_1$, $Z_2$, $Z_3$, $Z_4$, q, r, s, t and u have the meaning indicated, and to the use thereof as components of liquid-crystalline media and to an electro-optical display element containing same.

20 Claims, No Drawings

TRICYCLIC AROMATICS AND LIQUID-CRYSTALLINE MEDIUM

The present invention relates to tricyclic aromatics of the general formula I

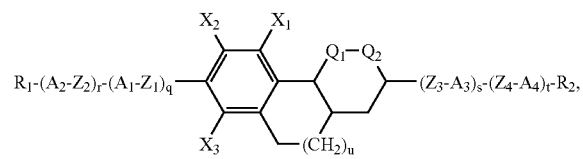

in which $A_1$, $A_2$, $A_3$, $A_4$ each, independently of one another, denote a 1,4-cyclohexylene, 1,4-cyclohexenylene or 1,4-cyclohexadienylene radical which is unsubstituted or substituted by one to four F atoms and in which, in each case independently of one another, one or two $CH_2$ groups may be replaced by —O— or —S— in such a way that heteroatoms are not linked directly to one another, a 1,4-phenylene radical, which may be substituted by one or two fluorine or chlorine atoms and in which, in addition, one or two CH groups may be replaced by N, or a 1,4-bicyclo[2.2.2]octylene radical or 2,6-spiro-[3.3]heptylene radical, $Q_1$-$Q_2$ denotes O—$CH_2$, $CH_2$—O, O—$CF_2$, $CF_2$—O, $CH_2$—$CH_2$, O—CO or CO—O, $R_1$, $R_2$ each, independently of one another, denote an alkyl radical having 1 to 12 C atoms which is unsubstituted or at least monosubstituted by halogen and in which one or more non-adjacent $CH_2$ groups may each, independently of one another, be replaced by —O—, —S— or —CO—, two adjacent $CH_2$ groups may each be replaced by —CH=CH—, —CF=CF—, —COO—, —OOC—, —C≡C— or a 1,2-cyclopropanylene radical or three adjacent $CH_2$ groups may be replaced by a 1,3-cyclobutanylene radical, or denote F, Cl, —$OCF_3$, —$OCHF_2$, —CN, —NCS or H, with the proviso that either only $R_1$ or only $R_2$ may be H, $X_1$, $X_2$, $X_3$ each, independently of one another, denote H, F or Cl, $Z_1$, $Z_2$, $Z_3$, $Z_4$ each, independently of one another, denote a single bond, —$CH_2CH_2$—, —$CH_2O$—, —$OCH_2$—, —$CH_2CF_2$—, —$CF_2CH_2$—, —$CF_2O$—, —$OCF_2$—, —COO—, —OOC—, —CH=CH—, —CF=CF—, —C≡C— and q, r, s, t, u each, independently of one another, denote 0 or 1, to the use thereof, and to a process for the preparation of compounds of the formula I.

The invention furthermore relates to a liquid-crystalline medium comprising at least one compound of the general formula I and to the use of a liquid-crystalline medium of this type in display elements, in particular in electro-optical display elements.

Some organic compounds are not converted directly from the crystalline state into the liquid state on warming, but instead pass through one or more additional phases within clearly limited temperature ranges. These phases have direction-dependent physical properties, but are mobile like liquids. The physical features of such phases (also referred to generally as liquid-crystalline media below), such as the nematic, cholesteric, smectic A or smectic C phase (cf. P. G. deGennes and J. Prost, The Physics of Liquid Crystals, Clarendon Press, Oxford 1993), are known. The molecular structure of such compounds, which are typical for use in electro-optics, is characterised by a rigid skeleton containing, for example, linked 1,4-phenylene or 1,4-cyclohexylene groups or also condensed ring systems, which is substituted by so-called mesogenic radicals, such as alkyl, alkoxy or cyano groups, at points as far away from one another as possible.

The liquid-crystalline media which are used in electro-optics consist of mixtures of such compounds, with compounds which do not have an enantiotropic transition from the crystalline phase to a liquid-crystalline phase also being used. In the case of the nematic phase, the optical and dielectric properties have to a first approximation, as is known, a linear dependence on the proportion of the mixture components. In general, the curves of the values for anisotropic-physical quantities for different compounds or mixtures of compounds are similar if they are plotted against the so-called reduced temperature $T_R$ ($T_R = T_M/T_C$, $T_M$ is the measured temperature, $T_C$ is the clearing temperature, i.e. the temperature of the transition from the nematic phase to the isotropic phase (all in K)). The contribution of a component to the anisotropic properties can therefore be determined by comparison at the same $T_R$.

In the display elements based on liquid-crystalline media (liquid-crystal displays), the change in an optical impression is, as is known, caused by application of an electric field to electrodes between which a liquid-crystalline medium is located. The well-known electro-optical display elements based on the principle of the twisted nematic cell (TNC) are particularly important. Interactions with the surfaces of the electrodes cause the molecules of a nematic phase to align in such a way that they adopt a helical arrangement. This rotates the polarisation plane of light passing through, so that the element appears transparent between two crossed polarisation foils. Application of a voltage to the electrodes causes the molecules to align perpendicularly. The prerequisite for this is a positive dielectric anisotropy ($\Delta\varepsilon > 0$). The known method of in-plane switching (IPS), in which the helical arrangement of the molecules can be converted into a parallel arrangement, enables particularly high-contrast images to be produced. Electro-optical display elements which manage without backlighting and with only one polarisation foil appear particularly advantageous. Reflective electro-optical display elements of this type having a high information density, low addressing voltage and a low dependence of the contrast on the viewing angle are described in Y. Itoh et al., SID 98 Digest, 221. In these, observance of an optimum value for the product of the optical anisotropy $\Delta n$ of the nematic phase and its layer thickness d is crucial for a low dependence of the contrast on the viewing angle. The quality of the images or alphanumeric information displayed is, as is known, better in the said applications the higher the specific electrical resistance of the liquid-crystalline medium. This applies in particular to the operation of active matrix displays. The ability of a driving element consisting of a thin-film transistor to maintain an electric voltage after the voltage source has been switched off is represented in general by the voltage holding ratio (VHR).

For applications outside closed spaces, which are becoming ever more important, liquid-crystalline media having particularly high clearing points are required. The electric addressing of the pixels can, as is known, be set up advantageously at low threshold voltages. These threshold voltages are determined by known methods, based on the so-called Frederiks threshold (measured in volts) for nematic phases where $\Delta\varepsilon > 0$ and on the so-called DAP (deformation of aligned phases) threshold for those where $\Delta\varepsilon < 0$. The number of possible image changes per time unit is dependent on the mobility of the molecules in a liquid-crystalline medium, which decreases rapidly as the temperature drops. For TNCs, the response time is directly dependent on the rotational viscosity of the liquid-crystalline medium, which in turn correlates with the values which can be measured in conventional capillary viscometers. Also known are electro-optical display elements which are based on the realignment of ferroelectric or antiferroelectric layers of smectic C phases. The known polymer dispersed liquid crystals (PDLCs) consist of droplets of liquid-crystalline media dispersed in a transparent polymer, which scatter the incident light as a function of an applied voltage. Electro-optical display elements which likewise do not require polarisation foils can be produced using liquid-crystalline media which have a negative dielectric anisotropy and comprise dichroic dyes.

Electro-optical display elements based on the modulation of polarised light in nematic liquid-crystalline media having negative dielectric anisotropy ($\Delta\epsilon<0$) in accordance with the VA (vertical alignment) technique have become particularly important recently.

The liquid-crystalline media used in the above-mentioned display elements have a number of disadvantages since the compounds used as mixture components are not sufficiently stable to light, the action of heat or in electric fields. In addition, the optical anisotropies required for good contrast can only be achieved with difficulty with them at the same time as favourable operating voltages and response times.

The known liquid-crystalline media exhibit properties which are still in need of improvement in electro-optical display elements. In particular, the achievable threshold voltages and the response times are still too high.

In particular, the invention was based on the object of providing a class of stable compounds which facilitate the production of electro-optical display elements having low threshold voltages and short response times.

Surprisingly, it has been found that the tricyclic aromatics of the general formula I are advantageously suitable as components of liquid-crystalline media. Stable liquid-crystalline media having particularly low threshold voltages and short response times which are eminently suitable for the above-mentioned applications can be prepared from them. Owing to their high VHR, the tricyclic compounds according to the invention are particularly suitable for the production of active matrix displays. They have high clearing temperatures and are particularly stable on exposure to light and at temperatures above 120° C. The compounds according to the invention generally broaden the range of liquid-crystalline substances for the preparation of advantageous liquid-crystalline media for various applications, in particular those mentioned above.

The tricyclic aromatics of the formula I according to the invention encompass the 1,2,3,4,4a,9,10,10a-octahydrophenanthrenes

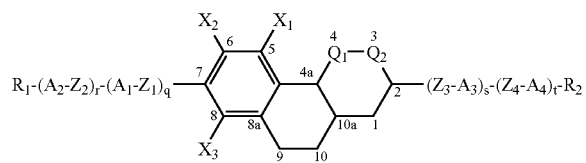

and the 2,3,4,4a,9,9a-hexahydro-1H-fluorenes

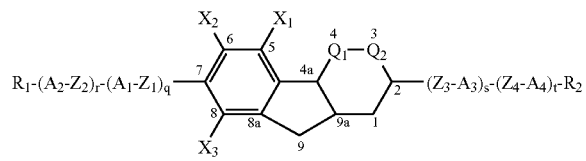

They each have 3 centres of chirality in positions 2, 4a and 10a or 2, 4a and 9a respectively of the tricyclic skeleton. Within the present invention, preference is given to the compounds having the configuration in which the H atoms in positions 4a and 10a or 4a and 9a respectively are in the trans-position to one another. Compounds of the formula I in which the H atoms in positions 2 and 4a are in the cis- or trans-position to one another are both suitable.

In the compounds of the formula I, $A_1$, $A_2$, $A_3$, $A_4$ each, independently of one another, preferably denote 1,4-phenylene radicals or 1,4-cyclohexylene radicals which are unsubstituted or substituted by one to two F atoms and in which one $CH_2$ group may in each case, independently of one another, be replaced by —O—, where the 1,4-cyclohexylene and 2,5-tetrahydropyranylene groups preferably have the trans configuration:

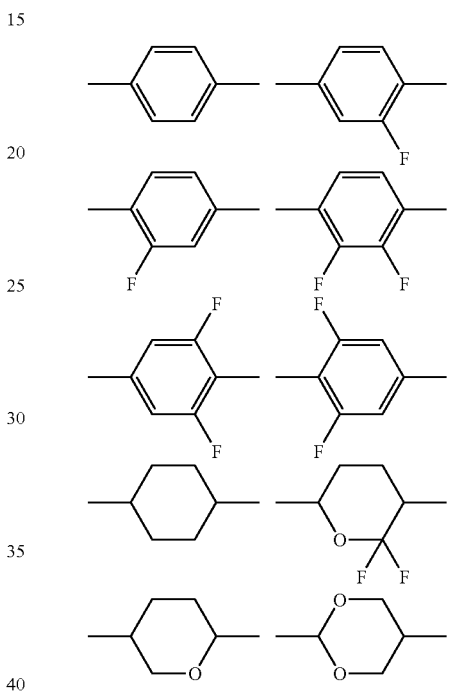

The alkyl radicals encompassed by the radicals $R_1$ and $R_2$ of the general formula I may be straight-chain or branched. They are preferably straight-chain and then denote methyl, ethyl, propyl, butyl, pentyl, hexyl, heptyl, octyl, nonyl, decyl, undecyl or dodecyl. If the double bonds of the alkenyl radicals likewise encompassed are not terminal, they preferably have the E configuration. The meanings of F and Cl for $R_1$ and $R_2$ are likewise preferred if these substituents are bonded to a phenyl radical.

$Q_1$-$Q_2$ preferably denotes O—$CH_2$, O—$CF_2$ or $CH_2CH_2$, where O—$CH_2$ and O—$CF_2$ are particularly preferred.

In formula I, $X_1$, $X_2$, $X_3$ each, independently of one another, denote H, F or Cl, preferably H or F. Particularly preferably, $X_1$ and/or $X_2$ are F and $X_3$ is hydrogen. Furthermore, $X_2$, $X_3$ are preferably F and $X_1$ is hydrogen. $Z_1$, $Z_2$, $Z_3$, $Z_4$ in the general formula I preferably each, independently of one another, denote a single bond, —$CH_2CH_2$—, —$OCF_2$— or —$CF_2O$—, of which the single bond is particularly preferred.

The indices q, r, s, t each, independently of one another, denote one or zero, so that formula I may contain zero to four radicals having the meaning $A_1$, $A_2$, $A_3$, $A_4$. Preference is given to compounds of the formula I in which the sum of q, r, s and t is equal to 1 or 2, i.e. one or two cyclic radicals having the meaning $A_1$, $A_2$, $A_3$, $A_4$ are present in addition to the skeleton of the tricyclic aromatic according to the invention.

Particular preference is given to compounds for which the sum of q and r is 1 or 2 and at the same time the sum of s and t is zero or 1. Independently thereof, the index u denotes one or zero. The meaning one is preferred.

The formula I also encompasses optically active compounds and racemates thereof. The former can be obtained by specific asymmetric syntheses or from the optically inactive compounds according to the invention by separation by column chromatography on a chiral support material, for example cyclodextrins. The optically active compounds of the formula I are particularly suitable for phases having ferroelectric and antiferroelectric properties and for the preparation of cholesteric phases. Compounds of the formula I in which the bonded elements have a distribution of their isotopes other than the natural distribution are also encompassed.

Preferred compounds of the general formula I are represented by the general sub-formulae Ia and Ib:

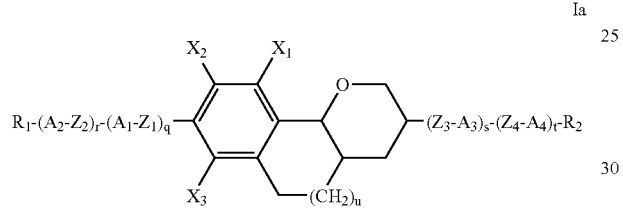

Ia

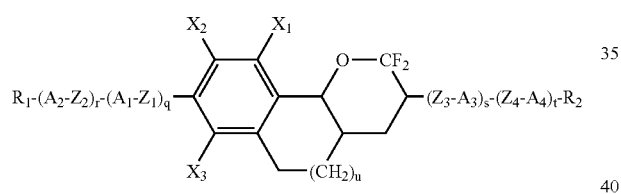

Ib

Some compounds of this type are shown below, where $R_1$ and $R_2$ have the meanings indicated.

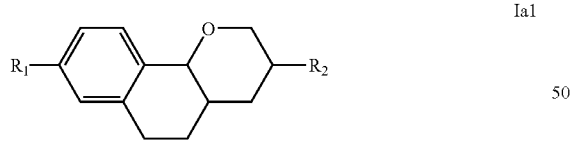

Ia1

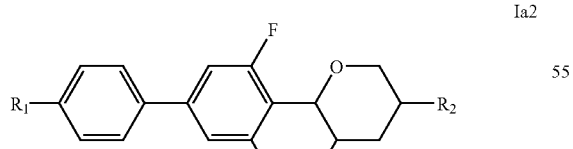

Ia2

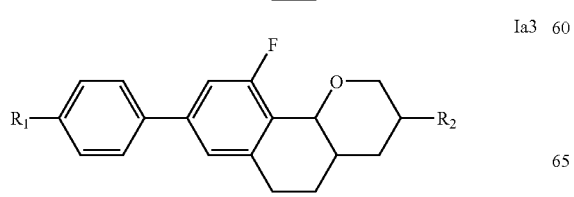

Ia3

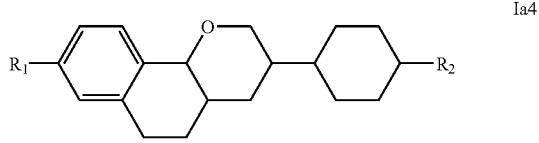

Ia4

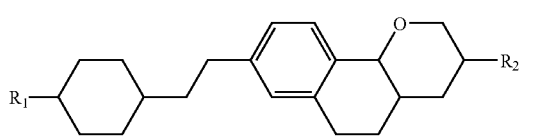

Ia5

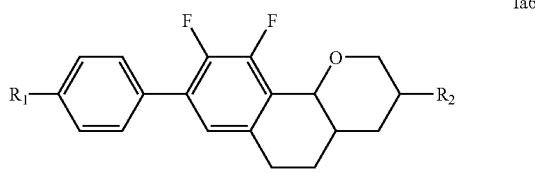

Ia6

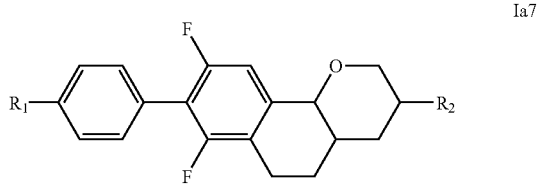

Ia7

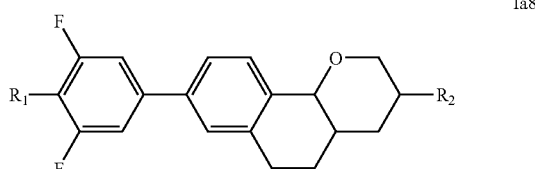

Ia8

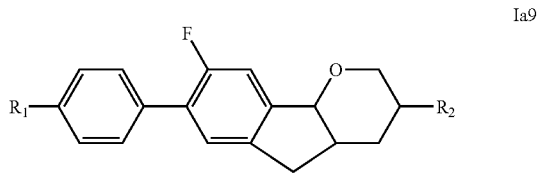

Ia9

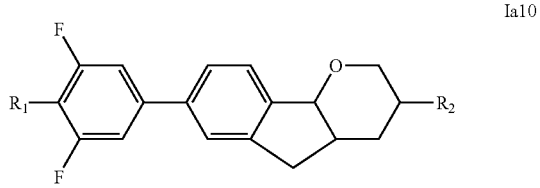

Ia10

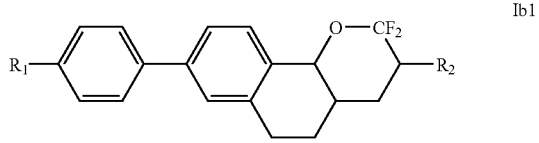

Ib1

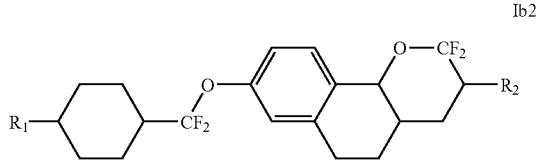

Ib2

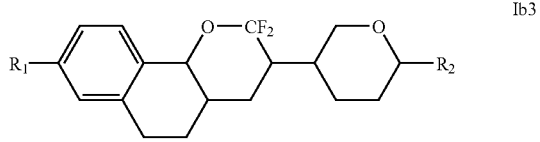

Ib3

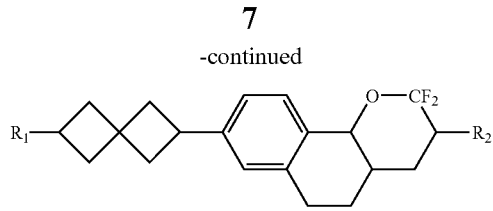

Ib4

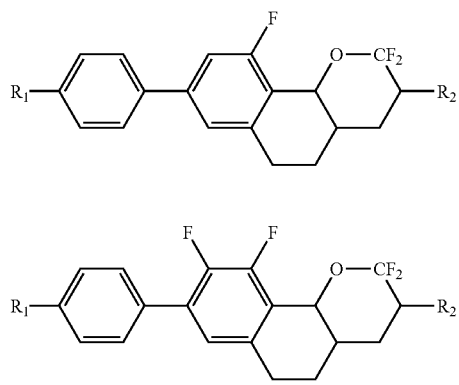

Ib5

Ib6

Ib7

Ib8

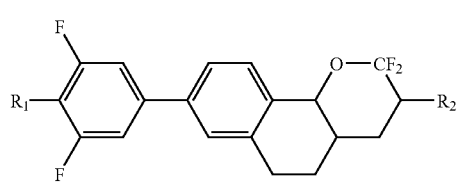

Ib9

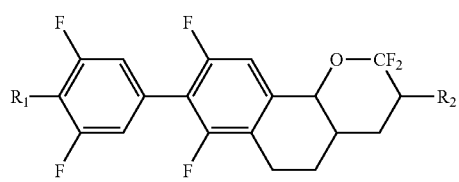

Ib10

The compounds of the general formula I are prepared by generally known methods. These are given, for example, in the compilation Houben-Weyl, Methoden der organischen Chemie [Methods of Organic Chemistry], Georg Thieme Verlag, Stuttgart, and other publications available to the person skilled in the art. The linking of a tricyclic aromatic of the formula

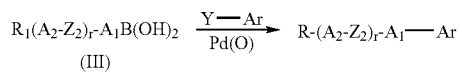
(II)

which is substituted in the 7-position by bromine or chlorine (labelled with Y here), abbreviated to Y—Ar, to a boronic acid of the formula III (synthesis scheme 1, $R_1$-$(A_2$-$Z_2)_r$-$A_1$-B(OH)$_2$ is a substituted phenylboronic acid) by a generally known transition-metal-catalysed Suzuki coupling is favourable. Halogen-metal exchange (for example bromine-lithium exchange) with subsequent addition onto a C=O bond likewise leads, after well-known subsequent reactions, to compounds of the general formula I (synthesis scheme 2):

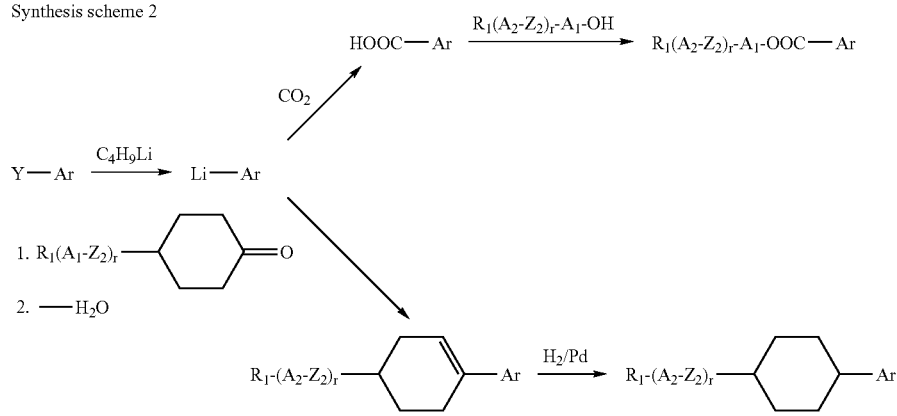

Synthesis scheme 3 shows by way of example a sequence of generally known synthesis steps to give compounds Y—Ar, from which compounds of the sub-formulae Ia and Ib according to the invention can be prepared. The enol acetate obtainable starting from a substituted 1-tetralone using isopropenyl acetate is converted into the tributyl stannane, which is converted into the 2-substituted 1-tetralone in a free-radical alkylation using bromoacetic acid esters initiated by azobisisobutyronitrile (cf. K. Miura et al., Organic Lett. 3, 2591 (2001)). After selective reduction of the oxo group using NaBH$_4$ in ethanol, the OH group formed is protected by reaction with benzyl bromide, a base and tetraethylammonium iodide (cf. S. Czernecki et al. Tetrahedron Lett. 3535 (1976)). The acid liberated after hydrolysis and acidification is converted in a known manner into the carboxylic acid chloride, which is converted into a carboxylic acid extended by one CH$_2$ group by the Arndt-Eistert method.

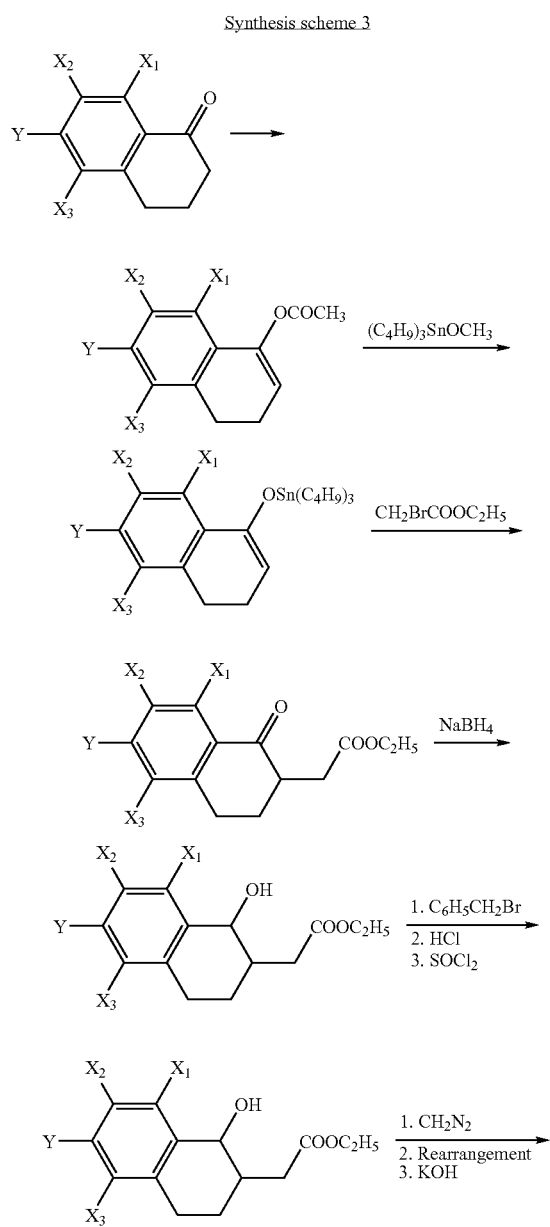

Synthesis scheme 3

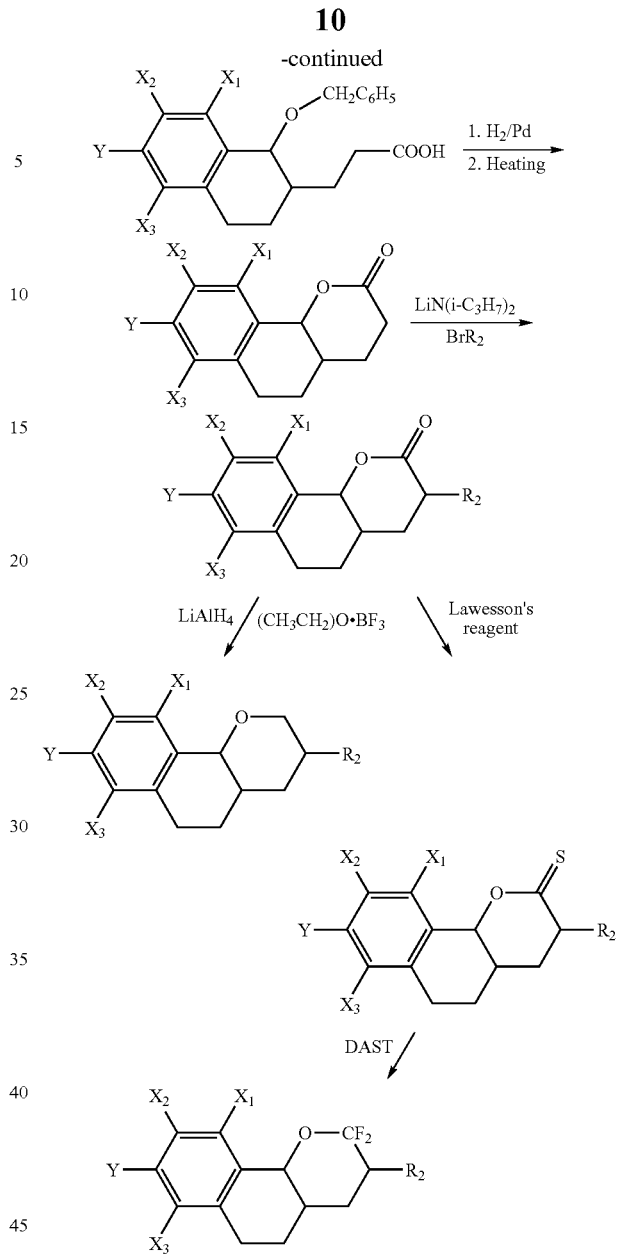

After removal of the benzyl group by hydrogenation (Pd catalysis), heating gives the σ-lactone. This is substituted in a generally known manner by reaction with lithium diisopropylamide and an alkyl or allyl bromide in tetrahydrofuran (for example W. F. Bailey et al., Tetrahedron Letters 31, 5093 (1990)). The α-substituted lactone can be converted, likewise in a generally known manner, into a compound of the general formula Ia by reduction using LiAlH$_4$ or NaBH$_4$ and BF$_3$ etherate or into a compound of the general formula Ib by reaction with Lawesson's reagent with subsequent conversion of the CS group into a CF$_2$ group using diethylaminosulfur trifluoride (DAST) (cf. S. Scheibye et al. Tetrahedron 35, 1339 (1979)). Compounds of the formulae Ia and Ib where u=0 can be obtained analogously starting from substituted 1-indanones. Some suitable 1-indanones are commercially available (for example from Sigma-Aldrich GmbH) or can be obtained starting from substituted benzenes using malonic anhydride, analogously to synthesis scheme 4 below.

Besides the substituent Y required for the coupling, the substituted 1-tetralones employed in synthesis scheme 3 may also already carry the substituent $R_1\text{-}(A_2\text{-}Z_2)_r(A_1\text{-}Z_1)_q\text{---}$. They can be prepared, for example, by a Friedel-Crafts acylation using succinic anhydride in dichloromethane, catalytic hydrogenation and a second acylation using the carboxylic acid chloride prepared using thionyl chloride, as shown in synthesis scheme 4.

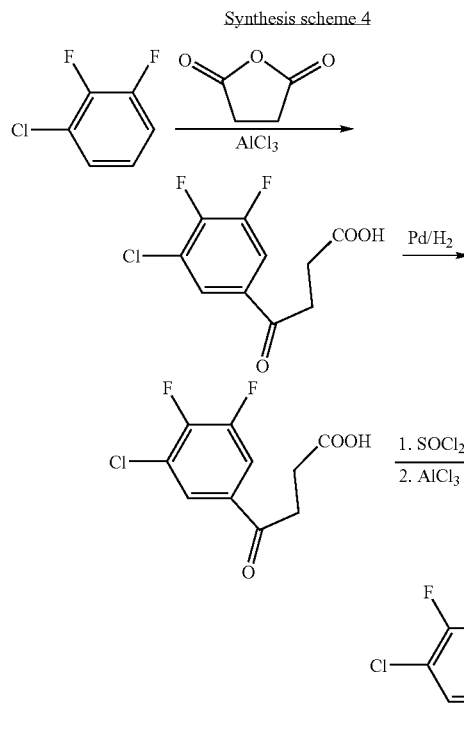

Compounds of the formula I in which $Q_1\text{-}Q_2$ denotes $CH_2$—$CH_2$ and u denotes one can be obtained by intramolecular cycloaddition of correspondingly substituted 1,3-dihydrobenzo[c]thiophene 2,2-dioxides by extrusion of $SO_2$, as shown by way of example in synthesis scheme 5 (cf. W. Oppolzer et al., Helv. Chim. Acta 62, 2017 (1979)).

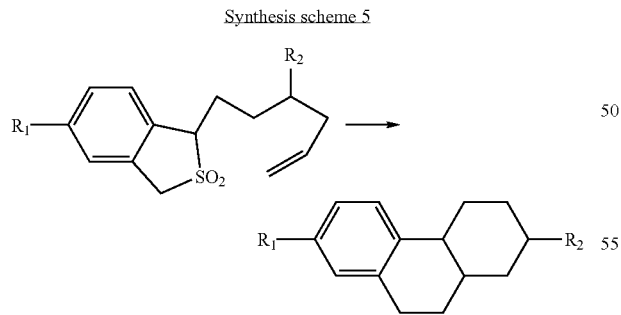

The liquid-crystalline medium likewise encompassed by the invention consists of at least two liquid-crystalline components and comprises as component at least one compound of the general formula I. It typically comprises one to five, preferably two to four, compounds of the formula I. Further mixture components of the liquid-crystalline medium according to the invention can be the generally known mesogenic compounds, i.e. compounds which are capable, in pure form or mixed with other components, of the formation of liquid-crystalline phases. Some compounds of this type are mentioned, for example, in DE 19804894. The most important are built up in accordance with the general formula IV $$U_1\text{---}(B_1\text{---}Y_1)_m\text{---}(B_2\text{---}Y_2)_n\text{---}B_3\text{---}U_2 \quad\quad IV$$

in which $B_1$ to $B_3$ each, independently of one another, denote unsubstituted or halogen- or CN-substituted 1,4-cyclohexylene radicals, in which one or two $CH_2$ groups may be replaced by —O—, 4-bicyclo[2.2.2]octylene radicals, 1,4-phenylene radicals and 2,5-pyrimidinylene radicals as well as 2,6-naphthalenylene, 1,2,3,4-tetrahydronaphthalen-2,4-ylene or indan-2,5-ylene radicals $U_1$, $U_2$, independently of one another, denote alkyl or alkenyl radicals having 1 to 12 C atoms which are unsubstituted or substituted by at least one halogen atom and in which one more non-adjacent $CH_2$ groups may be replaced by —O— or —S—, or denote —CN, —OCHF$_2$, —OCF$_3$, —SF$_5$, —F, —Cl, —OCH=CF$_2$, —N=C=S $Y_1$, $Y_2$, independently of one another, denote —$CH_2CH_2$—, —COO—, —CH=CH—, —OCF$_2$— or a single bond and m, n denote 0, 1 or 2.

Mention may be made by way of example of mixture components in which the alkyl groups mentioned are representative of alkyl groups having 1 to 12 C atoms, in which 1 or 2 $CH_2$ groups are replaced by —O— or —CH=CH—:

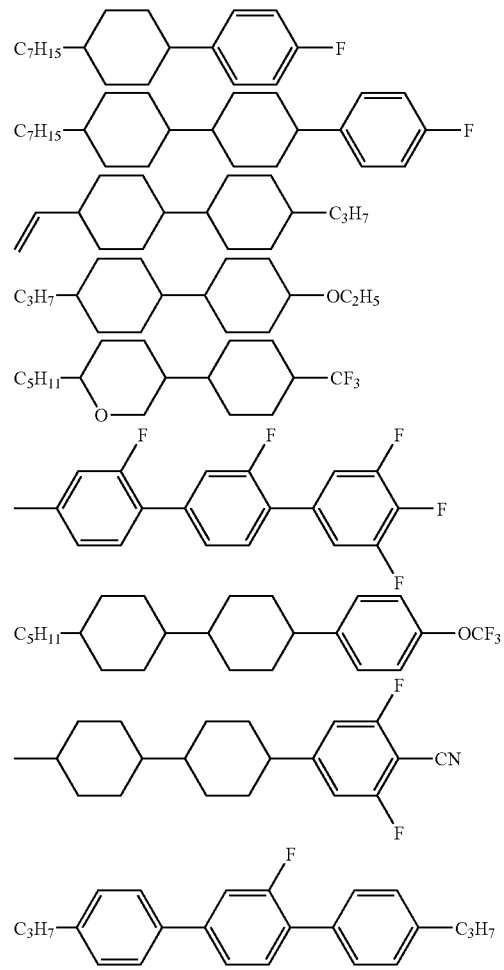

-continued

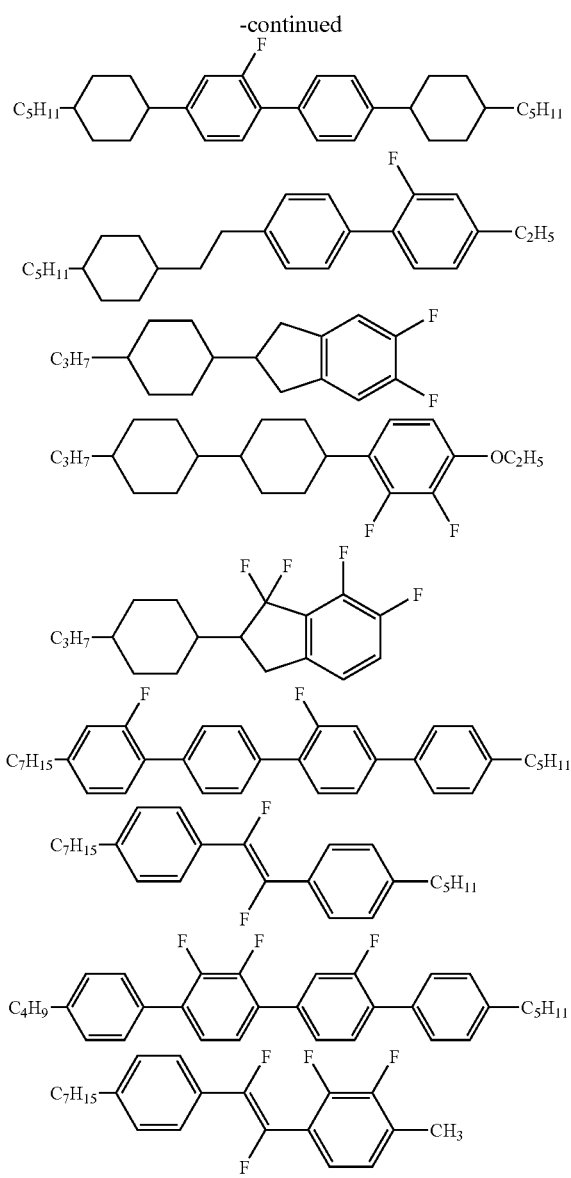

However, it is also possible to add further mixture components, such as dichroic dyes, chiral compounds which are not encompassed by the invention, conductive salts, nanoparticles and gel-forming polymers or amorphous solids, such as pyrogenic silicic acids. The addition of oxidation inhibitors is also possible.

The liquid-crystalline media according to the invention are prepared by warming the components together to 80° C. in a suitable glass vessel, mixing them by stirring and allowing the mixture to cool to room temperature. The proportion of the tricyclic aromatics of the general formula I in the liquid-crystalline medium according to the invention can be between 1 and 99 percent by weight. It is preferably between 10 and 90 percent by weight and particularly preferably between 15 and 50 percent by weight.

The following examples are intended to explain the invention without restricting it. All percentages denote percent by weight. The temperatures are indicated below in degrees Celsius. m.p. denotes melting point, h denotes hours, min denotes minutes. Cr denotes crystalline phase, Sm denotes smectic phase, Ne denotes nematic phase and Is denotes isotropic phase. The numbers between these symbols indicate the temperature at which a transition between the phases indicated takes place. IR stands for infrared spectrum, KBr means that the spectrum was recorded using a conventional potassium bromide disc. Unless indicated otherwise, the alkyl radicals are n-alkyl radicals.

EXAMPLES 1 AND 2

In accordance with synthesis scheme 3, 1 mol of known 6-chloro-1-tetralone is refluxed for 5 h together with 2 mol of isopropenyl acetate and 1 g of p-toluenesulfonic acid while the acetone formed is distilled off continuously. After cooling to room temperature, the excess isopropenyl acetate is distilled off, and the residue is shaken with 500 ml of tert-butyl methyl ether and 250 ml of water. The organic phase is dried using sodium sulfate and evaporated, and the residue is distilled under reduced pressure. The 6-chloro-3,4-dihydronaphthalen-1-yl acetate obtained in this way is stirred for 4 h at 100° C. together with an equimolar amount of methoxytributylstannane, during which the methyl acetate formed is continuously removed. The 6-chloro-3,4-dihydro-1-tributylstannyloxynaphthalene obtained after distillation under reduced pressure is dissolved in benzene together with the equivalent amount of ethyl bromoacetate and 0.25 times the molar amount of azobisisobutyronitrile, and the mixture is refluxed for 5 h. The residue obtained after removal by distillation is subjected to purification by column chromatography (silica gel 60 from Merck KGaA, Darmstadt, eluent toluene/isopropanol mixture, volume ratio 9:1). The 6-chloro-2-ethoxycarbonyl-1-tetralone obtained after removal of the solvent is stirred for 5 h at room temperature in ethanol with an excess of $NaBH_4$. Dilute hydrochloric acid is then carefully added. The 6-chloro-2-ethoxycarbonyl-1-hydroxytetralin formed is extracted with diethyl ether. After drying using sodium sulfate, the organic phase is evaporated. The residue is again subjected to separation by column chromatography (conditions as mentioned above). The form with trans H atoms in the 1,2-position which arises as the principal fraction is converted into the benzyl ether using benzyl bromide in tetrahydrofuran with addition of NaH and $(C_4H_9)_4NI$. After removal of the solvent, this benzyl ether is hydrolysed using alcoholic potassium hydroxide solution. After acidification using dilute hydrochloric acid, the carboxylic acid formed is purified by crystallisation from ethanol. After conversion into the carboxylic acid chloride using thionyl chloride, the diazomethyl ketone is prepared therefrom in a generally known manner by reaction with diazomethane. After addition of silver nitrate and ammonia, this diazomethyl ketone is rearranged to give the amide (Wolff rearrangement), which is hydrolysed using alcoholic potassium hydroxide solution. The carboxylic acid formed on acidification using dilute hydrochloric acid is filtered off with suction, dissolved in ethanol and hydrogenated after addition of catalyst (5% Pd on carbon). The σ-lactone is obtained by heating the reaction product obtained after removal of the catalyst by filtration and removal of the solvent by distillation to 100 to 140° C. This σ-lactone is allylated in tetrahydrofuran using lithium diisopropylamide and allyl bromide. 2-Allyl-7-chloro-4-oxa-1,2,3,4,4a,9,10,10a-octahydrophenanthrene is prepared therefrom in a generally known manner by reaction with $LiAlH_4$ and boron trifluoride etherate (cf. G. R. Pettit et al. J. Org. Chem. 26, 4773 (1961)). Hydrogenation in tetrahydrofuran and addition of palladium/carbon (5% Pd) under atmospheric pressure gives 7-chloro-4-oxa-2-propyl-1,2,3,4,4a,9,10,10a-octahydrophenanthrene.

EXAMPLE 3

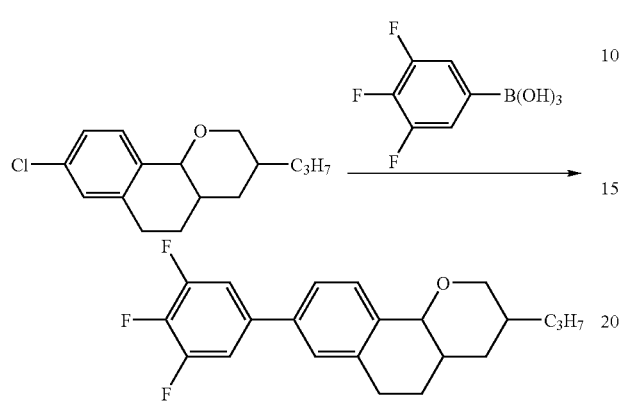

The 7-chloro-4-oxa-2-propyl-1,2,3,4,4a,9,10,10a-octahydrophenanthrene from Example 2 is subjected to a coupling reaction with known 3,4,5-trifluorophenylboronic acid in tetrahydrofuran in a generally known manner under the action of a Pd(0) catalyst—for example diisobutylaluminium hydride-reduced bis[tricyclohexylphosphine]palladium dichloride or one of the known so-called Buchwald catalysts. After removal of the solvent by distillation, the crude product is separated by column chromatography (stationary phase silica gel 60, eluent toluene). After removal of the eluent by distillation, the 4-oxa-2-propyl-7-(3,4,5-trifluorophenyl)-1,2,3,4,4a,9,-10,10a-octahydrophenanthrene present in the principal fraction is subjected to further purification by recrystallisation from ethanol. FI/FD-MS (m/e): 332 ($C_{20}H_{19}F_3O$).

EXAMPLES 4 TO 9

The following are likewise synthesised by generally known methods:

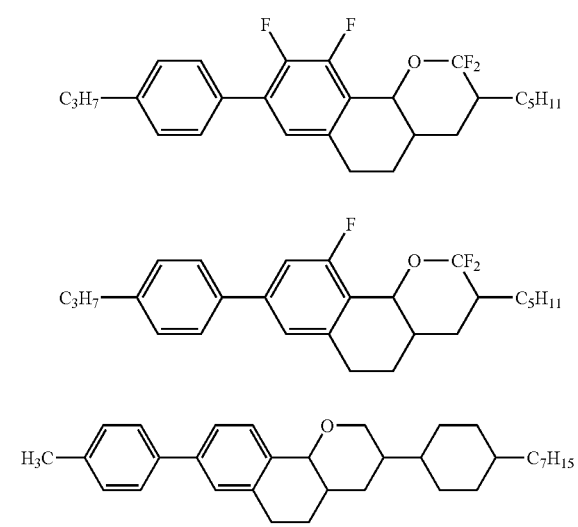

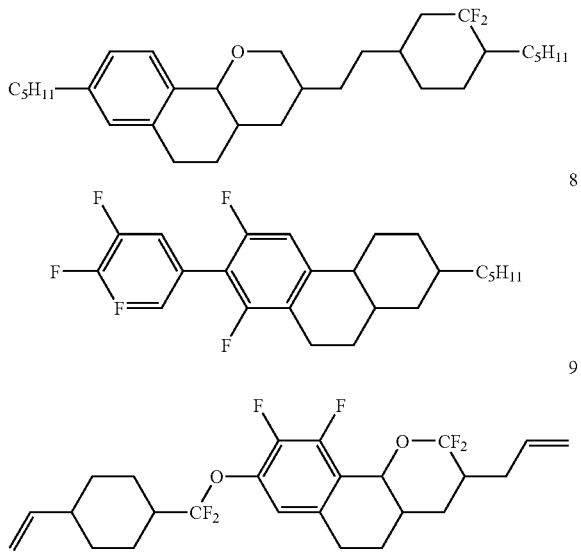

EXAMPLE 10

Methyl 2-(5,6-difluoro-1-oxoindan-2-ylmethyl)heptanoate

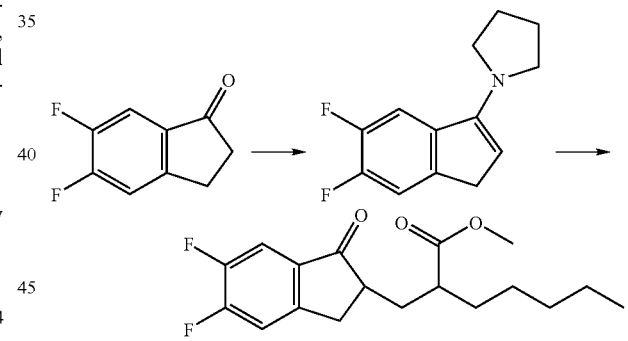

The precursor methyl 2-(5,6-difluoro-1-oxoindan-2-ylmethyl)heptanoate is prepared from known 5,6-difluorindan-1-one (S. Shimada et al., *Tetrahedron Letters* 2004, 45(8), 1741-1745) by the method of S. Muthusamy, *Bull Chem. Soc. Japan*, 2002, 75, 801-812 by Michael addition onto methyl 2-methyleneheptanoate (H. Stetter, H. Kuhlmann, *Synthesis* 1979, 29-30).

5,6-Difluoro-2-(2-hydroxymethylheptyl)indan-1-ol

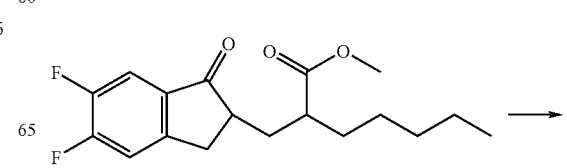

-continued

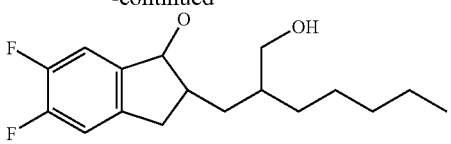

877 mg (23.1 mmol) of lithium aluminium hydride are initially introduced in 10 ml of THF, and a solution of 5.0 g (15.4 mmol) of methyl 2-(5,6-difluoro-1-oxoindan-2-ylmethyl)heptanoate in 20 ml of THF is added dropwise with ice-cooling. The cooling is removed, and the batch is left to stir at room temp. for 2 h and subsequently refluxed for 30 min. After hydrolysis using ice-water, the solution is acidified using conc. hydrochloric acid, and the aqueous phase is separated off and extracted three times with MTB ether. The combined organic phases are washed with water and dried over sodium sulfate. The solvent is removed in vacuo, giving 5,6-difluoro-2-(2-hydroxymethylheptyl)indan-1-ol as a colourless oil, which is sufficiently pure for further reaction.

7,8-Difluoro-3-pentyl-2,3,4,4a,5,9b-hexahydroindeno[1,2-b]pyran

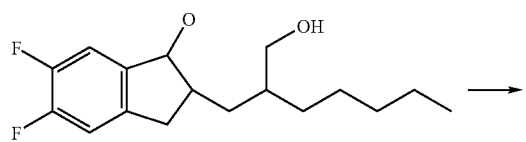

-continued

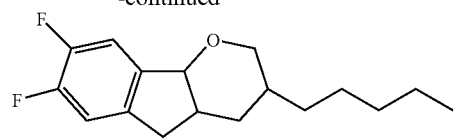

6.0 g (21.4 mmol) of 5,6-difluoro-2-(2-hydroxymethylheptyl)indan-1-ol are dissolved in 70 ml of dichloromethane and 10 ml of pyridine, and 9.5 g (50 mmol) of p-toluenesulfonyl chloride are added with ice-cooling. The cooling is removed, and the batch is left to stir at room temp. overnight. After addition of 100 ml of dichloromethane, the solution is washed three times with 2 N hydrochloric acid and once each with water and copper sulfate solution and dried over sodium sulfate. The solvent is removed in vacuo, giving an isomer mixture of 7,8-difluoro-3-pentyl-2,3,4,4a,5,9b-hexahydroindeno[1,2-b]pyran, which is separated by chromatography on silica gel (eluent heptane/toluene 5:1), giving the racemate of (3R*,4aS*,9bR*)-7,8-difluoro-2,3,4,4a,5,9b-hexahydro-3-pentylindeno[1,2-b]pyran and the enantiomer thereof as a colourless solid; $\Delta \epsilon = 13.4$; $\Delta n = 0.1021$.

Further Example Compounds

The compounds of the formula I indicated below in Table 1 are prepared analogously to Examples 1-10.

TABLE 1

Further example compounds of the formula I in which r = 0, q = 0 or 1, s = 0 or 1; t = 0

| $R^1$ | $A^1$ | $Z^1$ | Tricyclic radical | $Z^3$ | $A^3$ | $R^2$ |
|---|---|---|---|---|---|---|
| $CH_3$ | F,F-phenyl | | benzo-fused pyran tricyclic | | | $C_3H_7$ |
| $CH_3$ | F,F-phenyl | | benzo-fused pyran tricyclic | | | $C_5H_{11}$ |
| $CH_3$ | F,F-phenyl | | benzo-fused pyran tricyclic | | | $CH_2\!=\!CH-$ |
| $C_3H_7$ | F,F-phenyl | | benzo-fused pyran tricyclic | | | $C_3H_7$ |
| $C_3H_7$ | F,F-phenyl | | benzo-fused pyran tricyclic | | | $C_5H_{11}$ |

TABLE 1-continued
Further example compounds of the formula I in which r = 0, q = 0 or 1, s = 0 or 1; t = 0
| R¹ | A¹ | Z¹ | Tricyclic radical | Z³ | A³ | R² |
|---|---|---|---|---|---|---|
| C₃H₇ | 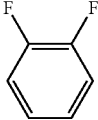 | | 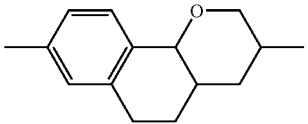 | | | CH₂=CH— |
| CH₃O | 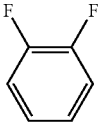 | | 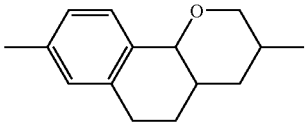 | | | C₃H₇ |
| CH₃O |  | | 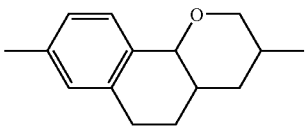 | | | C₅H₁₁ |
| CH₃O |  | | 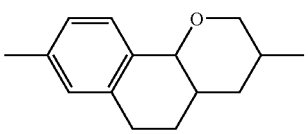 | | | CH₂=CH— |
| C₂H₅O |  | | 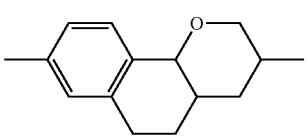 | | | C₃H₇ |
| C₂H₅O |  | | 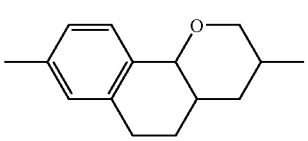 | | | C₅H₁₁ |
| C₂H₅O |  | | 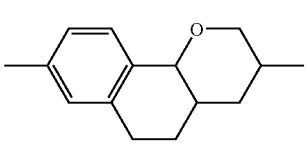 | | | CH₂=CH— |
| CH₃ |  | | 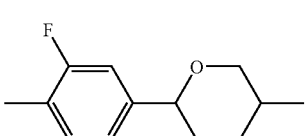 | | | C₃H₇ |
| CH₃ | 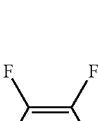 | | 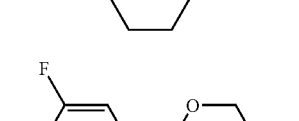 | | | C₅H₁₁ |
| CH₃ | 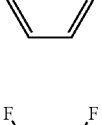 | | 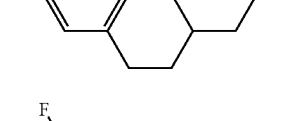 | | | CH₂=CH— |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| $C_3H_7$ | 3,4-difluorophenyl | | fluoro-benzochromane | | | $C_3H_7$ |
| $C_3H_7$ | 3,4-difluorophenyl | | fluoro-benzochromane | | | $C_5H_{11}$ |
| $C_3H_7$ | 3,4-difluorophenyl | | fluoro-benzochromane | | | $CH_2$=CH— |
| $CH_3O$ | 3,4-difluorophenyl | | fluoro-benzochromane | | | $C_3H_7$ |
| $CH_3O$ | 3,4-difluorophenyl | | fluoro-benzochromane | | | $C_5H_{11}$ |
| $CH_3O$ | 3,4-difluorophenyl | | fluoro-benzochromane | | | $CH_2$=CH— |
| $C_2H_5O$ | 3,4-difluorophenyl | | fluoro-benzochromane | | | $C_3H_7$ |
| $C_2H_5O$ | 3,4-difluorophenyl | | fluoro-benzochromane | | | $C_5H_{11}$ |

TABLE 1-continued
Further example compounds of the formula I in which r = 0, q = 0 or 1, s = 0 or 1; t = 0
| R¹ | A¹ | Z¹ | Tricyclic radical | Z³ | A³ | R² |
|---|---|---|---|---|---|---|
| $C_2H_5O$ | 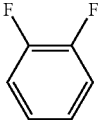 | | 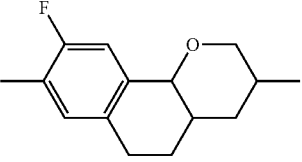 | | | $CH_2{=}CH-$ |
| $CH_3$ | 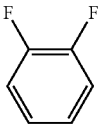 | | 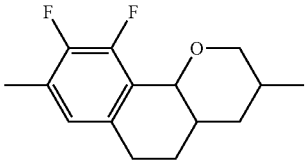 | | | $C_3H_7$ |
| $CH_3$ | 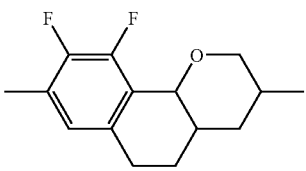 | | 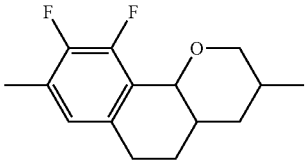 | | | $C_5H_{11}$ |
| $CH_3$ | 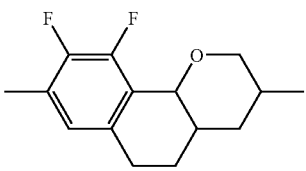 | | 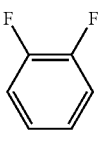 | | | $CH_2{=}CH-$ |
| $C_3H_7$ |  | | 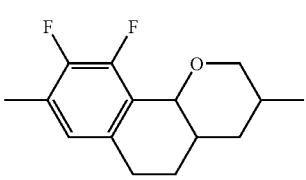 | | | $C_3H_7$ |
| $C_3H_7$ | 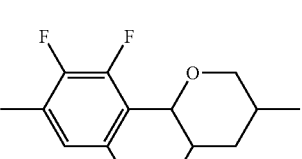 | | 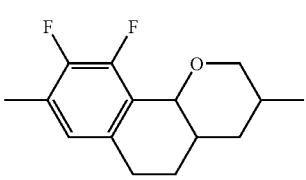 | | | $C_5H_{11}$ |
| $C_3H_7$ | 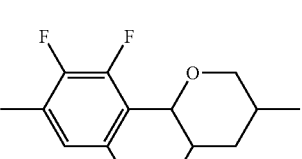 | |  | | | $CH_2{=}CH-$ |
| $CH_3O$ | 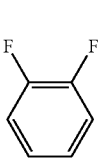 | | 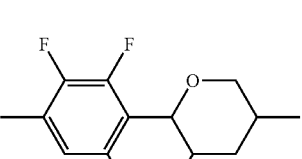 | | | $C_3H_7$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CH₃O | 3,4-difluorophenyl | | difluoro chromene-tetrahydronaphthalene | | | C₅H₁₁ |
| CH₃O | 3,4-difluorophenyl | | difluoro chromene-tetrahydronaphthalene | | | CH₂=CH— |
| C₂H₅O | 3,4-difluorophenyl | | difluoro chromene-tetrahydronaphthalene | | | C₃H₇ |
| C₂H₅O | 3,4-difluorophenyl | | difluoro chromene-tetrahydronaphthalene | | | C₅H₁₁ |
| C₂H₅O | 3,4-difluorophenyl | | difluoro chromene-tetrahydronaphthalene | | | CH₂=CH— |
| CH₃ | 3,4-difluorophenyl | | indane-pyran | | | C₃H₇ |
| CH₃ | 3,4-difluorophenyl | | indane-pyran | | | C₅H₁₁ |
| CH₃ | 3,4-difluorophenyl | | indane-pyran | | | CH₂=CH— |
| C₃H₇ | 3,4-difluorophenyl | | indane-pyran | | | C₃H₇ |

TABLE 1-continued
Further example compounds of the formula I in which r = 0, q = 0 or 1, s = 0 or 1; t = 0
| R¹ | A¹ | Z¹ | Tricyclic radical | Z³ | A³ | R² |
|---|---|---|---|---|---|---|
| C₃H₇ | 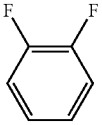 | | 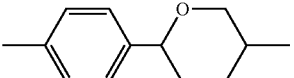 | | | C₅H₁₁ |
| C₃H₇ | 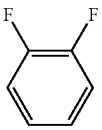 | | 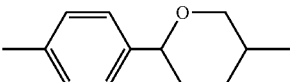 | | | CH₂=CH— |
| CH₃O |  | | 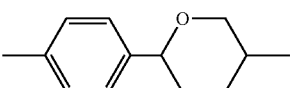 | | | C₃H₇ |
| CH₃O | 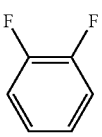 | | 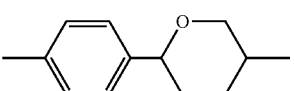 | | | C₅H₁₁ |
| CH₃O | 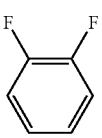 | | 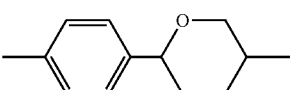 | | | CH₂=CH— |
| C₂H₅O |  | | 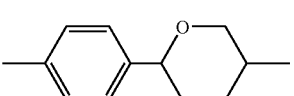 | | | C₃H₇ |
| C₂H₅O |  | | 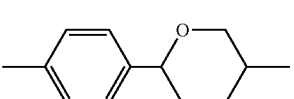 | | | C₅H₁₁ |
| C₂H₅O |  | | 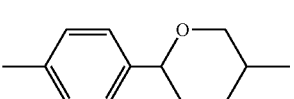 | | | CH₂=CH— |
| CH₃ | 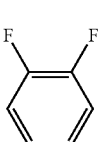 | | 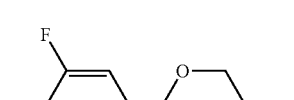 | | | C₃H₇ |
| CH₃ | 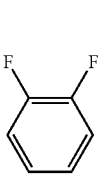 | | 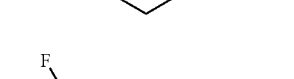 | | | C₅H₁₁ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CH₃ | difluorophenyl | | fluoro-tricyclic | | | CH₂=CH— |
| C₃H₇ | difluorophenyl | | fluoro-tricyclic | | | C₃H₇ |
| C₃H₇ | difluorophenyl | | fluoro-tricyclic | | | C₅H₁₁ |
| C₃H₇ | difluorophenyl | | fluoro-tricyclic | | | CH₂=CH— |
| CH₃O | difluorophenyl | | fluoro-tricyclic | | | C₃H₇ |
| CH₃O | difluorophenyl | | fluoro-tricyclic | | | C₅H₁₁ |
| CH₃O | difluorophenyl | | fluoro-tricyclic | | | CH₂=CH— |
| C₂H₅O | difluorophenyl | | fluoro-tricyclic | | | C₃H₇ |
| C₂H₅O | difluorophenyl | | fluoro-tricyclic | | | C₅H₁₁ |

TABLE 1-continued
Further example compounds of the formula I in which r = 0, q = 0 or 1, s = 0 or 1; t = 0
| R¹ | A¹ | Z¹ | Tricyclic radical | Z³ | A³ | R² |
|---|---|---|---|---|---|---|
| C₂H₅O | 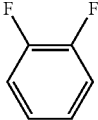 | | 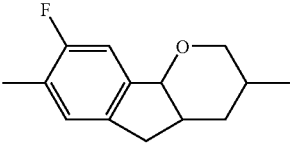 | | | CH₂=CH— |
| CH₃ | 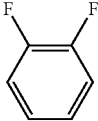 | | 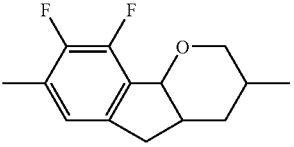 | | | C₃H₇ |
| CH₃ | 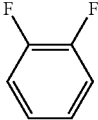 | | 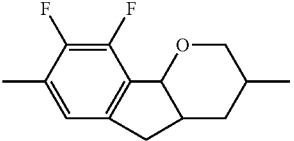 | | | C₅H₁₁ |
| CH₃ | 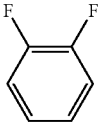 | | 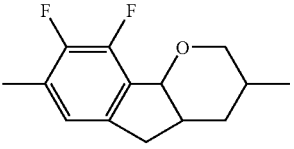 | | | CH₂=CH— |
| C₃H₇ |  | | 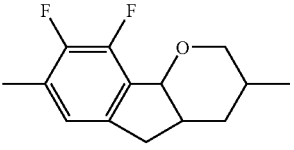 | | | C₃H₇ |
| C₃H₇ |  | | 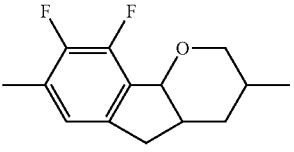 | | | C₅H₁₁ |
| C₃H₇ | 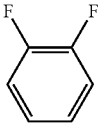 | | 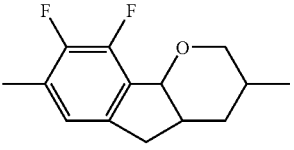 | | | CH₂=CH— |
| CH₃O |  | | 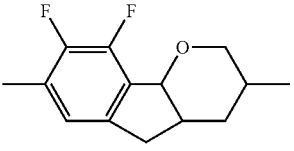 | | | C₃H₇ |
| CH₃O |  | | 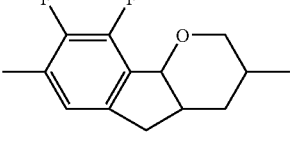 | | | C₅H₁₁ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CH₃O | difluorophenyl | | difluoro tricyclic chromene | | | CH₂=CH— |
| C₂H₅O | difluorophenyl | | difluoro tricyclic chromene | | | C₃H₇ |
| C₂H₅O | difluorophenyl | | difluoro tricyclic chromene | | | C₅H₁₁ |
| C₂H₅O | difluorophenyl | | difluoro tricyclic chromene | | | CH₂=CH— |
| F | | | tricyclic chromene | | | C₃H₇ |
| F | | | tricyclic chromene | | | C₅H₁₁ |
| F | | | tricyclic chromene | | | CH₂=CH— |
| Cl | | | tricyclic chromene | | | C₃H₇ |
| Cl | | | tricyclic chromene | | | C₅H₁₁ |
| Cl | | | tricyclic chromene | | | CH₂=CH— |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CF₃ | | | (tricyclic structure) | | | C₃H₇ |
| CF₃ | | | (tricyclic structure) | | | C₅H₁₁ |
| CF₃ | | | (tricyclic structure) | | | CH₂=CH— |
| OCF₂H | | | (tricyclic structure) | | | C₃H₇ |
| OCF₂H | | | (tricyclic structure) | | | C₅H₁₁ |
| OCF₂H | | | (tricyclic structure) | | | CH₂=CH— |
| OCF₃ | | | (tricyclic structure) | | | C₃H₇ |
| OCF₃ | | | (tricyclic structure) | | | C₅H₁₁ |
| OCF₃ | | | (tricyclic structure) | | | CH₂=CH— |
| CN | | | (tricyclic structure) | | | C₃H₇ |
| CN | | | (tricyclic structure) | | | C₅H₁₁ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CN | | | | | | CH$_2$=CH— |
| F | | | | | | C$_3$H$_7$ |
| F | | | | | | C$_5$H$_{11}$ |
| F | | | | | | CH$_2$=CH— |
| Cl | | | | | | C$_3$H$_7$ |
| Cl | | | | | | C$_5$H$_{11}$ |
| Cl | | | | | | CH$_2$=CH— |
| CF$_3$ | | | | | | C$_3$H$_7$ |
| CF$_3$ | | | | | | C$_5$H$_{11}$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| $CF_3$ | | | (F-substituted tricyclic) | | | $CH_2=CH-$ |
| $OCF_2H$ | | | (F-substituted tricyclic) | | | $C_3H_7$ |
| $OCF_2H$ | | | (F-substituted tricyclic) | | | $C_5H_{11}$ |
| $OCF_2H$ | | | (F-substituted tricyclic) | | | $CH_2=CH-$ |
| $OCF_3$ | | | (F-substituted tricyclic) | | | $C_3H_7$ |
| $OCF_3$ | | | (F-substituted tricyclic) | | | $C_5H_{11}$ |
| $OCF_3$ | | | (F-substituted tricyclic) | | | $CH_2=CH-$ |
| $CN$ | | | (F-substituted tricyclic) | | | $C_3H_7$ |

TABLE 1-continued
Further example compounds of the formula I in which r = 0, q = 0 or 1, s = 0 or 1; t = 0
| R¹ | A¹ | Z¹ | Tricyclic radical | Z³ | A³ | R² |
|---|---|---|---|---|---|---|
| CN | | | 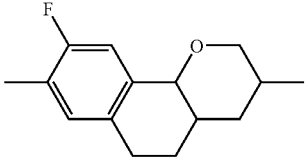 | | | $C_5H_{11}$ |
| CN | | | 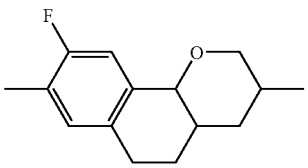 | | | $CH_2{=}CH{-}$ |
| F | | | 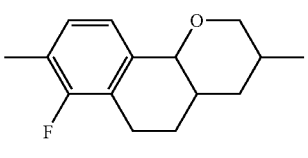 | | | $C_3H_7$ |
| F | | | 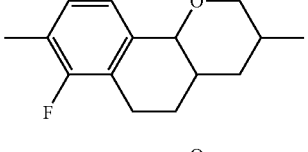 | | | $C_5H_{11}$ |
| F | | | 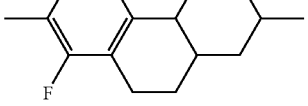 | | | $CH_2{=}CH{-}$ |
| Cl | | | 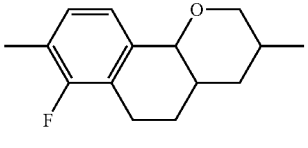 | | | $C_3H_7$ |
| Cl | | | 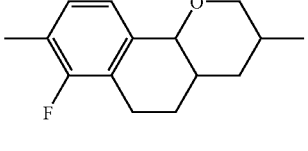 | | | $C_5H_{11}$ |
| Cl | | | 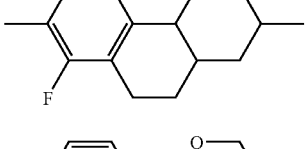 | | | $CH_2{=}CH{-}$ |
| $CF_3$ | | | 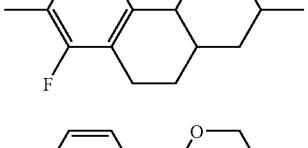 | | | $C_3H_7$ |
| $CF_3$ | | | 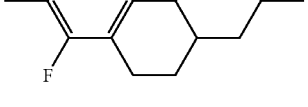 | | | $C_5H_{11}$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CF₃ | | | | | | CH₂=CH— |
| OCF₂H | | | | | | C₃H₇ |
| OCF₂H | | | | | | C₅H₁₁ |
| OCF₂H | | | | | | CH₂=CH— |
| OCF₃ | | | | | | C₃H₇ |
| OCF₃ | | | | | | C₅H₁₁ |
| OCF₃ | | | | | | CH₂=CH— |
| CN | | | | | | C₃H₇ |
| CN | | | | | | C₅H₁₁ |
| CN | | | | | | CH₂=CH— |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| F | | | | | | $C_3H_7$ |
| F | | | | | | $C_5H_{11}$ |
| F | | | | | | $CH_2$=CH— |
| Cl | | | | | | $C_3H_7$ |
| Cl | | | | | | $C_5H_{11}$ |
| Cl | | | | | | $CH_2$=CH— |
| $CF_3$ | | | | | | $C_3H_7$ |
| $CF_3$ | | | | | | $C_5H_{11}$ |

TABLE 1-continued
Further example compounds of the formula I in which r = 0, q = 0 or 1, s = 0 or 1; t = 0
| R¹ | A¹ | Z¹ | Tricyclic radical | Z³ | A³ | R² |
|---|---|---|---|---|---|---|
| CF₃ | | | 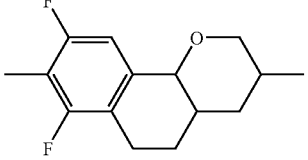 | | | CH₂=CH— |
| OCF₂H | | | 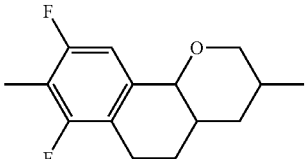 | | | C₃H₇ |
| OCF₂H | | | 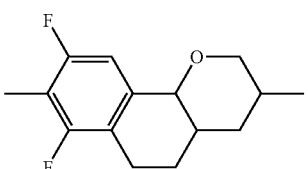 | | | C₅H₁₁ |
| OCF₂H | | | 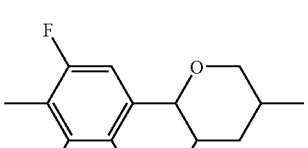 | | | CH₂=CH— |
| OCF₃ | | | 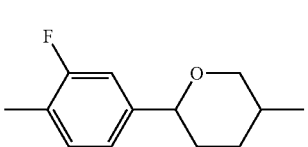 | | | C₃H₇ |
| OCF₃ | | | 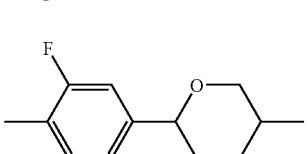 | | | C₅H₁₁ |
| OCF₃ | | | 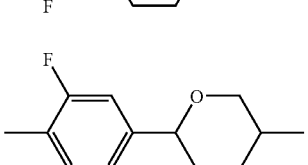 | | | CH₂=CH— |
| CN | | | 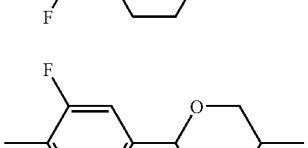 | | | C₃H₇ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CN | | | | | | C₅H₁₁ |
| CN | | | | | | CH₂=CH— |
| F | | | | | | C₃H₇ |
| F | | | | | | C₅H₁₁ |
| F | | | | | | CH₂=CH— |
| Cl | | | | | | C₃H₇ |
| Cl | | | | | | C₅H₁₁ |
| Cl | | | | | | CH₂=CH— |
| CF₃ | | | | | | C₃H₇ |
| CF₃ | | | | | | C₅H₁₁ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CF₃ | 2-F-phenyl | | chromane-naphthalene tricyclic | | | CH₂=CH— |
| OCF₂H | 2-F-phenyl | | chromane-naphthalene tricyclic | | | C₃H₇ |
| OCF₂H | 2-F-phenyl | | chromane-naphthalene tricyclic | | | C₅H₁₁ |
| OCF₂H | 2-F-phenyl | | chromane-naphthalene tricyclic | | | CH₂=CH— |
| OCF₃ | 2-F-phenyl | | chromane-naphthalene tricyclic | | | C₃H₇ |
| OCF₃ | 2-F-phenyl | | chromane-naphthalene tricyclic | | | C₅H₁₁ |
| OCF₃ | 2-F-phenyl | | chromane-naphthalene tricyclic | | | CH₂=CH— |
| CN | 2-F-phenyl | | chromane-naphthalene tricyclic | | | C₃H₇ |
| CN | 2-F-phenyl | | chromane-naphthalene tricyclic | | | C₅H₁₁ |
| CN | 2-F-phenyl | | chromane-naphthalene tricyclic | | | CH₂=CH— |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| F | F-phenyl | | F-tricyclic | | | $C_3H_7$ |
| F | F-phenyl | | F-tricyclic | | | $C_5H_{11}$ |
| F | F-phenyl | | F-tricyclic | | | $CH_2\!=\!CH\!-\!$ |
| Cl | F-phenyl | | F-tricyclic | | | $C_3H_7$ |
| Cl | F-phenyl | | F-tricyclic | | | $C_5H_{11}$ |
| Cl | F-phenyl | | F-tricyclic | | | $CH_2\!=\!CH\!-\!$ |
| $CF_3$ | F-phenyl | | F-tricyclic | | | $C_3H_7$ |
| $CF_3$ | F-phenyl | | F-tricyclic | | | $C_5H_{11}$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| $CF_3$ | 3-F-phenylene | | fluoro-chromene-tricyclic | | | $CH_2=CH-$ |
| $OCF_2H$ | 3-F-phenylene | | fluoro-chromene-tricyclic | | | $C_3H_7$ |
| $OCF_2H$ | 3-F-phenylene | | fluoro-chromene-tricyclic | | | $C_5H_{11}$ |
| $OCF_2H$ | 3-F-phenylene | | fluoro-chromene-tricyclic | | | $CH_2=CH-$ |
| $OCF_3$ | 3-F-phenylene | | fluoro-chromene-tricyclic | | | $C_3H_7$ |
| $OCF_3$ | 3-F-phenylene | | fluoro-chromene-tricyclic | | | $C_5H_{11}$ |
| $OCF_3$ | 3-F-phenylene | | fluoro-chromene-tricyclic | | | $CH_2=CH-$ |
| $CN$ | 3-F-phenylene | | fluoro-chromene-tricyclic | | | $C_3H_7$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CN | 2-F-phenylene | | fluoro-chromene-tetrahydronaphthalene | | | $C_5H_{11}$ |
| CN | 2-F-phenylene | | fluoro-chromene-tetrahydronaphthalene | | | $CH_2{=}CH{-}$ |
| F | 2-F-phenylene | | difluoro-chromene-tetrahydronaphthalene | | | $C_3H_7$ |
| F | 2-F-phenylene | | difluoro-chromene-tetrahydronaphthalene | | | $C_5H_{11}$ |
| F | 2-F-phenylene | | difluoro-chromene-tetrahydronaphthalene | | | $CH_2{=}CH{-}$ |
| Cl | 2-F-phenylene | | difluoro-chromene-tetrahydronaphthalene | | | $C_3H_7$ |
| Cl | 2-F-phenylene | | difluoro-chromene-tetrahydronaphthalene | | | $C_5H_{11}$ |
| Cl | 2-F-phenylene | | difluoro-chromene-tetrahydronaphthalene | | | $CH_2{=}CH{-}$ |
| $CF_3$ | 2-F-phenylene | | difluoro-chromene-tetrahydronaphthalene | | | $C_3H_7$ |
| $CF_3$ | 2-F-phenylene | | difluoro-chromene-tetrahydronaphthalene | | | $C_5H_{11}$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| $CF_3$ | 2-F-phenylene | | fluoro-chromene-tetrahydronaphthalene tricycle | | | $CH_2=CH-$ |
| $OCF_2H$ | 2-F-phenylene | | fluoro-chromene-tetrahydronaphthalene tricycle | | | $C_3H_7$ |
| $OCF_2H$ | 2-F-phenylene | | fluoro-chromene-tetrahydronaphthalene tricycle | | | $C_5H_{11}$ |
| $OCF_2H$ | 2-F-phenylene | | fluoro-chromene-tetrahydronaphthalene tricycle | | | $CH_2=CH-$ |
| $OCF_3$ | 2-F-phenylene | | fluoro-chromene-tetrahydronaphthalene tricycle | | | $C_3H_7$ |
| $OCF_3$ | 2-F-phenylene | | fluoro-chromene-tetrahydronaphthalene tricycle | | | $C_5H_{11}$ |
| $OCF_3$ | 2-F-phenylene | | fluoro-chromene-tetrahydronaphthalene tricycle | | | $CH_2=CH-$ |
| $CN$ | 2-F-phenylene | | fluoro-chromene-tetrahydronaphthalene tricycle | | | $C_3H_7$ |
| $CN$ | 2-F-phenylene | | fluoro-chromene-tetrahydronaphthalene tricycle | | | $C_5H_{11}$ |
| $CN$ | 2-F-phenylene | | fluoro-chromene-tetrahydronaphthalene tricycle | | | $CH_2=CH-$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| F | 2-F-phenylene | | difluoro-methyl-chromane tricyclic | | | $C_3H_7$ |
| F | 2-F-phenylene | | difluoro-methyl-chromane tricyclic | | | $C_5H_{11}$ |
| F | 2-F-phenylene | | difluoro-methyl-chromane tricyclic | | | $CH_2=CH-$ |
| Cl | 2-F-phenylene | | difluoro-methyl-chromane tricyclic | | | $C_3H_7$ |
| Cl | 2-F-phenylene | | difluoro-methyl-chromane tricyclic | | | $C_5H_{11}$ |
| Cl | 2-F-phenylene | | difluoro-methyl-chromane tricyclic | | | $CH_2=CH-$ |
| $CF_3$ | 2-F-phenylene | | difluoro-methyl-chromane tricyclic | | | $C_3H_7$ |
| $CF_3$ | 2-F-phenylene | | difluoro-methyl-chromane tricyclic | | | $C_5H_{11}$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CF₃ | 2-F-phenylene | | difluoro-tricyclic chromane | | | CH₂=CH— |
| OCF₂H | 2-F-phenylene | | difluoro-tricyclic chromane | | | C₃H₇ |
| OCF₂H | 2-F-phenylene | | difluoro-tricyclic chromane | | | C₅H₁₁ |
| OCF₂H | 2-F-phenylene | | difluoro-tricyclic chromane | | | CH₂=CH— |
| OCF₃ | 2-F-phenylene | | difluoro-tricyclic chromane | | | C₃H₇ |
| OCF₃ | 2-F-phenylene | | difluoro-tricyclic chromane | | | C₅H₁₁ |
| OCF₃ | 2-F-phenylene | | difluoro-tricyclic chromane | | | CH₂=CH— |
| CN | 2-F-phenylene | | difluoro-tricyclic chromane | | | C₃H₇ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CN | 3-fluorophenylene | | difluoro-chromane-naphthalene tricyclic | | | C₅H₁₁ |
| CN | 3-fluorophenylene | | difluoro-chromane-naphthalene tricyclic | | | CH₂=CH— |
| F | 3,5-difluorophenylene | | chromane-naphthalene tricyclic | | | C₃H₇ |
| F | 3,5-difluorophenylene | | chromane-naphthalene tricyclic | | | C₅H₁₁ |
| F | 3,5-difluorophenylene | | chromane-naphthalene tricyclic | | | CH₂=CH— |
| Cl | 3,5-difluorophenylene | | chromane-naphthalene tricyclic | | | C₃H₇ |
| Cl | 3,5-difluorophenylene | | chromane-naphthalene tricyclic | | | C₅H₁₁ |
| Cl | 3,5-difluorophenylene | | chromane-naphthalene tricyclic | | | CH₂=CH— |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CF₃ | 3,5-difluorophenylene | | benzochromane tricycle | | | C₃H₇ |
| CF₃ | 3,5-difluorophenylene | | benzochromane tricycle | | | C₅H₁₁ |
| CF₃ | 3,5-difluorophenylene | | benzochromane tricycle | | | CH₂=CH— |
| OCF₂H | 3,5-difluorophenylene | | benzochromane tricycle | | | C₃H₇ |
| OCF₂H | 3,5-difluorophenylene | | benzochromane tricycle | | | C₅H₁₁ |
| OCF₂H | 3,5-difluorophenylene | | benzochromane tricycle | | | CH₂=CH— |
| OCF₃ | 3,5-difluorophenylene | | benzochromane tricycle | | | C₃H₇ |
| OCF₃ | 3,5-difluorophenylene | | benzochromane tricycle | | | C₅H₁₁ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| OCF$_3$ | 3,5-difluorophenyl | | chromeno-tetrahydronaphthalene | | | CH$_2$=CH— |
| CN | 3,5-difluorophenyl | | chromeno-tetrahydronaphthalene | | | C$_3$H$_7$ |
| CN | 3,5-difluorophenyl | | chromeno-tetrahydronaphthalene | | | C$_5$H$_{11}$ |
| CN | 3,5-difluorophenyl | | chromeno-tetrahydronaphthalene | | | CH$_2$=CH— |
| F | 3,5-difluorophenyl | | fluoro-chromeno-tetrahydronaphthalene | | | C$_3$H$_7$ |
| F | 3,5-difluorophenyl | | fluoro-chromeno-tetrahydronaphthalene | | | C$_5$H$_{11}$ |
| F | 3,5-difluorophenyl | | fluoro-chromeno-tetrahydronaphthalene | | | CH$_2$=CH— |
| Cl | 3,5-difluorophenyl | | fluoro-chromeno-tetrahydronaphthalene | | | C$_3$H$_7$ |

TABLE 1-continued
Further example compounds of the formula I in which r = 0, q = 0 or 1, s = 0 or 1; t = 0
| R¹ | A¹ | Z¹ | Tricyclic radical | Z³ | A³ | R² |
|---|---|---|---|---|---|---|
| Cl | 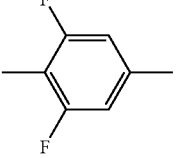 | | 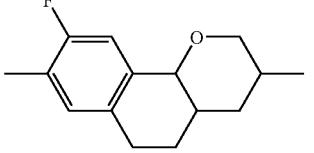 | | | $C_5H_{11}$ |
| Cl | 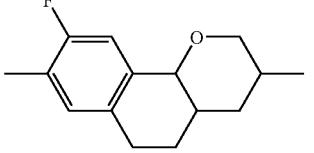 | | 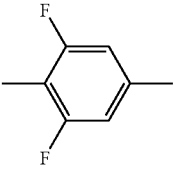 | | | $CH_2{=}CH{-}$ |
| $CF_3$ | 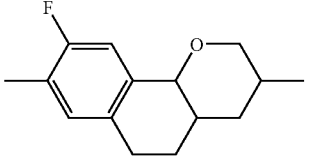 | | 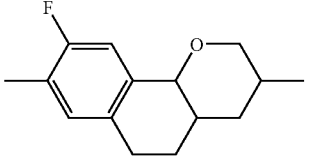 | | | $C_3H_7$ |
| $CF_3$ | 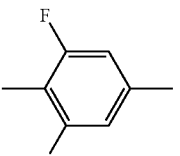 | | 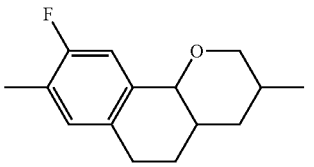 | | | $C_5H_{11}$ |
| $CF_3$ | 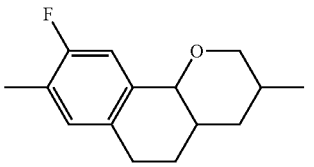 | | 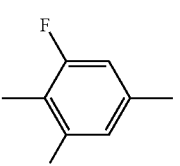 | | | $CH_2{=}CH{-}$ |
| $OCF_2H$ | 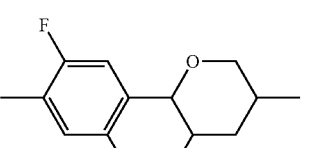 | | 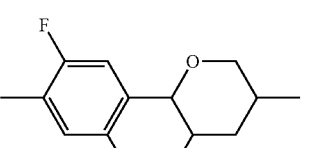 | | | $C_3H_7$ |
| $OCF_2H$ | 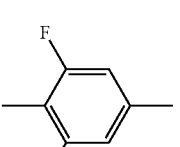 | | 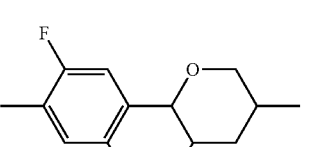 | | | $C_5H_{11}$ |
| $OCF_2H$ | 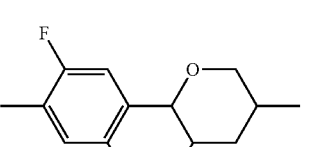 | | 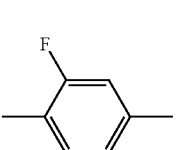 | | | $CH_2{=}CH{-}$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| OCF$_3$ | 2,6-difluorophenylene | | fluoro-chromene-tetrahydronaphthalene tricyclic | | | C$_3$H$_7$ |
| OCF$_3$ | 2,6-difluorophenylene | | fluoro-chromene-tetrahydronaphthalene tricyclic | | | C$_5$H$_{11}$ |
| OCF$_3$ | 2,6-difluorophenylene | | fluoro-chromene-tetrahydronaphthalene tricyclic | | | CH$_2$=CH— |
| CN | 2,6-difluorophenylene | | fluoro-chromene-tetrahydronaphthalene tricyclic | | | C$_3$H$_7$ |
| CN | 2,6-difluorophenylene | | fluoro-chromene-tetrahydronaphthalene tricyclic | | | C$_5$H$_{11}$ |
| CN | 2,6-difluorophenylene | | fluoro-chromene-tetrahydronaphthalene tricyclic | | | CH$_2$=CH— |
| F | 2,6-difluorophenylene | | fluoro-chromene-tetrahydronaphthalene tricyclic | | | C$_3$H$_7$ |
| F | 2,6-difluorophenylene | | fluoro-chromene-tetrahydronaphthalene tricyclic | | | C$_5$H$_{11}$ |

TABLE 1-continued
Further example compounds of the formula I in which r = 0, q = 0 or 1, s = 0 or 1; t = 0
| R¹ | A¹ | Z¹ | Tricyclic radical | Z³ | A³ | R² |
|---|---|---|---|---|---|---|
| F | 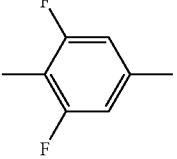 | | 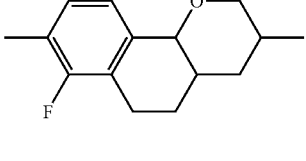 | | | CH$_2$=CH— |
| Cl |  | | 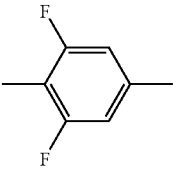 | | | C$_3$H$_7$ |
| Cl | 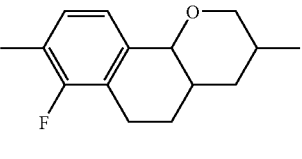 | |  | | | C$_5$H$_{11}$ |
| Cl | 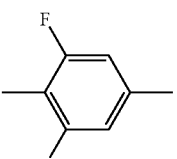 | | 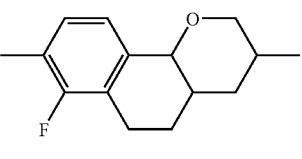 | | | CH$_2$=CH— |
| CF$_3$ |  | | 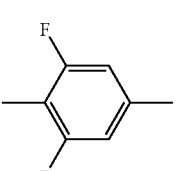 | | | C$_3$H$_7$ |
| CF$_3$ | 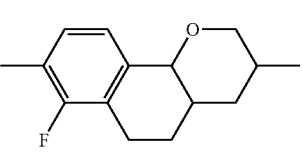 | | 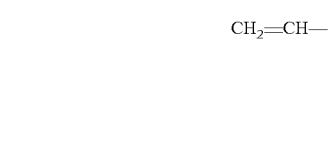 | | | C$_5$H$_{11}$ |
| CF$_3$ | 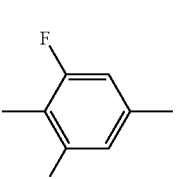 | | 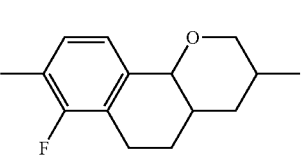 | | | CH$_2$=CH— |
| OCF$_2$H |  | | 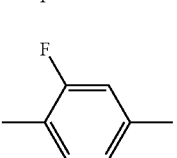 | | | C$_3$H$_7$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| OCF₂H | (difluorophenyl) | | (fluoro-chromane tricyclic) | | | C₅H₁₁ |
| OCF₂H | (difluorophenyl) | | (fluoro-chromane tricyclic) | | | CH₂=CH— |
| OCF₃ | (difluorophenyl) | | (fluoro-chromane tricyclic) | | | C₃H₇ |
| OCF₃ | (difluorophenyl) | | (fluoro-chromane tricyclic) | | | C₅H₁₁ |
| OCF₃ | (difluorophenyl) | | (fluoro-chromane tricyclic) | | | CH₂=CH— |
| CN | (difluorophenyl) | | (fluoro-chromane tricyclic) | | | C₃H₇ |
| CN | (difluorophenyl) | | (fluoro-chromane tricyclic) | | | C₅H₁₁ |
| CN | (difluorophenyl) | | (fluoro-chromane tricyclic) | | | CH₂=CH— |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| F | difluorophenyl | | fluorinated chromene tricyclic | | | $C_3H_7$ |
| F | difluorophenyl | | fluorinated chromene tricyclic | | | $C_5H_{11}$ |
| F | difluorophenyl | | fluorinated chromene tricyclic | | | $CH_2$=CH— |
| Cl | difluorophenyl | | fluorinated chromene tricyclic | | | $C_3H_7$ |
| Cl | difluorophenyl | | fluorinated chromene tricyclic | | | $C_5H_{11}$ |
| Cl | difluorophenyl | | fluorinated chromene tricyclic | | | $CH_2$=CH— |
| $CF_3$ | difluorophenyl | | fluorinated chromene tricyclic | | | $C_3H_7$ |
| $CF_3$ | difluorophenyl | | fluorinated chromene tricyclic | | | $C_5H_{11}$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CF₃ | 3,5-difluorophenylene | | fluorinated tricyclic chromane | | | CH₂=CH— |
| OCF₂H | 3,5-difluorophenylene | | fluorinated tricyclic chromane | | | C₃H₇ |
| OCF₂H | 3,5-difluorophenylene | | fluorinated tricyclic chromane | | | C₅H₁₁ |
| OCF₂H | 3,5-difluorophenylene | | fluorinated tricyclic chromane | | | CH₂=CH— |
| OCF₃ | 3,5-difluorophenylene | | fluorinated tricyclic chromane | | | C₃H₇ |
| OCF₃ | 3,5-difluorophenylene | | fluorinated tricyclic chromane | | | C₅H₁₁ |
| OCF₃ | 3,5-difluorophenylene | | fluorinated tricyclic chromane | | | CH₂=CH— |
| CN | 3,5-difluorophenylene | | fluorinated tricyclic chromane | | | C₃H₇ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CN | difluorophenyl | | fluorinated tricyclic pyran | | | $C_5H_{11}$ |
| CN | difluorophenyl | | fluorinated tricyclic pyran | | | $CH_2{=}CH{-}$ |
| F | difluorophenyl | $OCF_2$ | tricyclic pyran | | | $C_3H_7$ |
| F | difluorophenyl | $OCF_2$ | tricyclic pyran | | | $C_5H_{11}$ |
| F | difluorophenyl | $OCF_2$ | tricyclic pyran | | | $CH_2{=}CH{-}$ |
| Cl | difluorophenyl | $OCF_2$ | tricyclic pyran | | | $C_3H_7$ |
| Cl | difluorophenyl | $OCF_2$ | tricyclic pyran | | | $C_5H_{11}$ |
| Cl | difluorophenyl | $OCF_2$ | tricyclic pyran | | | $CH_2{=}CH{-}$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CF₃ | 2,6-difluorophenyl | OCF₂ | benzochromane | | | C₃H₇ |
| CF₃ | 2,6-difluorophenyl | OCF₂ | benzochromane | | | C₅H₁₁ |
| CF₃ | 2,6-difluorophenyl | OCF₂ | benzochromane | | | CH₂=CH— |
| OCF₂H | 2,6-difluorophenyl | OCF₂ | benzochromane | | | C₃H₇ |
| OCF₂H | 2,6-difluorophenyl | OCF₂ | benzochromane | | | C₅H₁₁ |
| OCF₂H | 2,6-difluorophenyl | OCF₂ | benzochromane | | | CH₂=CH— |
| OCF₃ | 2,6-difluorophenyl | OCF₂ | benzochromane | | | C₃H₇ |
| OCF₃ | 2,6-difluorophenyl | OCF₂ | benzochromane | | | C₅H₁₁ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| OCF$_3$ | 3,5-difluorophenyl | OCF$_2$ | chromane-naphthalene tricyclic | | | CH$_2$=CH— |
| CN | 3,5-difluorophenyl | OCF$_2$ | chromane-naphthalene tricyclic | | | C$_3$H$_7$ |
| CN | 3,5-difluorophenyl | OCF$_2$ | chromane-naphthalene tricyclic | | | C$_5$H$_{11}$ |
| CN | 3,5-difluorophenyl | OCF$_2$ | chromane-naphthalene tricyclic | | | CH$_2$=CH— |
| F | 3,5-difluorophenyl | OCF$_2$ | F-substituted chromane-naphthalene tricyclic | | | C$_3$H$_7$ |
| F | 3,5-difluorophenyl | OCF$_2$ | F-substituted chromane-naphthalene tricyclic | | | C$_5$H$_{11}$ |
| F | 3,5-difluorophenyl | OCF$_2$ | F-substituted chromane-naphthalene tricyclic | | | CH$_2$=CH— |
| Cl | 3,5-difluorophenyl | OCF$_2$ | F-substituted chromane-naphthalene tricyclic | | | C$_3$H$_7$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| Cl | 3,5-difluorophenylene | OCF₂ | fluoro-methyl-chromeno-tetrahydronaphthalene | | | C₅H₁₁ |
| Cl | 3,5-difluorophenylene | OCF₂ | fluoro-methyl-chromeno-tetrahydronaphthalene | | | CH₂=CH— |
| CF₃ | 3,5-difluorophenylene | OCF₂ | fluoro-methyl-chromeno-tetrahydronaphthalene | | | C₃H₇ |
| CF₃ | 3,5-difluorophenylene | OCF₂ | fluoro-methyl-chromeno-tetrahydronaphthalene | | | C₅H₁₁ |
| CF₃ | 3,5-difluorophenylene | OCF₂ | fluoro-methyl-chromeno-tetrahydronaphthalene | | | CH₂=CH— |
| OCF₂H | 3,5-difluorophenylene | OCF₂ | fluoro-methyl-chromeno-tetrahydronaphthalene | | | C₃H₇ |
| OCF₂H | 3,5-difluorophenylene | OCF₂ | fluoro-methyl-chromeno-tetrahydronaphthalene | | | C₅H₁₁ |
| OCF₂H | 3,5-difluorophenylene | OCF₂ | fluoro-methyl-chromeno-tetrahydronaphthalene | | | CH₂=CH— |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| OCF₃ | 3,5-difluorophenylene | OCF₂ | fluorinated tricyclic | | | C₃H₇ |
| OCF₃ | 3,5-difluorophenylene | OCF₂ | fluorinated tricyclic | | | C₅H₁₁ |
| OCF₃ | 3,5-difluorophenylene | OCF₂ | fluorinated tricyclic | | | CH₂=CH— |
| CN | 3,5-difluorophenylene | OCF₂ | fluorinated tricyclic | | | C₃H₇ |
| CN | 3,5-difluorophenylene | OCF₂ | fluorinated tricyclic | | | C₅H₁₁ |
| CN | 3,5-difluorophenylene | OCF₂ | fluorinated tricyclic | | | CH₂=CH— |
| F | 3,5-difluorophenylene | OCF₂ | fluorinated tricyclic | | | C₃H₇ |
| F | 3,5-difluorophenylene | OCF₂ | fluorinated tricyclic | | | C₅H₁₁ |

TABLE 1-continued
Further example compounds of the formula I in which r = 0, q = 0 or 1, s = 0 or 1; t = 0
| R¹ | A¹ | Z¹ | Tricyclic radical | Z³ | A³ | R² |
|---|---|---|---|---|---|---|
| F | 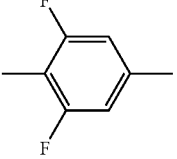 | OCF$_2$ | 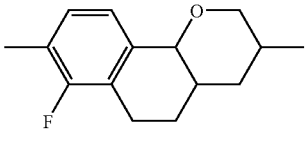 | | | CH$_2$=CH— |
| Cl | 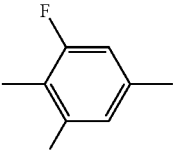 | OCF$_2$ | 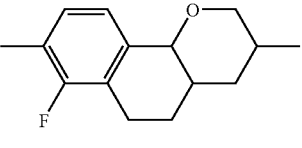 | | | C$_3$H$_7$ |
| Cl | 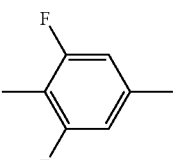 | OCF$_2$ | 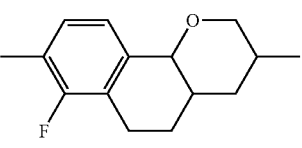 | | | C$_5$H$_{11}$ |
| Cl | 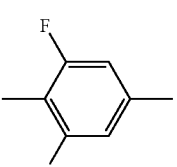 | OCF$_2$ | 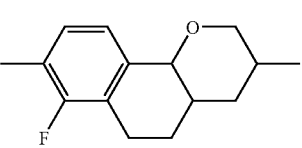 | | | CH$_2$=CH— |
| CF$_3$ | 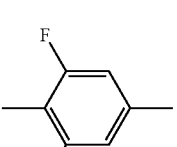 | OCF$_2$ | 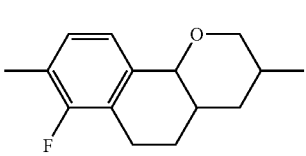 | | | C$_3$H$_7$ |
| CF$_3$ | 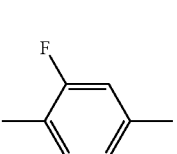 | OCF$_2$ | 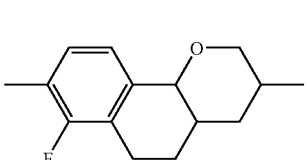 | | | C$_5$H$_{11}$ |
| CF$_3$ | 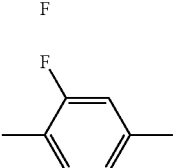 | OCF$_2$ | 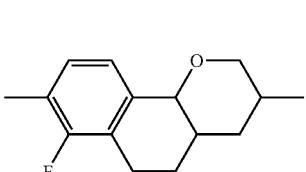 | | | CH$_2$=CH— |
| OCF$_2$H | 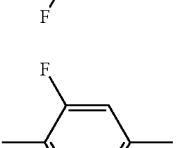 | OCF$_2$ | 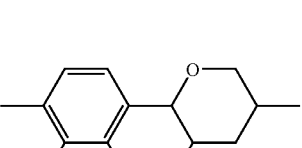 | | | C$_3$H$_7$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| OCF₂H | 3,5-difluorophenyl | OCF₂ | fluoro-benzochromane | | | C₅H₁₁ |
| OCF₂H | 3,5-difluorophenyl | OCF₂ | fluoro-benzochromane | | | CH₂=CH— |
| OCF₃ | 3,5-difluorophenyl | OCF₂ | fluoro-benzochromane | | | C₃H₇ |
| OCF₃ | 3,5-difluorophenyl | OCF₂ | fluoro-benzochromane | | | C₅H₁₁ |
| OCF₃ | 3,5-difluorophenyl | OCF₂ | fluoro-benzochromane | | | CH₂=CH— |
| CN | 3,5-difluorophenyl | OCF₂ | fluoro-benzochromane | | | C₃H₇ |
| CN | 3,5-difluorophenyl | OCF₂ | fluoro-benzochromane | | | C₅H₁₁ |
| CN | 3,5-difluorophenyl | OCF₂ | fluoro-benzochromane | | | CH₂=CH— |

TABLE 1-continued
Further example compounds of the formula I in which r = 0, q = 0 or 1, s = 0 or 1; t = 0
| R¹ | A¹ | Z¹ | Tricyclic radical | Z³ | A³ | R² |
|---|---|---|---|---|---|---|
| F | 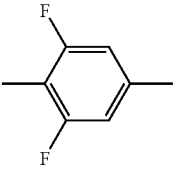 | OCF$_2$ | 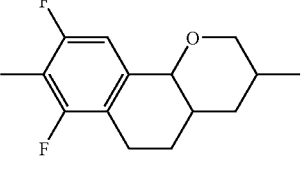 | | | C$_3$H$_7$ |
| F | 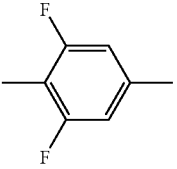 | OCF$_2$ | 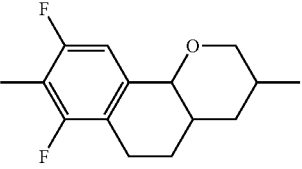 | | | C$_5$H$_{11}$ |
| F | 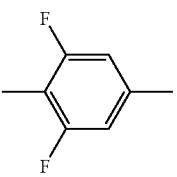 | OCF$_2$ | 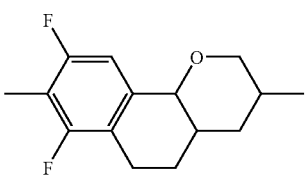 | | | CH$_2$=CH— |
| Cl | 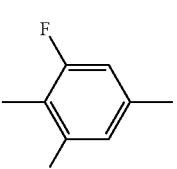 | OCF$_2$ | 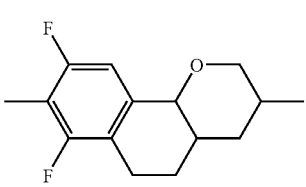 | | | C$_3$H$_7$ |
| Cl | 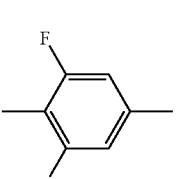 | OCF$_2$ | 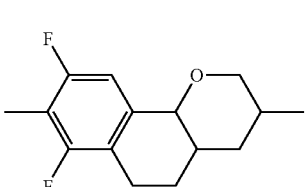 | | | C$_5$H$_{11}$ |
| Cl | 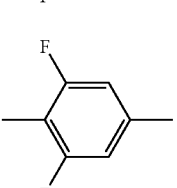 | OCF$_2$ | 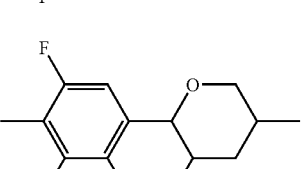 | | | CH$_2$=CH— |
| CF$_3$ | 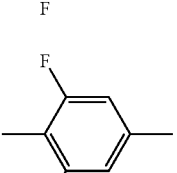 | OCF$_2$ | 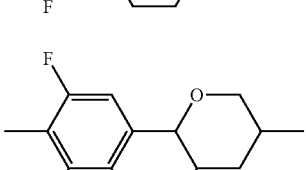 | | | C$_3$H$_7$ |
| CF$_3$ | 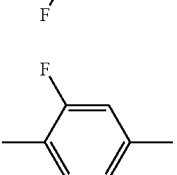 | OCF$_2$ | 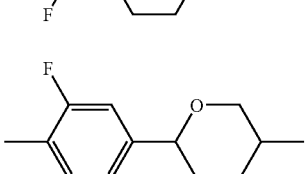 | | | C$_5$H$_{11}$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CF₃ | 3,5-difluoro-1,4-phenylene | OCF₂ | fluorinated tricyclic chromene | | | CH₂=CH— |
| OCF₂H | 3,5-difluoro-1,4-phenylene | OCF₂ | fluorinated tricyclic chromene | | | C₃H₇ |
| OCF₂H | 3,5-difluoro-1,4-phenylene | OCF₂ | fluorinated tricyclic chromene | | | C₅H₁₁ |
| OCF₂H | 3,5-difluoro-1,4-phenylene | OCF₂ | fluorinated tricyclic chromene | | | CH₂=CH— |
| OCF₃ | 3,5-difluoro-1,4-phenylene | OCF₂ | fluorinated tricyclic chromene | | | C₃H₇ |
| OCF₃ | 3,5-difluoro-1,4-phenylene | OCF₂ | fluorinated tricyclic chromene | | | C₅H₁₁ |
| OCF₃ | 3,5-difluoro-1,4-phenylene | OCF₂ | fluorinated tricyclic chromene | | | CH₂=CH— |
| CN | 3,5-difluoro-1,4-phenylene | OCF₂ | fluorinated tricyclic chromene | | | C₃H₇ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CN | (2,6-difluorophenylene) | OCF$_2$ | (difluoro-substituted chromene-fused bicyclic) | | | C$_5$H$_{11}$ |
| CN | (2,6-difluorophenylene) | OCF$_2$ | (difluoro-substituted chromene-fused bicyclic) | | | CH$_2$=CH— |
| F | (2-fluorophenylene) | OCF$_2$ | (chromene-fused bicyclic) | | | C$_3$H$_7$ |
| F | (2-fluorophenylene) | OCF$_2$ | (chromene-fused bicyclic) | | | C$_5$H$_{11}$ |
| F | (2-fluorophenylene) | OCF$_2$ | (chromene-fused bicyclic) | | | CH$_2$=CH— |
| Cl | (2-fluorophenylene) | OCF$_2$ | (chromene-fused bicyclic) | | | C$_3$H$_7$ |
| Cl | (2-fluorophenylene) | OCF$_2$ | (chromene-fused bicyclic) | | | C$_5$H$_{11}$ |
| Cl | (2-fluorophenylene) | OCF$_2$ | (chromene-fused bicyclic) | | | CH$_2$=CH— |
| CF$_3$ | (2-fluorophenylene) | OCF$_2$ | (chromene-fused bicyclic) | | | C$_3$H$_7$ |
| CF$_3$ | (2-fluorophenylene) | OCF$_2$ | (chromene-fused bicyclic) | | | C$_5$H$_{11}$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| $CF_3$ | 2-F-1,4-phenylene | $OCF_2$ | benzochromane | | | $CH_2=CH-$ |
| $OCF_2H$ | 2-F-1,4-phenylene | $OCF_2$ | benzochromane | | | $C_3H_7$ |
| $OCF_2H$ | 2-F-1,4-phenylene | $OCF_2$ | benzochromane | | | $C_5H_{11}$ |
| $OCF_2H$ | 2-F-1,4-phenylene | $OCF_2$ | benzochromane | | | $CH_2=CH-$ |
| $OCF_3$ | 2-F-1,4-phenylene | $OCF_2$ | benzochromane | | | $C_3H_7$ |
| $OCF_3$ | 2-F-1,4-phenylene | $OCF_2$ | benzochromane | | | $C_5H_{11}$ |
| $OCF_3$ | 2-F-1,4-phenylene | $OCF_2$ | benzochromane | | | $CH_2=CH-$ |
| CN | 2-F-1,4-phenylene | $OCF_2$ | benzochromane | | | $C_3H_7$ |
| CN | 2-F-1,4-phenylene | $OCF_2$ | benzochromane | | | $C_5H_{11}$ |
| CN | 2-F-1,4-phenylene | $OCF_2$ | benzochromane | | | $CH_2=CH-$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| F | difluorophenyl | OCF$_2$ | fluoro-chromane tricyclic | | | C$_3$H$_7$ |
| F | difluorophenyl | OCF$_2$ | fluoro-chromane tricyclic | | | C$_5$H$_{11}$ |
| F | difluorophenyl | OCF$_2$ | fluoro-chromane tricyclic | | | CH$_2$=CH— |
| Cl | difluorophenyl | OCF$_2$ | fluoro-chromane tricyclic | | | C$_3$H$_7$ |
| Cl | difluorophenyl | OCF$_2$ | fluoro-chromane tricyclic | | | C$_5$H$_{11}$ |
| Cl | difluorophenyl | OCF$_2$ | fluoro-chromane tricyclic | | | CH$_2$=CH— |
| CF$_3$ | difluorophenyl | OCF$_2$ | fluoro-chromane tricyclic | | | C$_3$H$_7$ |
| CF$_3$ | difluorophenyl | OCF$_2$ | fluoro-chromane tricyclic | | | C$_5$H$_{11}$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| $CF_3$ | 2-F-phenyl | $OCF_2$ | F-substituted tricyclic | | | $CH_2=CH-$ |
| $OCF_2H$ | 2-F-phenyl | $OCF_2$ | F-substituted tricyclic | | | $C_3H_7$ |
| $OCF_2H$ | 2-F-phenyl | $OCF_2$ | F-substituted tricyclic | | | $C_5H_{11}$ |
| $OCF_2H$ | 2-F-phenyl | $OCF_2$ | F-substituted tricyclic | | | $CH_2=CH-$ |
| $OCF_3$ | 2-F-phenyl | $OCF_2$ | F-substituted tricyclic | | | $C_3H_7$ |
| $OCF_3$ | 2-F-phenyl | $OCF_2$ | F-substituted tricyclic | | | $C_5H_{11}$ |
| $OCF_3$ | 2-F-phenyl | $OCF_2$ | F-substituted tricyclic | | | $CH_2=CH-$ |
| $CN$ | 2-F-phenyl | $OCF_2$ | F-substituted tricyclic | | | $C_3H_7$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CN | F-phenyl | OCF$_2$ | fluoro-chromene tricyclic | | | C$_5$H$_{11}$ |
| CN | F-phenyl | OCF$_2$ | fluoro-chromene tricyclic | | | CH$_2$=CH— |
| F | F-phenyl | OCF$_2$ | fluoro-chromene tricyclic | | | C$_3$H$_7$ |
| F | F-phenyl | OCF$_2$ | fluoro-chromene tricyclic | | | C$_5$H$_{11}$ |
| F | F-phenyl | OCF$_2$ | fluoro-chromene tricyclic | | | CH$_2$=CH— |
| Cl | F-phenyl | OCF$_2$ | fluoro-chromene tricyclic | | | C$_3$H$_7$ |
| Cl | F-phenyl | OCF$_2$ | fluoro-chromene tricyclic | | | C$_5$H$_{11}$ |
| Cl | F-phenyl | OCF$_2$ | fluoro-chromene tricyclic | | | CH$_2$=CH— |
| CF$_3$ | F-phenyl | OCF$_2$ | fluoro-chromene tricyclic | | | C$_3$H$_7$ |
| CF$_3$ | F-phenyl | OCF$_2$ | fluoro-chromene tricyclic | | | C$_5$H$_{11}$ |

TABLE 1-continued

Further example compounds of the formula I in which r = 0, q = 0 or 1, s = 0 or 1; t = 0

| R¹ | A¹ | Z¹ | Tricyclic radical | Z³ | A³ | R² |
|---|---|---|---|---|---|---|
| CF₃ | (2-F phenyl) | OCF₂ | (fluorinated tricyclic) | | | CH₂=CH— |
| OCF₂H | (2-F phenyl) | OCF₂ | (fluorinated tricyclic) | | | C₃H₇ |
| OCF₂H | (2-F phenyl) | OCF₂ | (fluorinated tricyclic) | | | C₅H₁₁ |
| OCF₂H | (2-F phenyl) | OCF₂ | (fluorinated tricyclic) | | | CH₂=CH— |
| OCF₃ | (2-F phenyl) | OCF₂ | (fluorinated tricyclic) | | | C₃H₇ |
| OCF₃ | (2-F phenyl) | OCF₂ | (fluorinated tricyclic) | | | C₅H₁₁ |
| OCF₃ | (2-F phenyl) | OCF₂ | (fluorinated tricyclic) | | | CH₂=CH— |
| CN | (2-F phenyl) | OCF₂ | (fluorinated tricyclic) | | | C₃H₇ |
| CN | (2-F phenyl) | OCF₂ | (fluorinated tricyclic) | | | C₅H₁₁ |
| CN | (2-F phenyl) | OCF₂ | (fluorinated tricyclic) | | | CH₂=CH— |

TABLE 1-continued
Further example compounds of the formula I in which r = 0, q = 0 or 1, s = 0 or 1; t = 0
| R¹ | A¹ | Z¹ | Tricyclic radical | Z³ | A³ | R² |
|---|---|---|---|---|---|---|
| F | 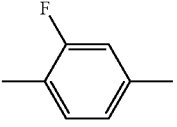 | OCF$_2$ | 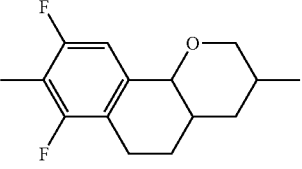 | | | C$_3$H$_7$ |
| F | 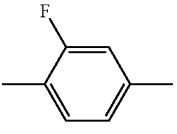 | OCF$_2$ | 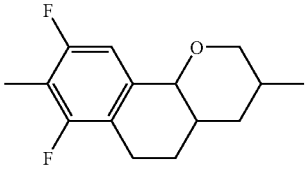 | | | C$_5$H$_{11}$ |
| F | 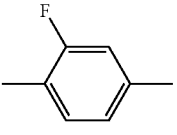 | OCF$_2$ | 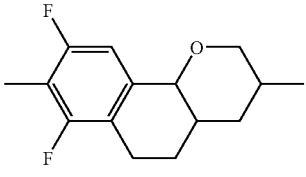 | | | CH$_2$=CH— |
| Cl | 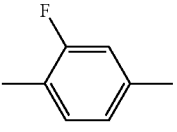 | OCF$_2$ | 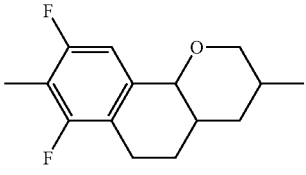 | | | C$_3$H$_7$ |
| Cl | 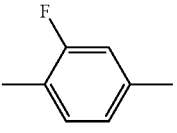 | OCF$_2$ | 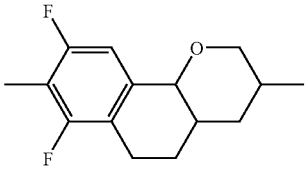 | | | C$_5$H$_{11}$ |
| Cl | 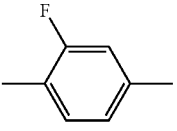 | OCF$_2$ | 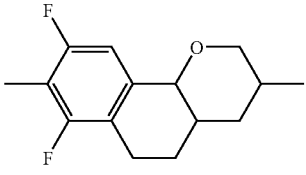 | | | CH$_2$=CH— |
| CF$_3$ | 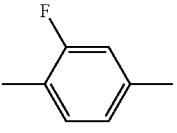 | OCF$_2$ | 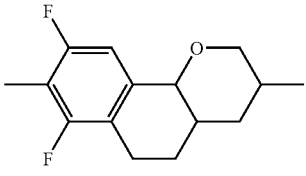 | | | C$_3$H$_7$ |

| R¹ | A¹ | Z¹ | Tricyclic radical | Z³ | A³ | R² |
|---|---|---|---|---|---|---|
| CF₃ | 2-F-1,4-phenylene | OCF₂ | tricyclic | | | C₅H₁₁ |
| CF₃ | 2-F-1,4-phenylene | OCF₂ | tricyclic | | | CH₂=CH— |
| OCF₂H | 2-F-1,4-phenylene | OCF₂ | tricyclic | | | C₃H₇ |
| OCF₂H | 2-F-1,4-phenylene | OCF₂ | tricyclic | | | C₅H₁₁ |
| OCF₂H | 2-F-1,4-phenylene | OCF₂ | tricyclic | | | CH₂=CH— |
| OCF₃ | 2-F-1,4-phenylene | OCF₂ | tricyclic | | | C₃H₇ |
| OCF₃ | 2-F-1,4-phenylene | OCF₂ | tricyclic | | | C₅H₁₁ |
| OCF₃ | 2-F-1,4-phenylene | OCF₂ | tricyclic | | | CH₂=CH— |

-continued

| R¹ | A¹ | Z¹ | Tricyclic radical | Z³ | A³ | R² |
|---|---|---|---|---|---|---|
| CN | (2-fluoro-1,4-phenylene) | OCF₂ | (difluoro-substituted tricyclic chromane) | | | $C_3H_7$ |
| CN | (2-fluoro-1,4-phenylene) | OCF₂ | (difluoro-substituted tricyclic chromane) | | | $C_5H_{11}$ |
| CN | (2-fluoro-1,4-phenylene) | OCF₂ | (difluoro-substituted tricyclic chromane) | | | $CH_2{=}CH{-}$ |
| F | | | (tricyclic chromane) | | (1,4-cyclohexylene) | $C_3H_7$ |
| F | | | (tricyclic chromane) | | (1,4-cyclohexylene) | $C_5H_{11}$ |
| F | | | (tricyclic chromane) | | (1,4-cyclohexylene) | $CH_2{=}CH{-}$ |
| Cl | | | (tricyclic chromane) | | (1,4-cyclohexylene) | $C_3H_7$ |
| Cl | | | (tricyclic chromane) | | (1,4-cyclohexylene) | $C_5H_{11}$ |
| Cl | | | (tricyclic chromane) | | (1,4-cyclohexylene) | $CH_2{=}CH{-}$ |
| $CF_3$ | | | (tricyclic chromane) | | (1,4-cyclohexylene) | $C_3H_7$ |

-continued

| R¹ | A¹ | Z¹ | Tricyclic radical | Z³ | A³ | R² |
|---|---|---|---|---|---|---|
| CF₃ | | | | | | C₅H₁₁ |
| CF₃ | | | | | | CH₂=CH— |
| OCF₂H | | | | | | C₃H₇ |
| OCF₂H | | | | | | C₅H₁₁ |
| OCF₂H | | | | | | CH₂=CH— |
| OCF₃ | | | | | | C₃H₇ |
| OCF₃ | | | | | | C₅H₁₁ |
| OCF₃ | | | | | | CH₂=CH— |
| CN | | | | | | C₃H₇ |
| CN | | | | | | C₅H₁₁ |
| CN | | | | | | CH₂=CH— |

| R¹ | A¹ | Z¹ | Tricyclic radical | Z³ | A³ | R² |
|---|---|---|---|---|---|---|
| F | | | [tricyclic with F] | | [cyclohexyl] | C₃H₇ |
| F | | | [tricyclic with F] | | [cyclohexyl] | C₅H₁₁ |
| F | | | [tricyclic with F] | | [cyclohexyl] | CH₂=CH— |
| Cl | | | [tricyclic with F] | | [cyclohexyl] | C₃H₇ |
| Cl | | | [tricyclic with F] | | [cyclohexyl] | C₅H₁₁ |
| Cl | | | [tricyclic with F] | | [cyclohexyl] | CH₂=CH— |
| CF₃ | | | [tricyclic with F] | | [cyclohexyl] | C₃H₇ |
| CF₃ | | | [tricyclic with F] | | [cyclohexyl] | C₅H₁₁ |
| CF₃ | | | [tricyclic with F] | | [cyclohexyl] | CH₂=CH— |

-continued

| R¹ | A¹ | Z¹ | Tricyclic radical | Z³ | A³ | R² |
|---|---|---|---|---|---|---|
| OCF₂H | | | fluoro-substituted tricyclic chromane | | cyclohexyl | C₃H₇ |
| OCF₂H | | | fluoro-substituted tricyclic chromane | | cyclohexyl | C₅H₁₁ |
| OCF₂H | | | fluoro-substituted tricyclic chromane | | cyclohexyl | CH₂=CH— |
| OCF₃ | | | fluoro-substituted tricyclic chromane | | cyclohexyl | C₃H₇ |
| OCF₃ | | | fluoro-substituted tricyclic chromane | | cyclohexyl | C₅H₁₁ |
| OCF₃ | | | fluoro-substituted tricyclic chromane | | cyclohexyl | CH₂=CH— |
| CN | | | fluoro-substituted tricyclic chromane | | cyclohexyl | C₃H₇ |
| CN | | | fluoro-substituted tricyclic chromane | | cyclohexyl | C₅H₁₁ |
| CN | | | fluoro-substituted tricyclic chromane | | cyclohexyl | CH₂=CH— |

-continued

| R¹ | A¹ | Z¹ | Tricyclic radical | Z³ | A³ | R² |
|---|---|---|---|---|---|---|
| F | | | | | | C₃H₇ |
| F | | | | | | C₅H₁₁ |
| F | | | | | | CH₂=CH— |
| Cl | | | | | | C₃H₇ |
| Cl | | | | | | C₅H₁₁ |
| Cl | | | | | | CH₂=CH— |
| CF₃ | | | | | | C₃H₇ |
| CF₃ | | | | | | C₅H₁₁ |
| CF₃ | | | | | | CH₂=CH— |
| OCF₂H | | | | | | C₃H₇ |

-continued

| R¹ | A¹ | Z¹ | Tricyclic radical | Z³ | A³ | R² |
|---|---|---|---|---|---|---|
| OCF₂H | | | (tricyclic with F) | | (cyclohexyl) | C₅H₁₁ |
| OCF₂H | | | (tricyclic with F) | | (cyclohexyl) | CH₂=CH— |
| OCF₃ | | | (tricyclic with F) | | (cyclohexyl) | C₃H₇ |
| OCF₃ | | | (tricyclic with F) | | (cyclohexyl) | C₅H₁₁ |
| OCF₃ | | | (tricyclic with F) | | (cyclohexyl) | CH₂=CH— |
| CN | | | (tricyclic with F) | | (cyclohexyl) | C₃H₇ |
| CN | | | (tricyclic with F) | | (cyclohexyl) | C₅H₁₁ |
| CN | | | (tricyclic with F) | | (cyclohexyl) | CH₂=CH— |
| F | | | (tricyclic with 2F) | | (cyclohexyl) | C₃H₇ |
| F | | | (tricyclic with 2F) | | (cyclohexyl) | C₅H₁₁ |

-continued

| R¹ | A¹ | Z¹ | Tricyclic radical | Z³ | A³ | R² |
|----|----|----|-------------------|----|----|----|
| F | | | (tricyclic, F,F,F) | | cyclohexyl | CH₂=CH— |
| Cl | | | (tricyclic, F,F,F) | | cyclohexyl | C₃H₇ |
| Cl | | | (tricyclic, F,F,F) | | cyclohexyl | C₅H₁₁ |
| Cl | | | (tricyclic, F,F,F) | | cyclohexyl | CH₂=CH— |
| CF₃ | | | (tricyclic, F,F,F) | | cyclohexyl | C₃H₇ |
| CF₃ | | | (tricyclic, F,F,F) | | cyclohexyl | C₅H₁₁ |
| CF₃ | | | (tricyclic, F,F,F) | | cyclohexyl | CH₂=CH— |
| OCF₂H | | | (tricyclic, F,F,F) | | cyclohexyl | C₃H₇ |

-continued

| R¹ | A¹ | Z¹ | Tricyclic radical | Z³ | A³ | R² |
|---|---|---|---|---|---|---|
| OCF₂H | | | (tricyclic with two F) | | (cyclohexyl) | C₅H₁₁ |
| OCF₂H | | | (tricyclic with two F) | | (cyclohexyl) | CH₂=CH— |
| OCF₃ | | | (tricyclic with two F) | | (cyclohexyl) | C₃H₇ |
| OCF₃ | | | (tricyclic with two F) | | (cyclohexyl) | C₅H₁₁ |
| OCF₃ | | | (tricyclic with two F) | | (cyclohexyl) | CH₂=CH— |
| CN | | | (tricyclic with two F) | | (cyclohexyl) | C₃H₇ |
| CN | | | (tricyclic with two F) | | (cyclohexyl) | C₅H₁₁ |
| CN | | | (tricyclic with two F) | | (cyclohexyl) | CH₂=CH— |
| F | | | (tricyclic) | | (tetrahydropyran) | C₃H₇ |

| R¹ | A¹ | Z¹ | Tricyclic radical | Z³ | A³ | R² |
|---|---|---|---|---|---|---|
| F | | | | | | C₅H₁₁ |
| F | | | | | | CH₂=CH— |
| Cl | | | | | | C₃H₇ |
| Cl | | | | | | C₅H₁₁ |
| Cl | | | | | | CH₂=CH— |
| CF₃ | | | | | | C₃H₇ |
| CF₃ | | | | | | C₅H₁₁ |
| CF₃ | | | | | | CH₂=CH— |
| OCF₂H | | | | | | C₃H₇ |
| OCF₂H | | | | | | C₅H₁₁ |
| OCF₂H | | | | | | CH₂=CH— |

-continued

| R¹ | A¹ | Z¹ | Tricyclic radical | Z³ | A³ | R² |
|---|---|---|---|---|---|---|
| OCF₃ | | | benzo-fused bicyclic pyran | | tetrahydropyran | C₃H₇ |
| OCF₃ | | | benzo-fused bicyclic pyran | | tetrahydropyran | C₅H₁₁ |
| OCF₃ | | | benzo-fused bicyclic pyran | | tetrahydropyran | CH₂=CH— |
| CN | | | benzo-fused bicyclic pyran | | tetrahydropyran | C₃H₇ |
| CN | | | benzo-fused bicyclic pyran | | tetrahydropyran | C₅H₁₁ |
| CN | | | benzo-fused bicyclic pyran | | tetrahydropyran | CH₂=CH— |
| F | | | F-substituted benzo-fused bicyclic pyran | | tetrahydropyran | C₃H₇ |
| F | | | F-substituted benzo-fused bicyclic pyran | | tetrahydropyran | C₅H₁₁ |
| F | | | F-substituted benzo-fused bicyclic pyran | | tetrahydropyran | CH₂=CH— |
| Cl | | | F-substituted benzo-fused bicyclic pyran | | tetrahydropyran | C₃H₇ |

-continued
| R¹ | A¹ | Z¹ | Tricyclic radical | Z³ | A³ | R² |
|---|---|---|---|---|---|---|
| Cl | | | 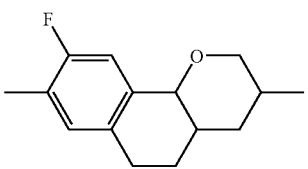 | | 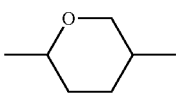 | $C_5H_{11}$ |
| Cl | | | 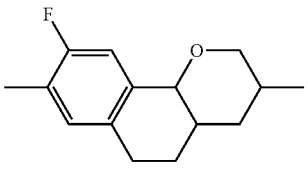 | | 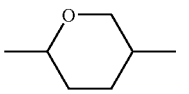 | $CH_2=CH-$ |
| $CF_3$ | | | 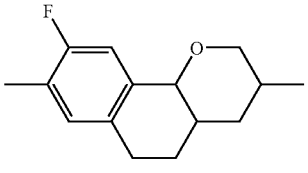 | | 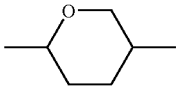 | $C_3H_7$ |
| $CF_3$ | | | 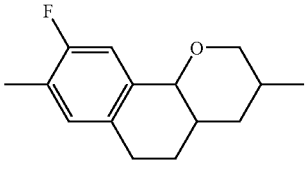 | | 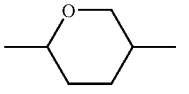 | $C_5H_{11}$ |
| $CF_3$ | | | 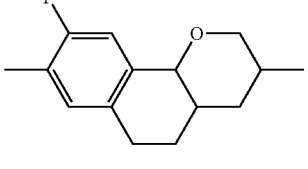 | | 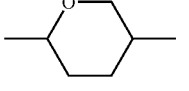 | $CH_2=CH-$ |
| $OCF_2H$ | | | 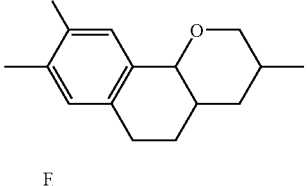 | | 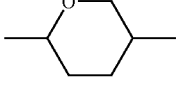 | $C_3H_7$ |
| $OCF_2H$ | | | 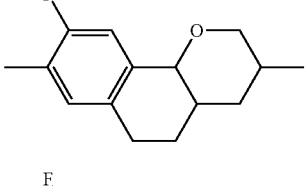 | | 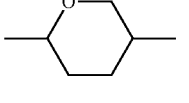 | $C_5H_{11}$ |
| $OCF_2H$ | | | 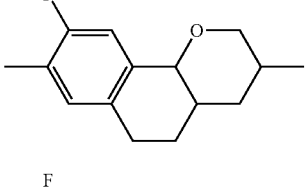 | | 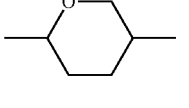 | $CH_2=CH-$ |
| $OCF_3$ | | | 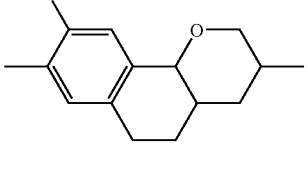 | | 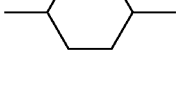 | $C_3H_7$ |

-continued

| R¹ | A¹ | Z¹ | Tricyclic radical | Z³ | A³ | R² |
|---|---|---|---|---|---|---|
| OCF₃ | | | | | | C₅H₁₁ |
| OCF₃ | | | | | | CH₂=CH— |
| CN | | | | | | C₃H₇ |
| CN | | | | | | C₅H₁₁ |
| CN | | | | | | CH₂=CH— |
| F | | | | | | C₃H₇ |
| F | | | | | | C₅H₁₁ |
| F | | | | | | CH₂=CH— |
| Cl | | | | | | C₃H₇ |

-continued

| R¹ | A¹ | Z¹ | Tricyclic radical | Z³ | A³ | R² |
|---|---|---|---|---|---|---|
| Cl | | | | | | C₅H₁₁ |
| Cl | | | | | | CH₂=CH— |
| CF₃ | | | | | | C₃H₇ |
| CF₃ | | | | | | C₅H₁₁ |
| CF₃ | | | | | | CH₂=CH— |
| OCF₂H | | | | | | C₃H₇ |
| OCF₂H | | | | | | C₅H₁₁ |
| OCF₂H | | | | | | CH₂=CH— |
| OCF₃ | | | | | | C₃H₇ |
| OCF₃ | | | | | | C₅H₁₁ |

-continued

| R¹ | A¹ | Z¹ | Tricyclic radical | Z³ | A³ | R² |
|---|---|---|---|---|---|---|
| OCF₃ | | | (tricyclic with F) | | (pyran) | CH₂=CH— |
| CN | | | (tricyclic with F) | | (pyran) | C₃H₇ |
| CN | | | (tricyclic with F) | | (pyran) | C₅H₁₁ |
| CN | | | (tricyclic with F) | | (pyran) | CH₂=CH— |
| F | | | (tricyclic with 2F) | | (pyran) | C₃H₇ |
| F | | | (tricyclic with 2F) | | (pyran) | C₅H₁₁ |
| F | | | (tricyclic with 2F) | | (pyran) | CH₂=CH— |
| Cl | | | (tricyclic with 2F) | | (pyran) | C₃H₇ |
| Cl | | | (tricyclic with 2F) | | (pyran) | C₅H₁₁ |

-continued

| R¹ | A¹ | Z¹ | Tricyclic radical | Z³ | A³ | R² |
|---|---|---|---|---|---|---|
| Cl | | | tricyclic (F,F substituted) | | tetrahydropyran | $CH_2=CH-$ |
| $CF_3$ | | | tricyclic (F,F substituted) | | tetrahydropyran | $C_3H_7$ |
| $CF_3$ | | | tricyclic (F,F substituted) | | tetrahydropyran | $C_5H_{11}$ |
| $CF_3$ | | | tricyclic (F,F substituted) | | tetrahydropyran | $CH_2=CH-$ |
| $OCF_2H$ | | | tricyclic (F,F substituted) | | tetrahydropyran | $C_3H_7$ |
| $OCF_2H$ | | | tricyclic (F,F substituted) | | tetrahydropyran | $C_5H_{11}$ |
| $OCF_2H$ | | | tricyclic (F,F substituted) | | tetrahydropyran | $CH_2=CH-$ |
| $OCF_3$ | | | tricyclic (F,F substituted) | | tetrahydropyran | $C_3H_7$ |

-continued
| R¹ | A¹ | Z¹ | Tricyclic radical | Z³ | A³ | R² |
|---|---|---|---|---|---|---|
| OCF₃ | | | 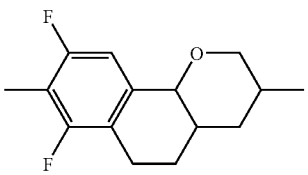 | | 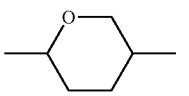 | C₅H₁₁ |
| OCF₃ | | | 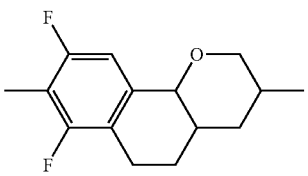 | | 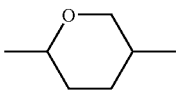 | CH₂=CH— |
| CN | | | 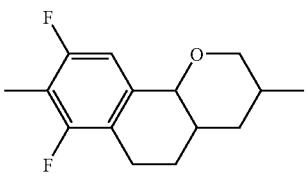 | | 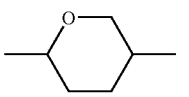 | C₃H₇ |
| CN | | | 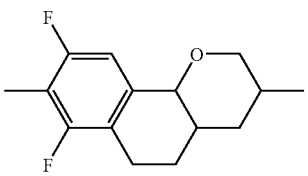 | | 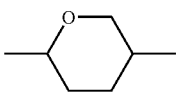 | C₅H₁₁ |
| CN | | | 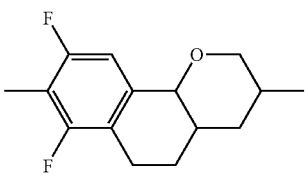 | | 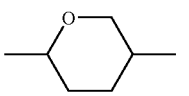 | CH₂=CH— |
| F | | | 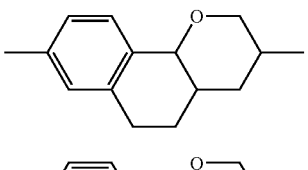 | | 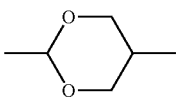 | C₃H₇ |
| F | | | 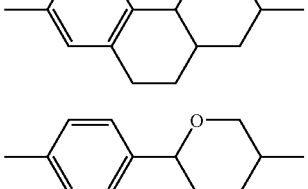 | | 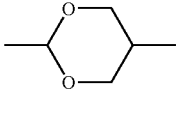 | C₅H₁₁ |
| F | | | 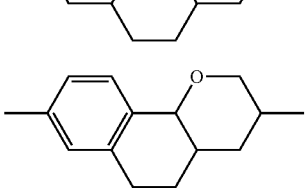 | | 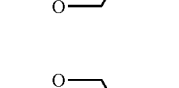 | CH₂=CH— |
| Cl | | | 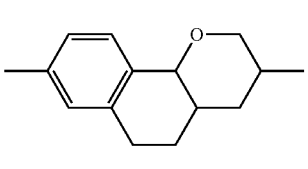 | | 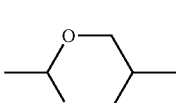 | C₃H₇ |
| Cl | | | 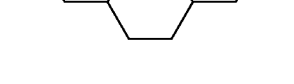 | | 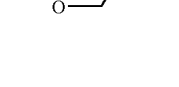 | C₅H₁₁ |

-continued

| R¹ | A¹ | Z¹ | Tricyclic radical | Z³ | A³ | R² |
|---|---|---|---|---|---|---|
| Cl | | | naphtho-pyran | | 1,3-dioxane | CH$_2$=CH— |
| CF$_3$ | | | naphtho-pyran | | 1,3-dioxane | C$_3$H$_7$ |
| CF$_3$ | | | naphtho-pyran | | 1,3-dioxane | C$_5$H$_{11}$ |
| CF$_3$ | | | naphtho-pyran | | 1,3-dioxane | CH$_2$=CH— |
| OCF$_2$H | | | naphtho-pyran | | 1,3-dioxane | C$_3$H$_7$ |
| OCF$_2$H | | | naphtho-pyran | | 1,3-dioxane | C$_5$H$_{11}$ |
| OCF$_2$H | | | naphtho-pyran | | 1,3-dioxane | CH$_2$=CH— |
| OCF$_3$ | | | naphtho-pyran | | 1,3-dioxane | C$_3$H$_7$ |
| OCF$_3$ | | | naphtho-pyran | | 1,3-dioxane | C$_5$H$_{11}$ |
| OCF$_3$ | | | naphtho-pyran | | 1,3-dioxane | CH$_2$=CH— |
| CN | | | naphtho-pyran | | 1,3-dioxane | C$_3$H$_7$ |

-continued

| R¹ | A¹ | Z¹ | Tricyclic radical | Z³ | A³ | R² |
|---|---|---|---|---|---|---|
| CN | | | (tricyclic) | | (1,3-dioxane) | C₅H₁₁ |
| CN | | | (tricyclic) | | (1,3-dioxane) | CH₂=CH— |
| F | | | (tricyclic, F-substituted) | | (1,3-dioxane) | C₃H₇ |
| F | | | (tricyclic, F-substituted) | | (1,3-dioxane) | C₅H₁₁ |
| F | | | (tricyclic, F-substituted) | | (1,3-dioxane) | CH₂=CH— |
| Cl | | | (tricyclic, F-substituted) | | (1,3-dioxane) | C₃H₇ |
| Cl | | | (tricyclic, F-substituted) | | (1,3-dioxane) | C₅H₁₁ |
| Cl | | | (tricyclic, F-substituted) | | (1,3-dioxane) | CH₂=CH— |
| CF₃ | | | (tricyclic, F-substituted) | | (1,3-dioxane) | C₃H₇ |

-continued
| R¹ | A¹ | Z¹ | Tricyclic radical | Z³ | A³ | R² |
|---|---|---|---|---|---|---|
| CF₃ | | | 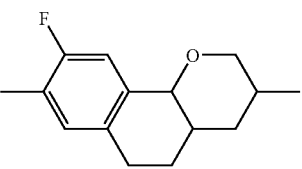 | | 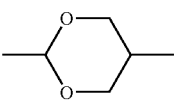 | C₅H₁₁ |
| CF₃ | | | 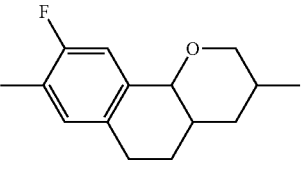 | | 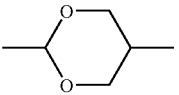 | CH₂=CH— |
| OCF₂H | | | 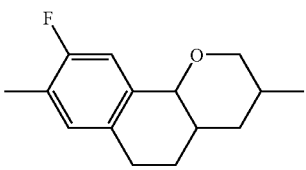 | | 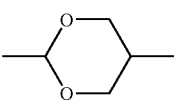 | C₃H₇ |
| OCF₂H | | | 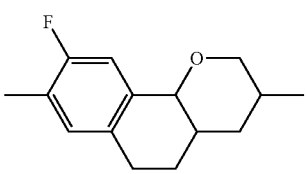 | | 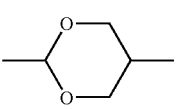 | C₅H₁₁ |
| OCF₂H | | | 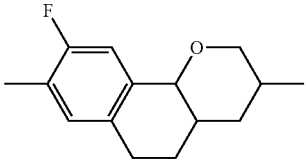 | | 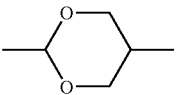 | CH₂=CH— |
| OCF₃ | | | 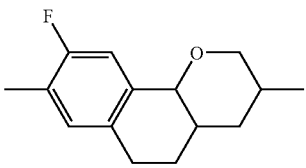 | | 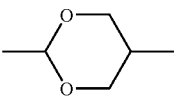 | C₃H₇ |
| OCF₃ | | | 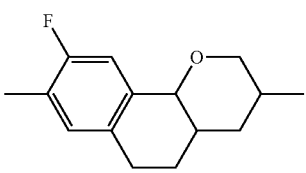 | | 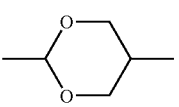 | C₅H₁₁ |
| OCF₃ | | | 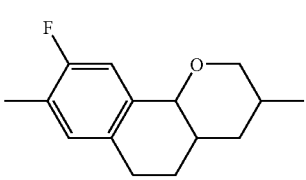 | | | CH₂=CH— |
| CN | | | 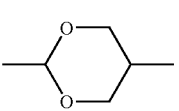 | | | C₃H₇ |

-continued

| R¹ | A¹ | Z¹ | Tricyclic radical | Z³ | A³ | R² |
|---|---|---|---|---|---|---|
| CN | | | | | | $C_5H_{11}$ |
| CN | | | | | | $CH_2=CH-$ |
| F | | | | | | $C_3H_7$ |
| F | | | | | | $C_5H_{11}$ |
| F | | | | | | $CH_2=CH-$ |
| Cl | | | | | | $C_3H_7$ |
| Cl | | | | | | $C_5H_{11}$ |
| Cl | | | | | | $CH_2=CH-$ |
| $CF_3$ | | | | | | $C_3H_7$ |
| $CF_3$ | | | | | | $C_5H_{11}$ |

-continued

| R¹ | A¹ | Z¹ | Tricyclic radical | Z³ | A³ | R² |
|---|---|---|---|---|---|---|
| CF₃ | | | (fluorinated benzo-chromane tricyclic) | | 1,3-dioxane | CH₂=CH— |
| OCF₂H | | | (fluorinated benzo-chromane tricyclic) | | 1,3-dioxane | C₃H₇ |
| OCF₂H | | | (fluorinated benzo-chromane tricyclic) | | 1,3-dioxane | C₅H₁₁ |
| OCF₂H | | | (fluorinated benzo-chromane tricyclic) | | 1,3-dioxane | CH₂=CH— |
| OCF₃ | | | (fluorinated benzo-chromane tricyclic) | | 1,3-dioxane | C₃H₇ |
| OCF₃ | | | (fluorinated benzo-chromane tricyclic) | | 1,3-dioxane | C₅H₁₁ |
| OCF₃ | | | (fluorinated benzo-chromane tricyclic) | | 1,3-dioxane | CH₂=CH— |
| CN | | | (fluorinated benzo-chromane tricyclic) | | 1,3-dioxane | C₃H₇ |
| CN | | | (fluorinated benzo-chromane tricyclic) | | 1,3-dioxane | C₅H₁₁ |
| CN | | | (fluorinated benzo-chromane tricyclic) | | 1,3-dioxane | CH₂=CH— |

-continued

| R¹ | A¹ | Z¹ | Tricyclic radical | Z³ | A³ | R² |
|---|---|---|---|---|---|---|
| F | | | tricyclic (F,F) | | dioxane | C₃H₇ |
| F | | | tricyclic (F,F) | | dioxane | C₅H₁₁ |
| F | | | tricyclic (F,F) | | dioxane | CH₂=CH— |
| Cl | | | tricyclic (F,F) | | dioxane | C₃H₇ |
| Cl | | | tricyclic (F,F) | | dioxane | C₅H₁₁ |
| Cl | | | tricyclic (F,F) | | dioxane | CH₂=CH— |
| CF₃ | | | tricyclic (F,F) | | dioxane | C₃H₇ |
| CF₃ | | | tricyclic (F,F) | | dioxane | C₅H₁₁ |

-continued

| R[1] | A[1] | Z[1] | Tricyclic radical | Z[3] | A[3] | R[2] |
|---|---|---|---|---|---|---|
| CF$_3$ | | | | | | CH$_2$=CH— |
| OCF$_2$H | | | | | | C$_3$H$_7$ |
| OCF$_2$H | | | | | | C$_5$H$_{11}$ |
| OCF$_2$H | | | | | | CH$_2$=CH— |
| OCF$_3$ | | | | | | C$_3$H$_7$ |
| OCF$_3$ | | | | | | C$_5$H$_{11}$ |
| OCF$_3$ | | | | | | CH$_2$=CH— |
| CN | | | | | | C$_3$H$_7$ |

-continued

| R¹ | A¹ | Z¹ | Tricyclic radical | Z³ | A³ | R² |
|---|---|---|---|---|---|---|
| CN | | | (tricyclic with 2 F) | | (1,3-dioxane) | $C_5H_{11}$ |
| CN | | | (tricyclic with 2 F) | | (1,3-dioxane) | $CH_2=CH-$ |
| F | | | (tricyclic) | | (1,3-dioxane) | $C_3H_7$ |
| F | | | (tricyclic) | | (1,3-dioxane) | $C_5H_{11}$ |
| F | | | (tricyclic) | | (1,3-dioxane) | $CH_2=CH-$ |
| Cl | | | (tricyclic) | | (1,3-dioxane) | $C_3H_7$ |
| Cl | | | (tricyclic) | | (1,3-dioxane) | $C_5H_{11}$ |
| Cl | | | (tricyclic) | | (1,3-dioxane) | $CH_2=CH-$ |
| $CF_3$ | | | (tricyclic) | | (1,3-dioxane) | $C_3H_7$ |
| $CF_3$ | | | (tricyclic) | | (1,3-dioxane) | $C_5H_{11}$ |
| $CF_3$ | | | (tricyclic) | | (1,3-dioxane) | $CH_2=CH-$ |

| R¹ | A¹ | Z¹ | Tricyclic radical | Z³ | A³ | R² |
|---|---|---|---|---|---|---|
| OCF₂H | | | benzene-fused pyran-cyclopentane tricycle | | 1,3-dioxane | C₃H₇ |
| OCF₂H | | | benzene-fused pyran-cyclopentane tricycle | | 1,3-dioxane | C₅H₁₁ |
| OCF₂H | | | benzene-fused pyran-cyclopentane tricycle | | 1,3-dioxane | CH₂=CH— |
| OCF₃ | | | benzene-fused pyran-cyclopentane tricycle | | 1,3-dioxane | C₃H₇ |
| OCF₃ | | | benzene-fused pyran-cyclopentane tricycle | | 1,3-dioxane | C₅H₁₁ |
| OCF₃ | | | benzene-fused pyran-cyclopentane tricycle | | 1,3-dioxane | CH₂=CH— |
| CN | | | benzene-fused pyran-cyclopentane tricycle | | 1,3-dioxane | C₃H₇ |
| CN | | | benzene-fused pyran-cyclopentane tricycle | | 1,3-dioxane | C₅H₁₁ |
| CN | | | benzene-fused pyran-cyclopentane tricycle | | 1,3-dioxane | CH₂=CH— |
| F | | | F-substituted benzene-fused pyran-cyclopentane tricycle | | 1,3-dioxane | C₃H₇ |
| F | | | F-substituted benzene-fused pyran-cyclopentane tricycle | | 1,3-dioxane | C₅H₁₁ |

-continued
| R¹ | A¹ | Z¹ | Tricyclic radical | Z³ | A³ | R² |
|---|---|---|---|---|---|---|
| F | | | 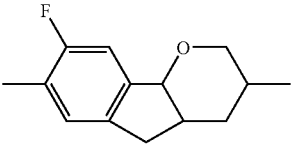 | | 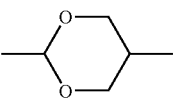 | CH₂=CH— |
| Cl | | | 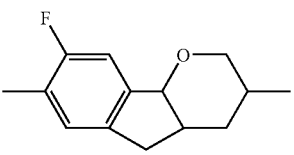 | | 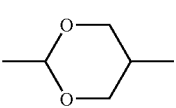 | C₃H₇ |
| Cl | | | 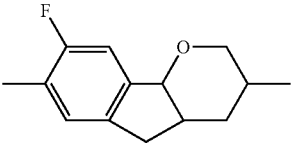 | | 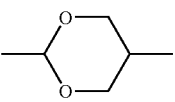 | C₅H₁₁ |
| Cl | | | 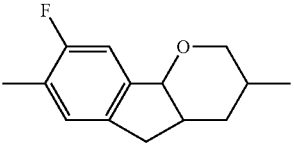 | | 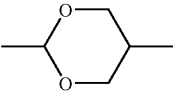 | CH₂=CH— |
| CF₃ | | | 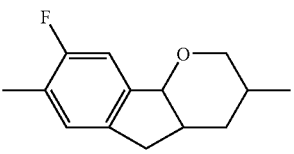 | | 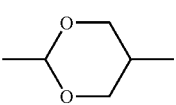 | C₃H₇ |
| CF₃ | | | 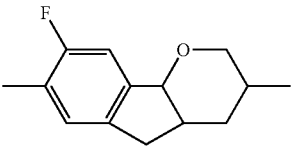 | | 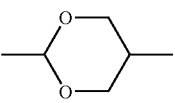 | C₅H₁₁ |
| CF₃ | | | 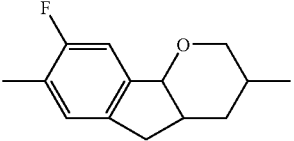 | | 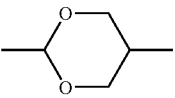 | CH₂=CH— |
| OCF₂H | | | 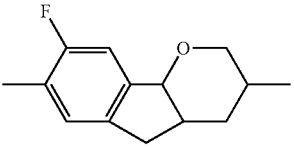 | |  | C₃H₇ |
| OCF₂H | | | 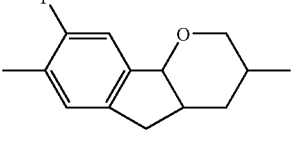 | | 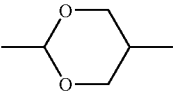 | C₅H₁₁ |

-continued

| R¹ | A¹ | Z¹ | Tricyclic radical | Z³ | A³ | R² |
|---|---|---|---|---|---|---|
| OCF₂H | | | [fluoro-chromane-indane tricyclic] | | [1,3-dioxane] | CH₂=CH— |
| OCF₃ | | | [fluoro-chromane-indane tricyclic] | | [1,3-dioxane] | C₃H₇ |
| OCF₃ | | | [fluoro-chromane-indane tricyclic] | | [1,3-dioxane] | C₅H₁₁ |
| OCF₃ | | | [fluoro-chromane-indane tricyclic] | | [1,3-dioxane] | CH₂=CH— |
| CN | | | [fluoro-chromane-indane tricyclic] | | [1,3-dioxane] | C₃H₇ |
| CN | | | [fluoro-chromane-indane tricyclic] | | [1,3-dioxane] | C₅H₁₁ |
| CN | | | [fluoro-chromane-indane tricyclic] | | [1,3-dioxane] | CH₂=CH— |
| F | | | [difluoro-chromane-indane tricyclic] | | [1,3-dioxane] | C₃H₇ |
| F | | | [difluoro-chromane-indane tricyclic] | | [1,3-dioxane] | C₅H₁₁ |

-continued

| R¹ | A¹ | Z¹ | Tricyclic radical | Z³ | A³ | R² |
|---|---|---|---|---|---|---|
| F | | | (tricyclic with F) | | (1,3-dioxane) | CH₂=CH— |
| Cl | | | (tricyclic with F) | | (1,3-dioxane) | C₃H₇ |
| Cl | | | (tricyclic with F) | | (1,3-dioxane) | C₅H₁₁ |
| Cl | | | (tricyclic with F) | | (1,3-dioxane) | CH₂=CH— |
| CF₃ | | | (tricyclic with F) | | (1,3-dioxane) | C₃H₇ |
| CF₃ | | | (tricyclic with F) | | (1,3-dioxane) | C₅H₁₁ |
| CF₃ | | | (tricyclic with F) | | (1,3-dioxane) | CH₂=CH— |
| OCF₂H | | | (tricyclic with F) | | (1,3-dioxane) | C₃H₇ |
| OCF₂H | | | (tricyclic with F) | | (1,3-dioxane) | C₅H₁₁ |
| OCF₂H | | | (tricyclic with F) | | (1,3-dioxane) | CH₂=CH— |

-continued

| R¹ | A¹ | Z¹ | Tricyclic radical | Z³ | A³ | R² |
|---|---|---|---|---|---|---|
| OCF₃ | | | | | | C₃H₇ |
| OCF₃ | | | | | | C₅H₁₁ |
| OCF₃ | | | | | | CH₂=CH— |
| CN | | | | | | C₃H₇ |
| CN | | | | | | C₅H₁₁ |
| CN | | | | | | CH₂=CH— |
| F | | | | | | C₃H₇ |
| F | | | | | | C₅H₁₁ |
| F | | | | | | CH₂=CH— |
| Cl | | | | | | C₃H₇ |

-continued

| R¹ | A¹ | Z¹ | Tricyclic radical | Z³ | A³ | R² |
|---|---|---|---|---|---|---|
| Cl | | | (tricyclic, F at two positions) | | (1,3-dioxane) | C₅H₁₁ |
| Cl | | | (tricyclic, F at two positions) | | (1,3-dioxane) | CH₂=CH— |
| CF₃ | | | (tricyclic, F at two positions) | | (1,3-dioxane) | C₃H₇ |
| CF₃ | | | (tricyclic, F at two positions) | | (1,3-dioxane) | C₅H₁₁ |
| CF₃ | | | (tricyclic, F at two positions) | | (1,3-dioxane) | CH₂=CH— |
| OCF₂H | | | (tricyclic, F at two positions) | | (1,3-dioxane) | C₃H₇ |
| OCF₂H | | | (tricyclic, F at two positions) | | (1,3-dioxane) | C₅H₁₁ |
| OCF₂H | | | (tricyclic, F at two positions) | | (1,3-dioxane) | CH₂=CH— |

-continued
| R¹ | A¹ | Z¹ | Tricyclic radical | Z³ | A³ | R² |
|---|---|---|---|---|---|---|
| OCF₃ | | | 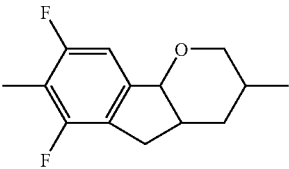 | | 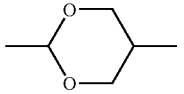 | C₃H₇ |
| OCF₃ | | | 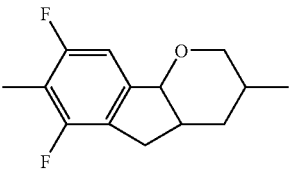 | |  | C₅H₁₁ |
| OCF₃ | | | 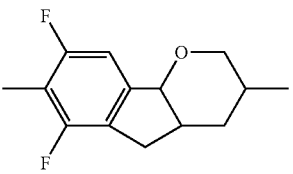 | | 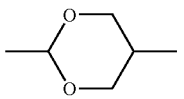 | CH₂=CH— |
| CN | | | 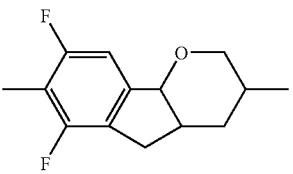 | | 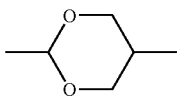 | C₃H₇ |
| CN | | | 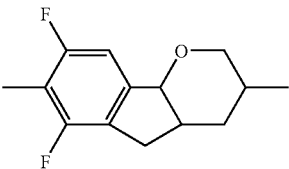 | | 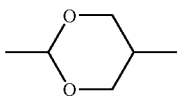 | C₅H₁₁ |
| CN | | | 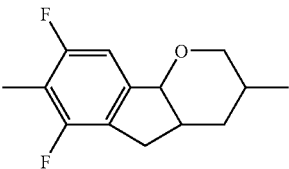 | | 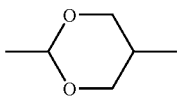 | CH₂=CH— |
| F | | | 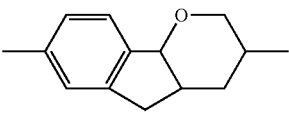 | | | C₃H₇ |
| F | | | 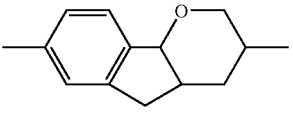 | | | C₅H₁₁ |
| F | | | 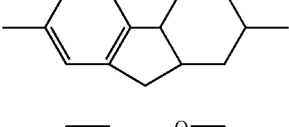 | | | CH₂=CH— |
| Cl | | | 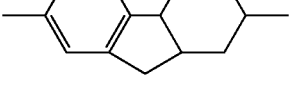 | | | C₃H₇ |

-continued
| R¹ | A¹ | Z¹ | Tricyclic radical | Z³ | A³ | R² |
|---|---|---|---|---|---|---|
| Cl | | | 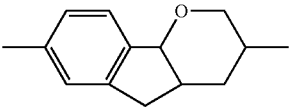 | | | C₅H₁₁ |
| Cl | | | 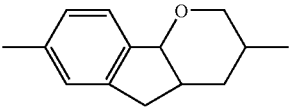 | | | CH₂=CH— |
| CF₃ | | | 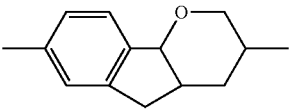 | | | C₃H₇ |
| CF₃ | | | 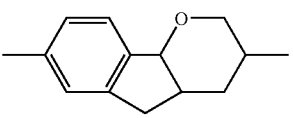 | | | C₅H₁₁ |
| CF₃ | | | 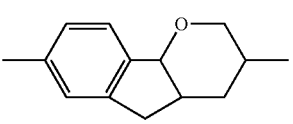 | | | CH₂=CH— |
| OCF₂H | | | 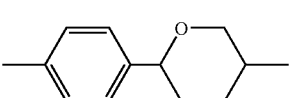 | | | C₃H₇ |
| OCF₂H | | | 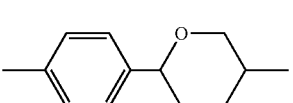 | | | C₅H₁₁ |
| OCF₂H | | | 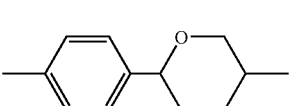 | | | CH₂=CH— |
| OCF₃ | | | 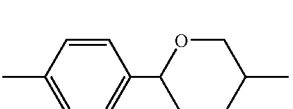 | | | C₃H₇ |
| OCF₃ | | | 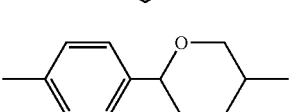 | | | C₅H₁₁ |
| OCF₃ | | | 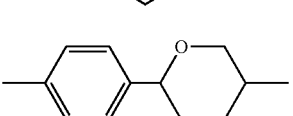 | | | CH₂=CH— |
| CN | | | 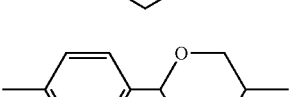 | | | C₃H₇ |

-continued

| R¹ | A¹ | Z¹ | Tricyclic radical | Z³ | A³ | R² |
|---|---|---|---|---|---|---|
| CN | | | | | | C₅H₁₁ |
| CN | | | | | | CH₂=CH— |
| F | | | | | | C₃H₇ |
| F | | | | | | C₅H₁₁ |
| F | | | | | | CH₂=CH— |
| Cl | | | | | | C₃H₇ |
| Cl | | | | | | C₅H₁₁ |
| Cl | | | | | | CH₂=CH— |
| CF₃ | | | | | | C₃H₇ |
| CF₃ | | | | | | C₅H₁₁ |

-continued
| R¹ | A¹ | Z¹ | Tricyclic radical | Z³ | A³ | R² |
|---|---|---|---|---|---|---|
| CF₃ | | | 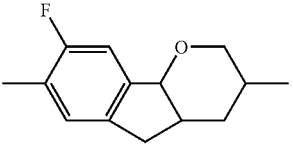 | | | CH₂=CH— |
| OCF₂H | | | 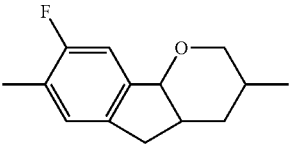 | | | C₃H₇ |
| OCF₂H | | | 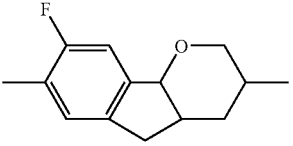 | | | C₅H₁₁ |
| OCF₂H | | | 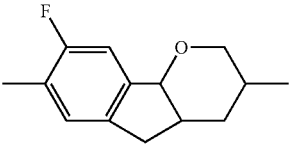 | | | CH₂=CH— |
| OCF₃ | | | 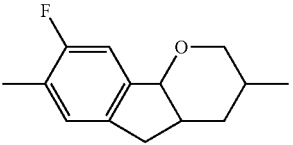 | | | C₃H₇ |
| OCF₃ | | | 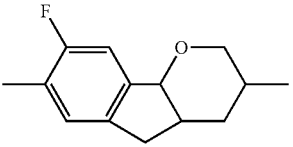 | | | C₅H₁₁ |
| OCF₃ | | | 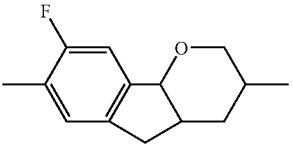 | | | CH₂=CH— |
| CN | | | 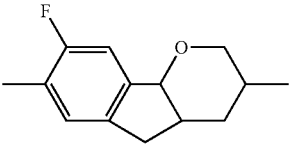 | | | C₃H₇ |
| CN | | | 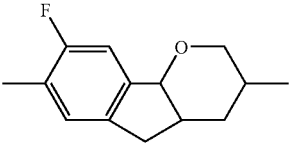 | | | C₅H₁₁ |

-continued
| R¹ | A¹ | Z¹ | Tricyclic radical | Z³ | A³ | R² |
|---|---|---|---|---|---|---|
| CN | | | 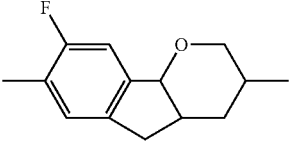 | | | CH₂=CH— |
| F | | | 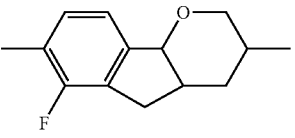 | | | C₃H₇ |
| F | | | 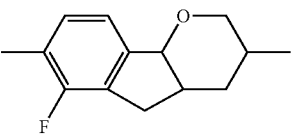 | | | C₅H₁₁ |
| F | | | 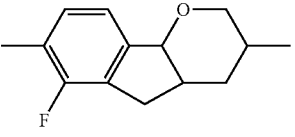 | | | CH₂=CH— |
| Cl | | | 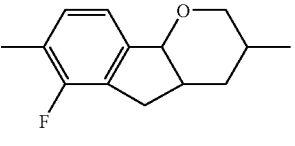 | | | C₃H₇ |
| Cl | | | 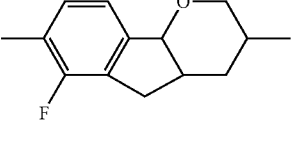 | | | C₅H₁₁ |
| Cl | | | 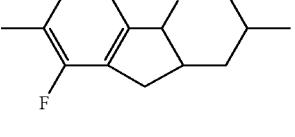 | | | CH₂=CH— |
| CF₃ | | | 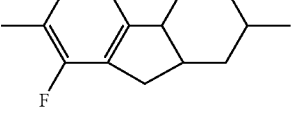 | | | C₃H₇ |
| CF₃ | | | 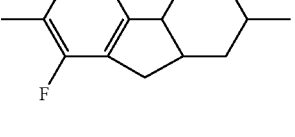 | | | C₅H₁₁ |
| CF₃ | | | 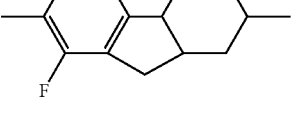 | | | CH₂=CH— |

-continued

| R¹ | A¹ | Z¹ | Tricyclic radical | Z³ | A³ | R² |
|---|---|---|---|---|---|---|
| OCF₂H | | | | | | C₃H₇ |
| OCF₂H | | | | | | C₅H₁₁ |
| OCF₂H | | | | | | CH₂=CH— |
| OCF₃ | | | | | | C₃H₇ |
| OCF₃ | | | | | | C₅H₁₁ |
| OCF₃ | | | | | | CH₂=CH— |
| CN | | | | | | C₃H₇ |
| CN | | | | | | C₅H₁₁ |
| CN | | | | | | CH₂=CH— |
| F | | | | | | C₃H₇ |

-continued

| R¹ | A¹ | Z¹ | Tricyclic radical | Z³ | A³ | R² |
|---|---|---|---|---|---|---|
| F | | | | | | C₅H₁₁ |
| F | | | | | | CH₂=CH— |
| Cl | | | | | | C₃H₇ |
| Cl | | | | | | C₅H₁₁ |
| Cl | | | | | | CH₂=CH— |
| CF₃ | | | | | | C₃H₇ |
| CF₃ | | | | | | C₅H₁₁ |
| CF₃ | | | | | | CH₂=CH— |

-continued
| R¹ | A¹ | Z¹ | Tricyclic radical | Z³ | A³ | R² |
|---|---|---|---|---|---|---|
| OCF₂H | | | 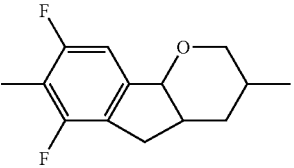 | | | C₃H₇ |
| OCF₂H | | | 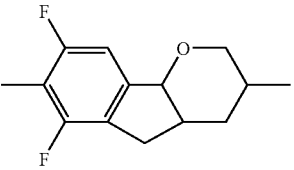 | | | C₅H₁₁ |
| OCF₂H | | | 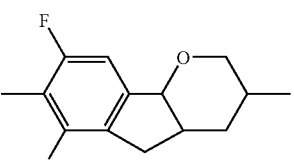 | | | CH₂=CH— |
| OCF₃ | | | 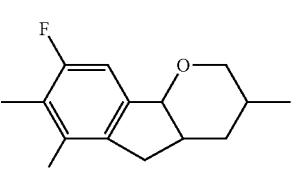 | | | C₃H₇ |
| OCF₃ | | | 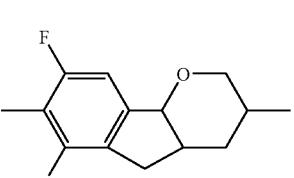 | | | C₅H₁₁ |
| OCF₃ | | | 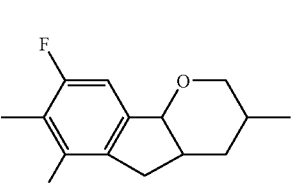 | | | CH₂=CH— |
| CN | | | 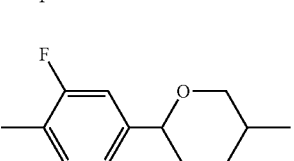 | | | C₃H₇ |
| CN | | | 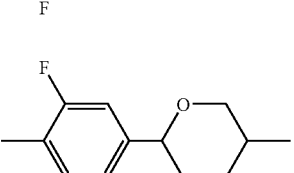 | | | C₅H₁₁ |

-continued
| R¹ | A¹ | Z¹ | Tricyclic radical | Z³ | A³ | R² |
|---|---|---|---|---|---|---|
| CN | | | 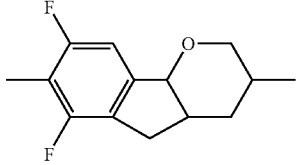 | | | $CH_2=CH-$ |
| F | 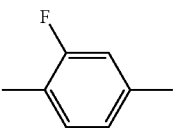 | | 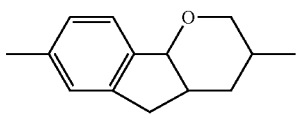 | | | $C_3H_7$ |
| F | 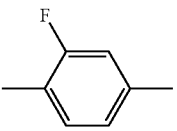 | | 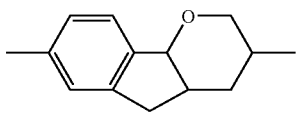 | | | $C_5H_{11}$ |
| F | 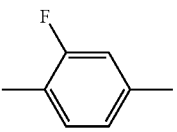 | | 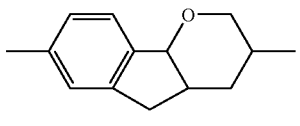 | | | $CH_2=CH-$ |
| Cl | 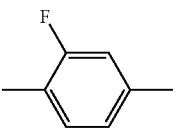 | | 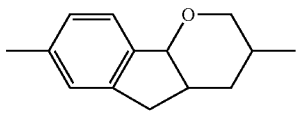 | | | $C_3H_7$ |
| Cl | 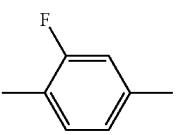 | | 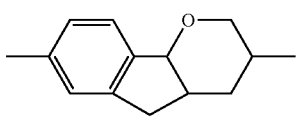 | | | $C_5H_{11}$ |
| Cl | 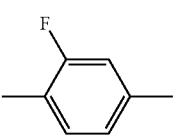 | | 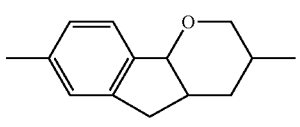 | | | $CH_2=CH-$ |
| $CF_3$ | 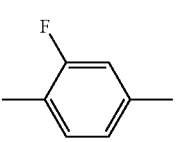 | | 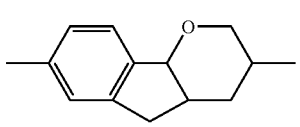 | | | $C_3H_7$ |
| $CF_3$ | 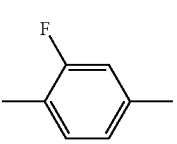 | | 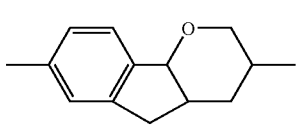 | | | $C_5H_{11}$ |
| $CF_3$ | 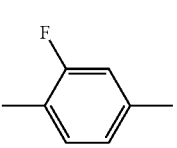 | | 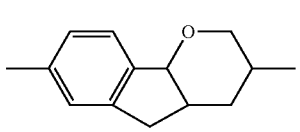 | | | $CH_2=CH-$ |
| $OCF_2H$ | 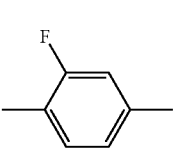 | | 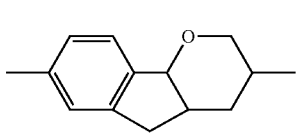 | | | $C_3H_7$ |

-continued

| R¹ | A¹ | Z¹ | Tricyclic radical | Z³ | A³ | R² |
|---|---|---|---|---|---|---|
| OCF₂H | F-phenyl | | benzopyran-indane | | | C₅H₁₁ |
| OCF₂H | F-phenyl | | benzopyran-indane | | | CH₂=CH— |
| OCF₃ | F-phenyl | | benzopyran-indane | | | C₃H₇ |
| OCF₃ | F-phenyl | | benzopyran-indane | | | C₅H₁₁ |
| OCF₃ | F-phenyl | | benzopyran-indane | | | CH₂=CH— |
| CN | F-phenyl | | benzopyran-indane | | | C₃H₇ |
| CN | F-phenyl | | benzopyran-indane | | | C₅H₁₁ |
| CN | F-phenyl | | benzopyran-indane | | | CH₂=CH— |
| F | F-phenyl | | F-benzopyran-indane | | | C₃H₇ |
| F | F-phenyl | | F-benzopyran-indane | | | C₅H₁₁ |
| F | F-phenyl | | F-benzopyran-indane | | | CH₂=CH— |

-continued

| R¹ | A¹ | Z¹ | Tricyclic radical | Z³ | A³ | R² |
|---|---|---|---|---|---|---|
| Cl | 2-fluoro-1,4-phenylene | — | fluoro-substituted chromane-indane tricyclic | | | C₃H₇ |

| R¹ | A¹ | Z¹ | Tricyclic radical | Z³ | A³ | R² |
|---|---|---|---|---|---|---|
| Cl | 2-fluoro-1,4-phenylene | — | fluoro-substituted chromane-indane tricyclic | | | C₅H₁₁ |
| Cl | 2-fluoro-1,4-phenylene | — | fluoro-substituted chromane-indane tricyclic | | | CH₂=CH— |
| CF₃ | 2-fluoro-1,4-phenylene | — | fluoro-substituted chromane-indane tricyclic | | | C₃H₇ |
| CF₃ | 2-fluoro-1,4-phenylene | — | fluoro-substituted chromane-indane tricyclic | | | C₅H₁₁ |
| CF₃ | 2-fluoro-1,4-phenylene | — | fluoro-substituted chromane-indane tricyclic | | | CH₂=CH— |
| OCF₂H | 2-fluoro-1,4-phenylene | — | fluoro-substituted chromane-indane tricyclic | | | C₃H₇ |
| OCF₂H | 2-fluoro-1,4-phenylene | — | fluoro-substituted chromane-indane tricyclic | | | C₅H₁₁ |
| OCF₂H | 2-fluoro-1,4-phenylene | — | fluoro-substituted chromane-indane tricyclic | | | CH₂=CH— |

-continued

| R¹ | A¹ | Z¹ | Tricyclic radical | Z³ | A³ | R² |
|---|---|---|---|---|---|---|
| OCF₃ | (2-F-phenylene) | | (fluoro-chromane-fused indane) | | | C₃H₇ |
| OCF₃ | (2-F-phenylene) | | (fluoro-chromane-fused indane) | | | C₅H₁₁ |
| OCF₃ | (2-F-phenylene) | | (fluoro-chromane-fused indane) | | | CH₂=CH— |
| CN | (2-F-phenylene) | | (fluoro-chromane-fused indane) | | | C₃H₇ |
| CN | (2-F-phenylene) | | (fluoro-chromane-fused indane) | | | C₅H₁₁ |
| CN | (2-F-phenylene) | | (fluoro-chromane-fused indane) | | | CH₂=CH— |
| F | (2-F-phenylene) | | (fluoro-chromane-fused indane) | | | C₃H₇ |
| F | (2-F-phenylene) | | (fluoro-chromane-fused indane) | | | C₅H₁₁ |
| F | (2-F-phenylene) | | (fluoro-chromane-fused indane) | | | CH₂=CH— |
| Cl | (2-F-phenylene) | | (fluoro-chromane-fused indane) | | | C₃H₇ |

-continued
| R¹ | A¹ | Z¹ | Tricyclic radical | Z³ | A³ | R² |
|---|---|---|---|---|---|---|
| Cl | 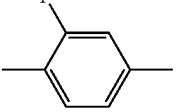 | | 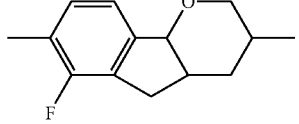 | | | $C_5H_{11}$ |
| Cl | 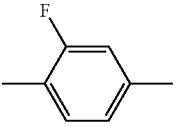 | | 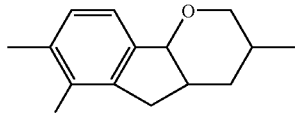 | | | $CH_2{=}CH{-}$ |
| $CF_3$ | 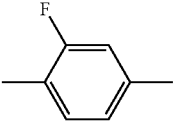 | | 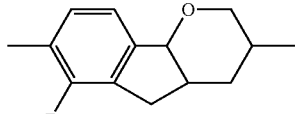 | | | $C_3H_7$ |
| $CF_3$ | 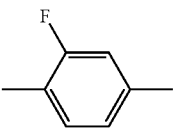 | | 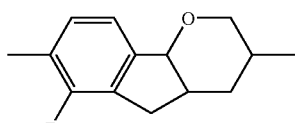 | | | $C_5H_{11}$ |
| $CF_3$ | 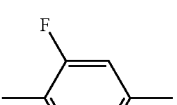 | | 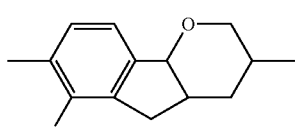 | | | $CH_2{=}CH{-}$ |
| $OCF_2H$ | 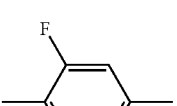 | | 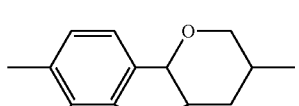 | | | $C_3H_7$ |
| $OCF_2H$ | 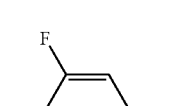 | | 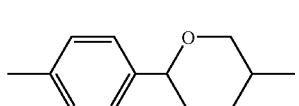 | | | $C_5H_{11}$ |
| $OCF_2H$ | 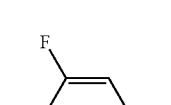 | | 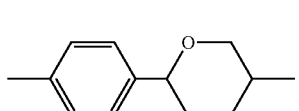 | | | $CH_2{=}CH{-}$ |
| $OCF_3$ | 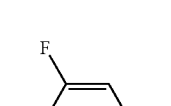 | | 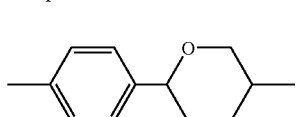 | | | $C_3H_7$ |
| $OCF_3$ | 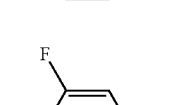 | | 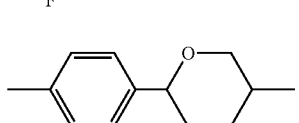 | | | $C_5H_{11}$ |

-continued

| R¹ | A¹ | Z¹ | Tricyclic radical | Z³ | A³ | R² |
|---|---|---|---|---|---|---|
| OCF₃ | | | | | | CH₂=CH— |
| CN | | | | | | C₃H₇ |
| CN | | | | | | C₅H₁₁ |
| CN | | | | | | CH₂=CH— |
| F | | | | | | C₃H₇ |
| F | | | | | | C₅H₁₁ |
| F | | | | | | CH₂=CH— |
| Cl | | | | | | C₃H₇ |
| Cl | | | | | | C₅H₁₁ |

-continued

| R¹ | A¹ | Z¹ | Tricyclic radical | Z³ | A³ | R² |
|---|---|---|---|---|---|---|
| Cl | (2-F-phenyl) | | (difluoro tricyclic) | | | CH₂=CH— |
| CF₃ | (2-F-phenyl) | | (difluoro tricyclic) | | | C₃H₇ |
| CF₃ | (2-F-phenyl) | | (difluoro tricyclic) | | | C₅H₁₁ |
| CF₃ | (2-F-phenyl) | | (difluoro tricyclic) | | | CH₂=CH— |
| OCF₂H | (2-F-phenyl) | | (difluoro tricyclic) | | | C₃H₇ |
| OCF₂H | (2-F-phenyl) | | (difluoro tricyclic) | | | C₅H₁₁ |
| OCF₂H | (2-F-phenyl) | | (difluoro tricyclic) | | | CH₂=CH— |
| OCF₃ | (2-F-phenyl) | | (difluoro tricyclic) | | | C₃H₇ |

-continued

| R¹ | A¹ | Z¹ | Tricyclic radical | Z³ | A³ | R² |
|---|---|---|---|---|---|---|
| OCF₃ | (2-F phenyl) | | (difluoro tricyclic) | | | C₅H₁₁ |
| OCF₃ | (2-F phenyl) | | (difluoro tricyclic) | | | CH₂=CH— |
| CN | (2-F phenyl) | | (difluoro tricyclic) | | | C₃H₇ |
| CN | (2-F phenyl) | | (difluoro tricyclic) | | | C₅H₁₁ |
| CN | (2-F phenyl) | | (difluoro tricyclic) | | | CH₂=CH— |
| F | (2,6-diF phenyl) | | (tricyclic) | | | C₃H₇ |
| F | (2,6-diF phenyl) | | (tricyclic) | | | C₅H₁₁ |
| F | (2,6-diF phenyl) | | (tricyclic) | | | CH₂=CH— |

-continued
| R¹ | A¹ | Z¹ | Tricyclic radical | Z³ | A³ | R² |
|---|---|---|---|---|---|---|
| Cl | 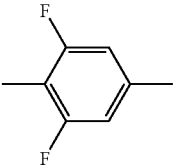 | | 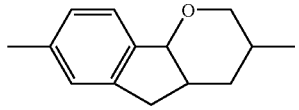 | | | C₃H₇ |
| Cl | 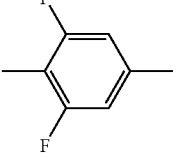 | | 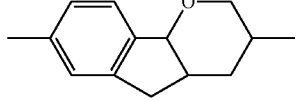 | | | C₅H₁₁ |
| Cl | 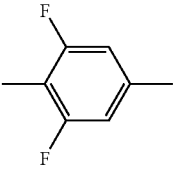 | | 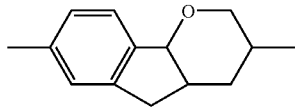 | | | CH₂=CH— |
| CF₃ | 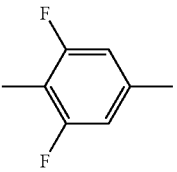 | | 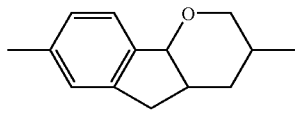 | | | C₃H₇ |
| CF₃ | 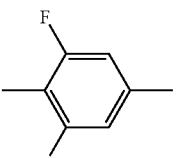 | | 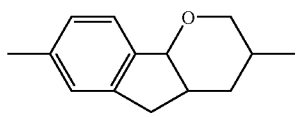 | | | C₅H₁₁ |
| CF₃ | 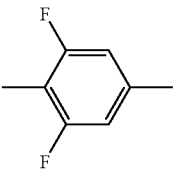 | | 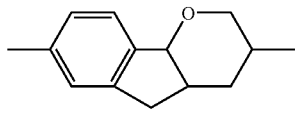 | | | CH₂=CH— |
| OCF₂H | 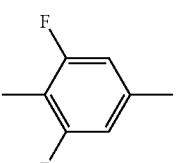 | | 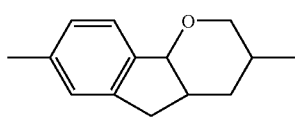 | | | C₃H₇ |
| OCF₂H | 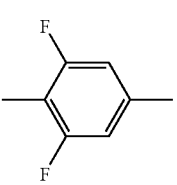 | | 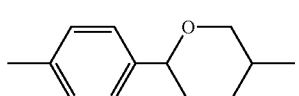 | | | C₅H₁₁ |

-continued
| R¹ | A¹ | Z¹ | Tricyclic radical | Z³ | A³ | R² |
|---|---|---|---|---|---|---|
| OCF₂H | 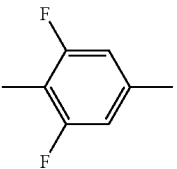 | | 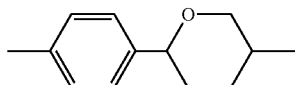 | | | CH₂=CH— |
| OCF₃ | 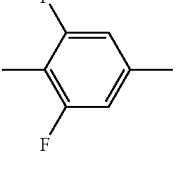 | | 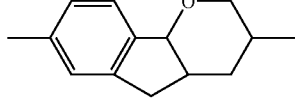 | | | C₃H₇ |
| OCF₃ | 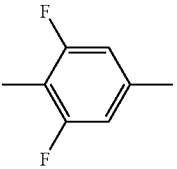 | | 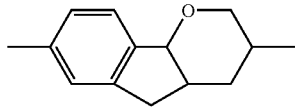 | | | C₅H₁₁ |
| OCF₃ | 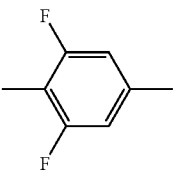 | | 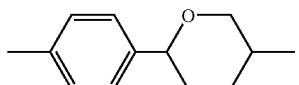 | | | CH₂=CH— |
| CN | 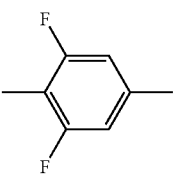 | | 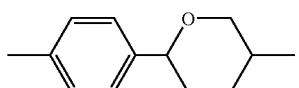 | | | C₃H₇ |
| CN | 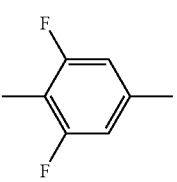 | | 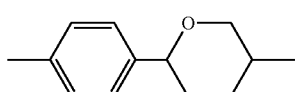 | | | C₅H₁₁ |
| CN | 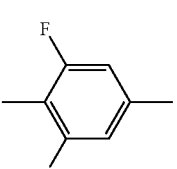 | | 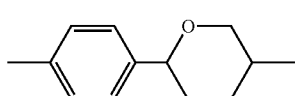 | | | CH₂=CH— |
| F | 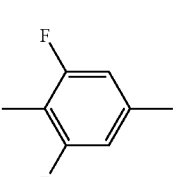 | | 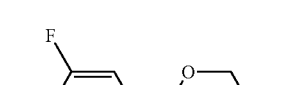 | | | C₃H₇ |

-continued
| R¹ | A¹ | Z¹ | Tricyclic radical | Z³ | A³ | R² |
|---|---|---|---|---|---|---|
| F | 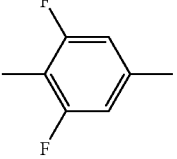 | | 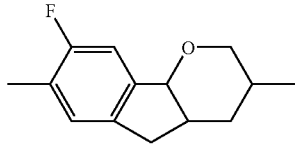 | | | C₅H₁₁ |
| F | 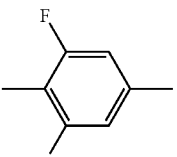 | | 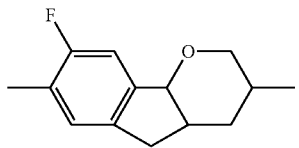 | | | CH₂=CH— |
| Cl | 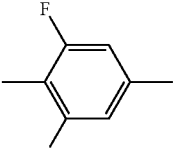 | | 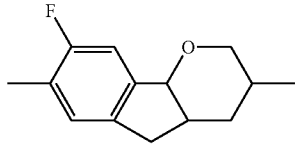 | | | C₃H₇ |
| Cl | 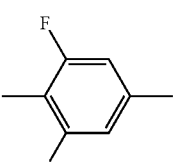 | | 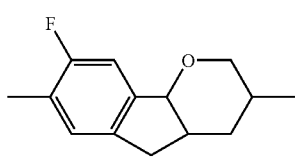 | | | C₅H₁₁ |
| Cl | 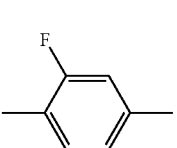 | | 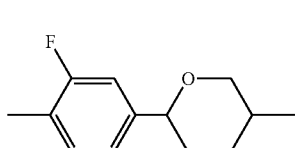 | | | CH₂=CH— |
| CF₃ | 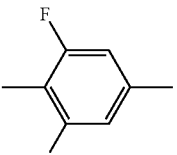 | | 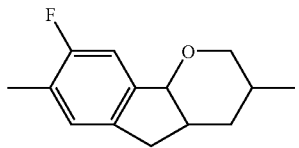 | | | C₃H₇ |
| CF₃ | 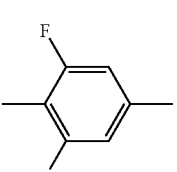 | | 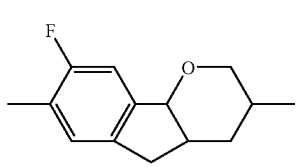 | | | C₅H₁₁ |
| CF₃ | 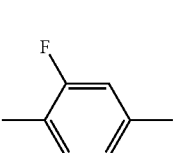 | | 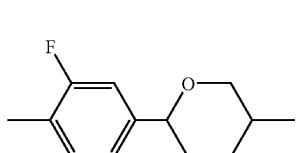 | | | CH₂=CH— |

-continued
| R¹ | A¹ | Z¹ | Tricyclic radical | Z³ | A³ | R² |
|---|---|---|---|---|---|---|
| OCF₂H | 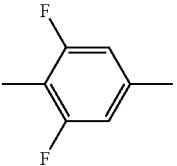 | | 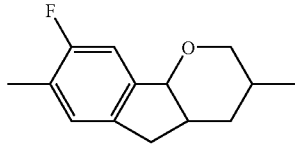 | | | C₃H₇ |
| OCF₂H | 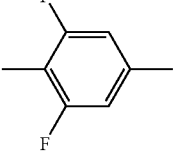 | | 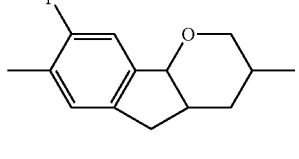 | | | C₅H₁₁ |
| OCF₂H | 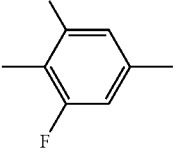 | | 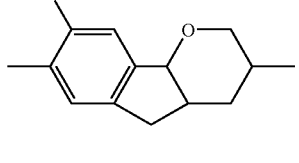 | | | CH₂=CH— |
| OCF₃ | 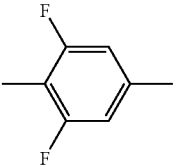 | | 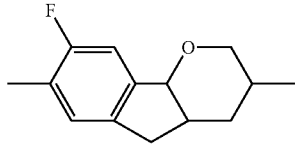 | | | C₃H₇ |
| OCF₃ | 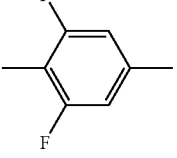 | | 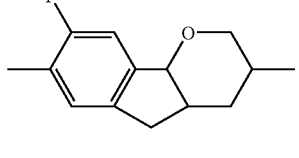 | | | C₅H₁₁ |
| OCF₃ | 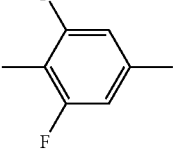 | | 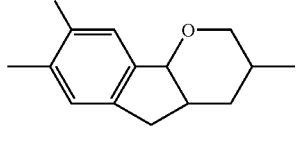 | | | CH₂=CH— |
| CN | 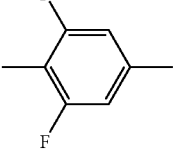 | | 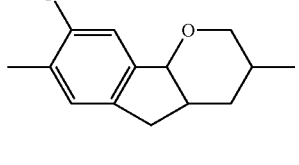 | | | C₃H₇ |
| CN | 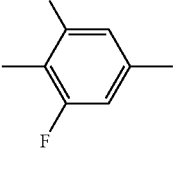 | | 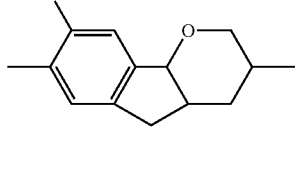 | | | C₅H₁₁ |

-continued
| R¹ | A¹ | Z¹ | Tricyclic radical | Z³ | A³ | R² |
|---|---|---|---|---|---|---|
| CN | 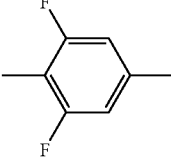 | | 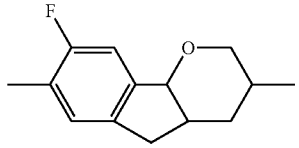 | | | CH$_2$=CH— |
| F | 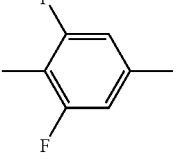 | | 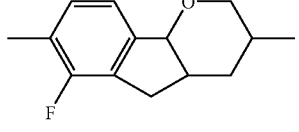 | | | C$_3$H$_7$ |
| F | 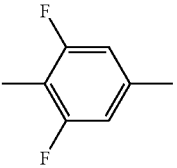 | | 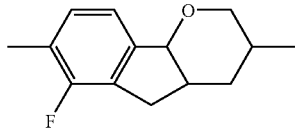 | | | C$_5$H$_{11}$ |
| F | 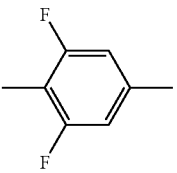 | | 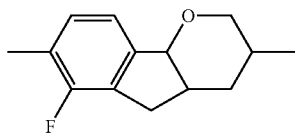 | | | CH$_2$=CH— |
| Cl | 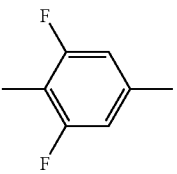 | | 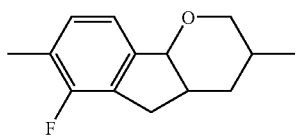 | | | C$_3$H$_7$ |
| Cl | 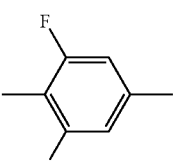 | | 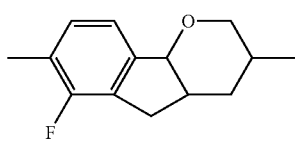 | | | C$_5$H$_{11}$ |
| Cl | 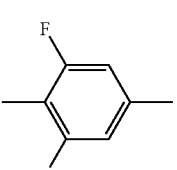 | | 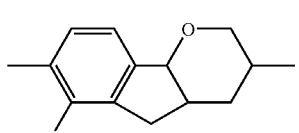 | | | CH$_2$=CH— |
| CF$_3$ | 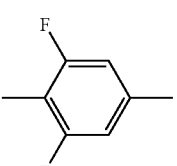 | | 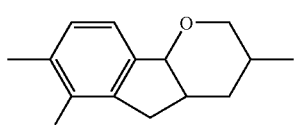 | | | C$_3$H$_7$ |

-continued

| R¹ | A¹ | Z¹ | Tricyclic radical | Z³ | A³ | R² |
|---|---|---|---|---|---|---|
| CF₃ | 3,5-difluorophenyl | | fluoro-chromane-indane tricyclic | | | C₅H₁₁ |
| CF₃ | 3,5-difluorophenyl | | fluoro-chromane-indane tricyclic | | | CH₂=CH— |
| OCF₂H | 3,5-difluorophenyl | | fluoro-chromane-indane tricyclic | | | C₃H₇ |
| OCF₂H | 3,5-difluorophenyl | | fluoro-chromane-indane tricyclic | | | C₅H₁₁ |
| OCF₂H | 3,5-difluorophenyl | | fluoro-chromane-indane tricyclic | | | CH₂=CH— |
| OCF₃ | 3,5-difluorophenyl | | fluoro-chromane-indane tricyclic | | | C₃H₇ |
| OCF₃ | 3,5-difluorophenyl | | fluoro-chromane-indane tricyclic | | | C₅H₁₁ |
| OCF₃ | 3,5-difluorophenyl | | fluoro-chromane-indane tricyclic | | | CH₂=CH— |

-continued
| R¹ | A¹ | Z¹ | Tricyclic radical | Z³ | A³ | R² |
|---|---|---|---|---|---|---|
| CN | 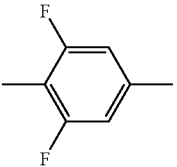 | | 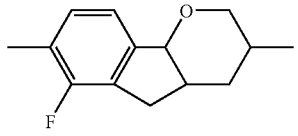 | | | $C_3H_7$ |
| CN | 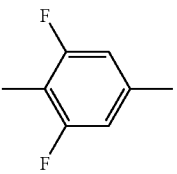 | | 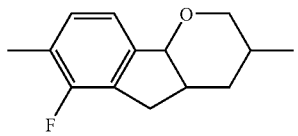 | | | $C_5H_{11}$ |
| CN | 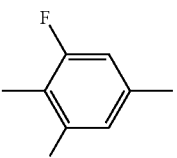 | | 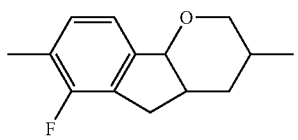 | | | $CH_2=CH-$ |
| F | 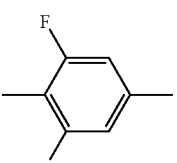 | | 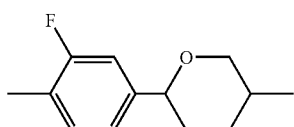 | | | $C_3H_7$ |
| F | 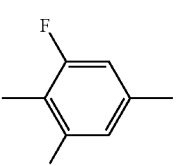 | | 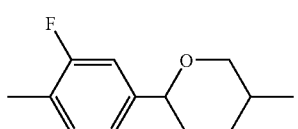 | | | $C_5H_{11}$ |
| F | 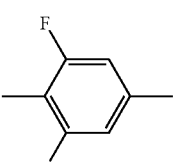 | | 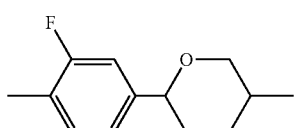 | | | $CH_2=CH-$ |
| Cl | 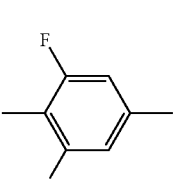 | | 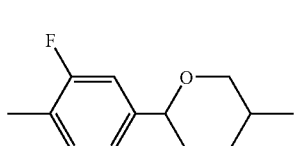 | | | $C_3H_7$ |
| Cl | 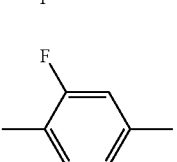 | | 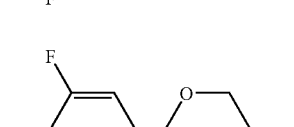 | | | $C_5H_{11}$ |

-continued
| R¹ | A¹ | Z¹ | Tricyclic radical | Z³ | A³ | R² |
|---|---|---|---|---|---|---|
| Cl | 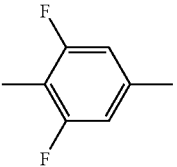 | | 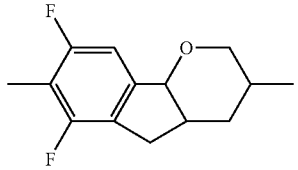 | | | CH₂=CH— |
| CF₃ | 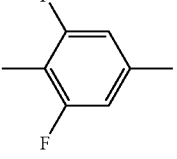 | | 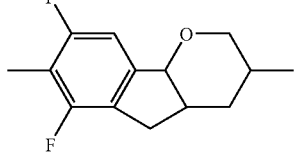 | | | C₃H₇ |
| CF₃ | 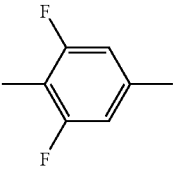 | | 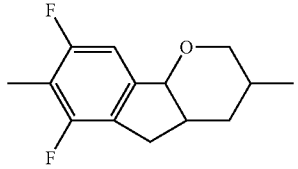 | | | C₅H₁₁ |
| CF₃ | 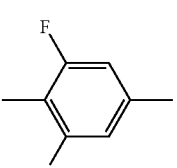 | | 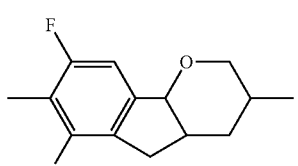 | | | CH₂=CH— |
| OCF₂H | 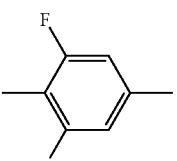 | | 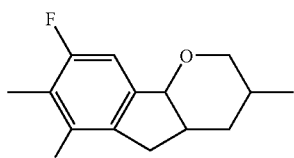 | | | C₃H₇ |
| OCF₂H | 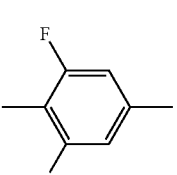 | | 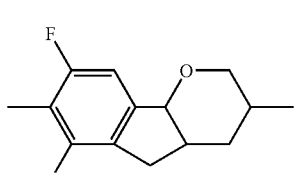 | | | C₅H₁₁ |
| OCF₂H | 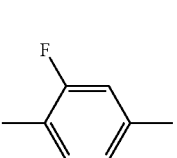 | | 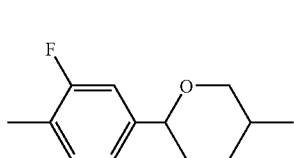 | | | CH₂=CH— |
| OCF₃ | 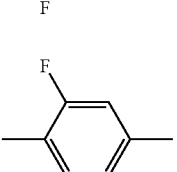 | | 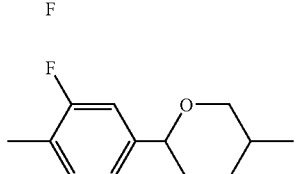 | | | C₃H₇ |

-continued

| R¹ | A¹ | Z¹ | Tricyclic radical | Z³ | A³ | R² |
|---|---|---|---|---|---|---|
| OCF₃ | 3,5-difluorophenyl | | fluorinated tricyclic chromane | | | C₅H₁₁ |
| OCF₃ | 3,5-difluorophenyl | | fluorinated tricyclic chromane | | | CH₂=CH— |
| CN | 3,5-difluorophenyl | | fluorinated tricyclic chromane | | | C₃H₇ |
| CN | 3,5-difluorophenyl | | fluorinated tricyclic chromane | | | C₅H₁₁ |
| CN | 3,5-difluorophenyl | | fluorinated tricyclic chromane | | | CH₂=CH— |
| F | 3,5-difluorophenyl | OCF₂ | tricyclic chromane | | | C₃H₇ |
| F | 3,5-difluorophenyl | OCF₂ | tricyclic chromane | | | C₅H₁₁ |
| F | 3,5-difluorophenyl | OCF₂ | tricyclic chromane | | | CH₂=CH— |

-continued
| R¹ | A¹ | Z¹ | Tricyclic radical | Z³ | A³ | R² |
|---|---|---|---|---|---|---|
| Cl | 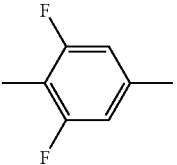 | OCF₂ | 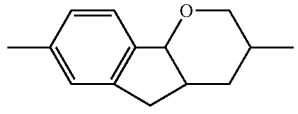 | | | C₃H₇ |
| Cl | 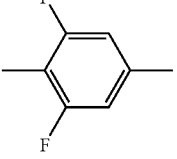 | OCF₂ | 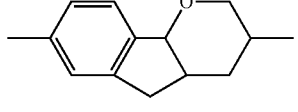 | | | C₅H₁₁ |
| Cl | 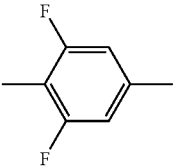 | OCF₂ | 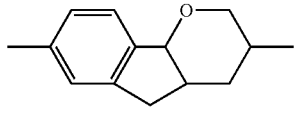 | | | CH₂=CH— |
| CF₃ | 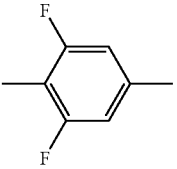 | OCF₂ | 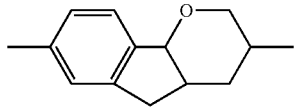 | | | C₃H₇ |
| CF₃ | 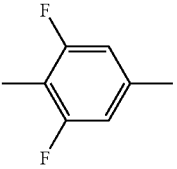 | OCF₂ | 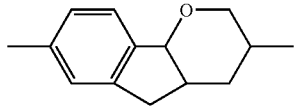 | | | C₅H₁₁ |
| CF₃ | 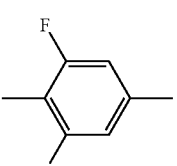 | OCF₂ | 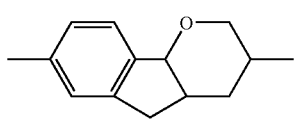 | | | CH₂=CH— |
| OCF₂H | 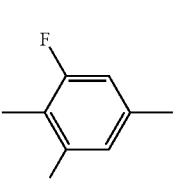 | OCF₂ | 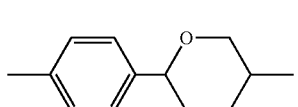 | | | C₃H₇ |
| OCF₂H | 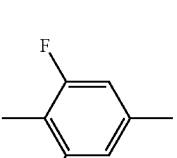 | OCF₂ | 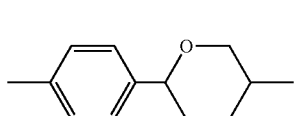 | | | C₅H₁₁ |

-continued
| R¹ | A¹ | Z¹ | Tricyclic radical | Z³ | A³ | R² |
|---|---|---|---|---|---|---|
| OCF₂H | 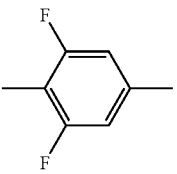 | OCF₂ | 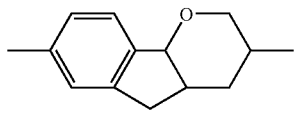 | | | CH₂=CH— |
| OCF₃ | 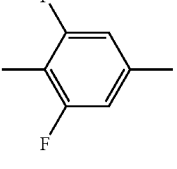 | OCF₂ | 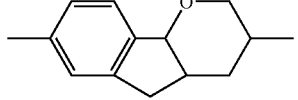 | | | C₃H₇ |
| OCF₃ | 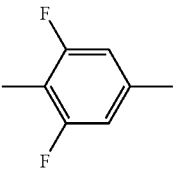 | OCF₂ | 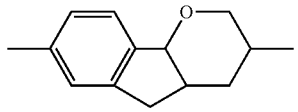 | | | C₅H₁₁ |
| OCF₃ | 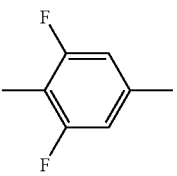 | OCF₂ | 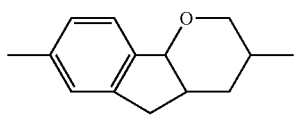 | | | CH₂=CH— |
| CN | 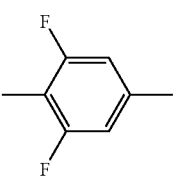 | OCF₂ | 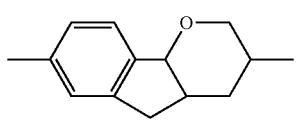 | | | C₃H₇ |
| CN | 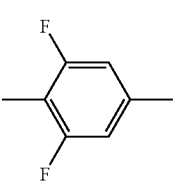 | OCF₂ | 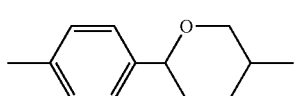 | | | C₅H₁₁ |
| CN | 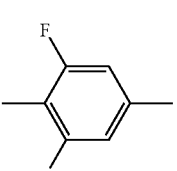 | OCF₂ | 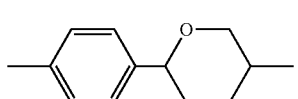 | | | CH₂=CH— |
| F | 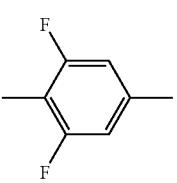 | OCF₂ | 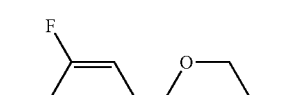 | | | C₃H₇ |

-continued

| R¹ | A¹ | Z¹ | Tricyclic radical | Z³ | A³ | R² |
|---|---|---|---|---|---|---|
| F | 3,5-difluorophenyl | OCF₂ | fluoro-chromene-indane tricyclic | | | C₅H₁₁ |
| F | 3,5-difluorophenyl | OCF₂ | fluoro-chromene-indane tricyclic | | | CH₂=CH— |
| Cl | 3,5-difluorophenyl | OCF₂ | fluoro-chromene-indane tricyclic | | | C₃H₇ |
| Cl | 3,5-difluorophenyl | OCF₂ | fluoro-chromene-indane tricyclic | | | C₅H₁₁ |
| Cl | 3,5-difluorophenyl | OCF₂ | fluoro-chromene-indane tricyclic | | | CH₂=CH— |
| CF₃ | 3,5-difluorophenyl | OCF₂ | fluoro-chromene-indane tricyclic | | | C₃H₇ |
| CF₃ | 3,5-difluorophenyl | OCF₂ | fluoro-chromene-indane tricyclic | | | C₅H₁₁ |
| CF₃ | 3,5-difluorophenyl | OCF₂ | fluoro-chromene-indane tricyclic | | | CH₂=CH— |

-continued

| R¹ | A¹ | Z¹ | Tricyclic radical | Z³ | A³ | R² |
|---|---|---|---|---|---|---|
| OCF₂H | F,F-phenyl | OCF₂ | F-tricyclic | | | C₃H₇ |
| OCF₂H | F,F-phenyl | OCF₂ | F-tricyclic | | | C₅H₁₁ |
| OCF₂H | F,F-phenyl | OCF₂ | F-tricyclic | | | CH₂=CH— |
| OCF₃ | F,F-phenyl | OCF₂ | F-tricyclic | | | C₃H₇ |
| OCF₃ | F,F-phenyl | OCF₂ | F-tricyclic | | | C₅H₁₁ |
| OCF₃ | F,F-phenyl | OCF₂ | F-tricyclic | | | CH₂=CH— |
| CN | F,F-phenyl | OCF₂ | F-tricyclic | | | C₃H₇ |
| CN | F,F-phenyl | OCF₂ | F-tricyclic | | | C₅H₁₁ |

-continued
| R¹ | A¹ | Z¹ | Tricyclic radical | Z³ | A³ | R² |
|---|---|---|---|---|---|---|
| CN | 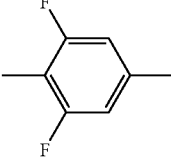 | OCF₂ | 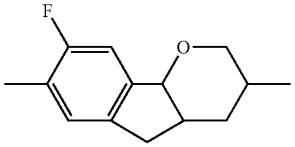 | | | CH₂=CH— |
| F | 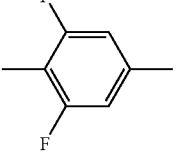 | OCF₂ | 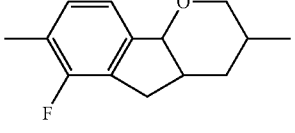 | | | C₃H₇ |
| F | 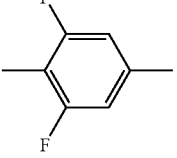 | OCF₂ | 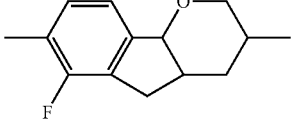 | | | C₅H₁₁ |
| F | 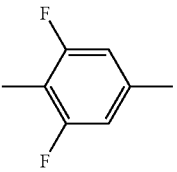 | OCF₂ | 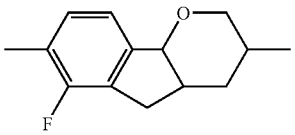 | | | CH₂=CH— |
| Cl | 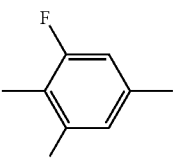 | OCF₂ | 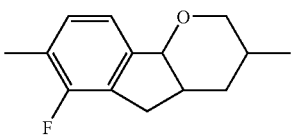 | | | C₃H₇ |
| Cl | 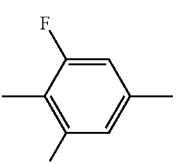 | OCF₂ | 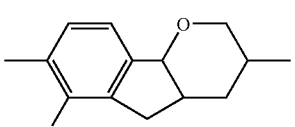 | | | C₅H₁₁ |
| Cl | 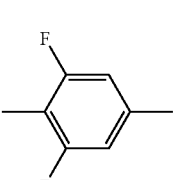 | OCF₂ | 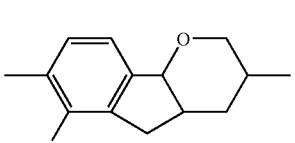 | | | CH₂=CH— |
| CF₃ | 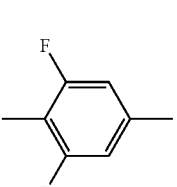 | OCF₂ | 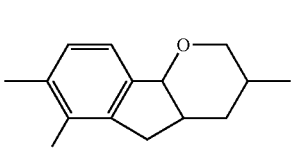 | | | C₃H₇ |

-continued

| R¹ | A¹ | Z¹ | Tricyclic radical | Z³ | A³ | R² |
|---|---|---|---|---|---|---|
| CF₃ | 3,5-difluorophenyl | OCF₂ | fluoro-chromane-indane tricyclic | | | C₅H₁₁ |
| CF₃ | 3,5-difluorophenyl | OCF₂ | fluoro-chromane-indane tricyclic | | | CH₂=CH— |
| OCF₂H | 3,5-difluorophenyl | OCF₂ | fluoro-chromane-indane tricyclic | | | C₃H₇ |
| OCF₂H | 3,5-difluorophenyl | OCF₂ | fluoro-chromane-indane tricyclic | | | C₅H₁₁ |
| OCF₂H | 3,5-difluorophenyl | OCF₂ | fluoro-chromane-indane tricyclic | | | CH₂=CH— |
| OCF₃ | 3,5-difluorophenyl | OCF₂ | fluoro-chromane-indane tricyclic | | | C₃H₇ |
| OCF₃ | 3,5-difluorophenyl | OCF₂ | fluoro-chromane-indane tricyclic | | | C₅H₁₁ |
| OCF₃ | 3,5-difluorophenyl | OCF₂ | fluoro-chromane-indane tricyclic | | | CH₂=CH— |

-continued
| R¹ | A¹ | Z¹ | Tricyclic radical | Z³ | A³ | R² |
|---|---|---|---|---|---|---|
| CN | 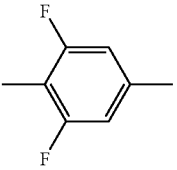 | OCF₂ | 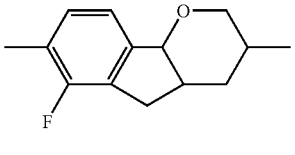 | | | C₃H₇ |
| CN | 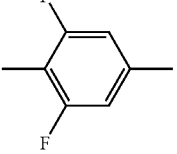 | OCF₂ | 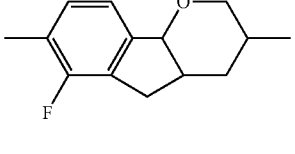 | | | C₅H₁₁ |
| CN | 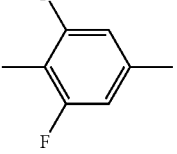 | OCF₂ | 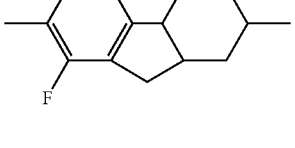 | | | CH₂=CH— |
| F | 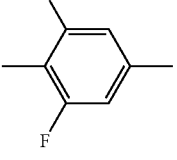 | OCF₂ | 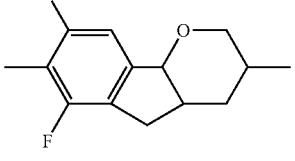 | | | C₃H₇ |
| F | 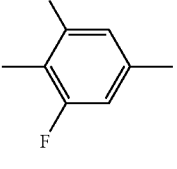 | OCF₂ | 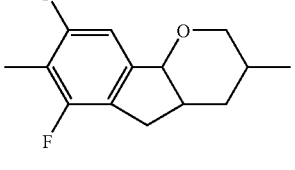 | | | C₅H₁₁ |
| F | 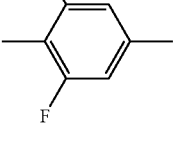 | OCF₂ | 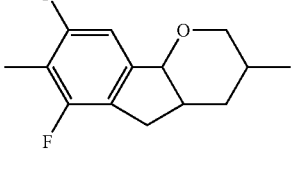 | | | CH₂=CH— |
| Cl | 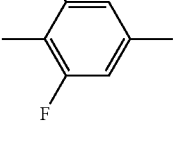 | OCF₂ | 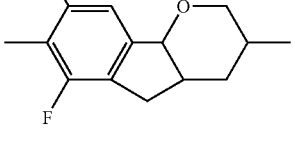 | | | C₃H₇ |
| Cl | 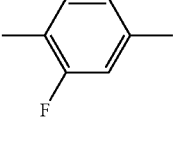 | OCF₂ | 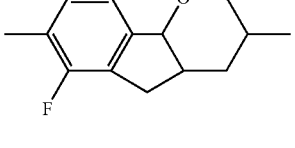 | | | C₅H₁₁ |

-continued
| R¹ | A¹ | Z¹ | Tricyclic radical | Z³ | A³ | R² |
|---|---|---|---|---|---|---|
| Cl | 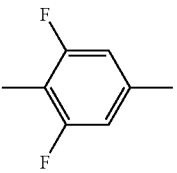 | OCF₂ | 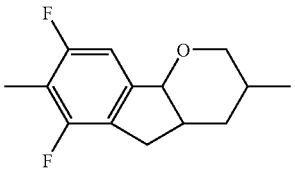 | | | CH₂=CH— |
| CF₃ | 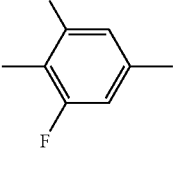 | OCF₂ | 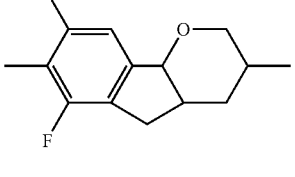 | | | C₃H₇ |
| CF₃ | 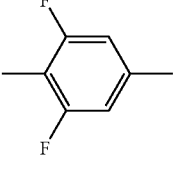 | OCF₂ | 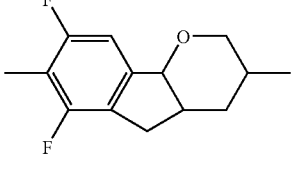 | | | C₅H₁₁ |
| CF₃ | 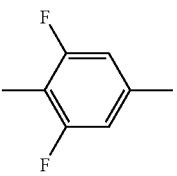 | OCF₂ | 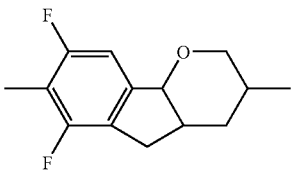 | | | CH₂=CH— |
| OCF₂H | 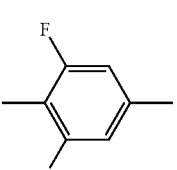 | OCF₂ | 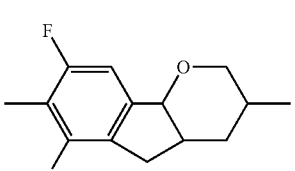 | | | C₃H₇ |
| OCF₂H | 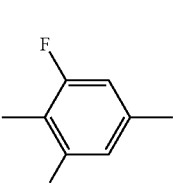 | OCF₂ | 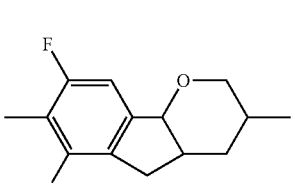 | | | C₅H₁₁ |
| OCF₂H | 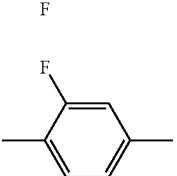 | OCF₂ | 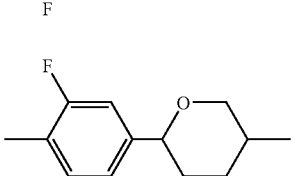 | | | CH₂=CH— |
| OCF₃ | 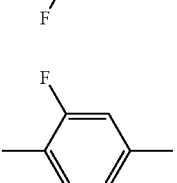 | OCF₂ | 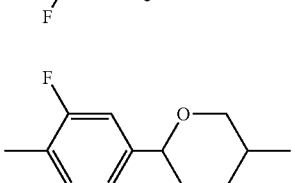 | | | C₃H₇ |

-continued

| R¹ | A¹ | Z¹ | Tricyclic radical | Z³ | A³ | R² |
|---|---|---|---|---|---|---|
| OCF₃ | (2,6-difluorophenylene) | OCF₂ | (fluorinated tricyclic chromane) | | | C₅H₁₁ |
| OCF₃ | (2,6-difluorophenylene) | OCF₂ | (fluorinated tricyclic chromane) | | | CH₂=CH— |
| CN | (2,6-difluorophenylene) | OCF₂ | (fluorinated tricyclic chromane) | | | C₃H₇ |
| CN | (2,6-difluorophenylene) | OCF₂ | (fluorinated tricyclic chromane) | | | C₅H₁₁ |
| CN | (2,6-difluorophenylene) | OCF₂ | (fluorinated tricyclic chromane) | | | CH₂=CH— |
| F | (2-fluorophenylene) | OCF₂ | (tricyclic chromane) | | | C₃H₇ |
| F | (2-fluorophenylene) | OCF₂ | (tricyclic chromane) | | | C₅H₁₁ |
| F | (2-fluorophenylene) | OCF₂ | (tricyclic chromane) | | | CH₂=CH— |
| Cl | (2-fluorophenylene) | OCF₂ | (tricyclic chromane) | | | C₃H₇ |

-continued
| R¹ | A¹ | Z¹ | Tricyclic radical | Z³ | A³ | R² |
|---|---|---|---|---|---|---|
| Cl | 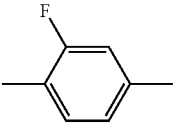 | OCF₂ | 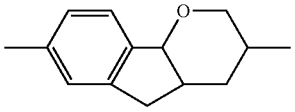 | | | C₅H₁₁ |
| Cl | 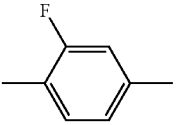 | OCF₂ | 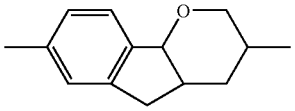 | | | CH₂=CH— |
| CF₃ | 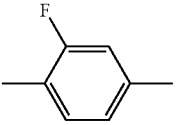 | OCF₂ | 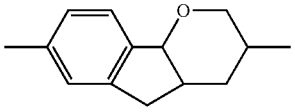 | | | C₃H₇ |
| CF₃ | 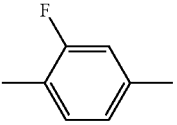 | OCF₂ | 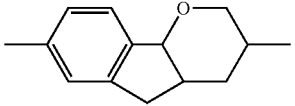 | | | C₅H₁₁ |
| CF₃ | 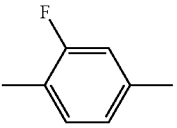 | OCF₂ | 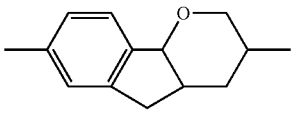 | | | CH₂=CH— |
| OCF₂H | 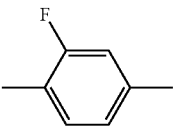 | OCF₂ | 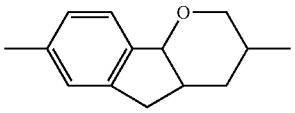 | | | C₃H₇ |
| OCF₂H | 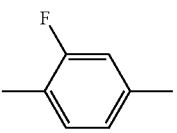 | OCF₂ | 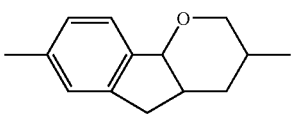 | | | C₅H₁₁ |
| OCF₂H | 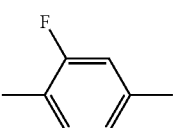 | OCF₂ | 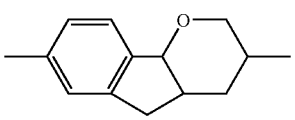 | | | CH₂=CH— |
| OCF₃ | 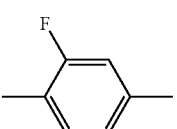 | OCF₂ | 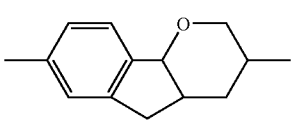 | | | C₃H₇ |
| OCF₃ | 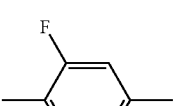 | OCF₂ | 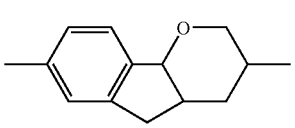 | | | C₅H₁₁ |
| OCF₃ | 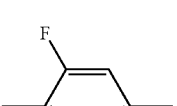 | OCF₂ | 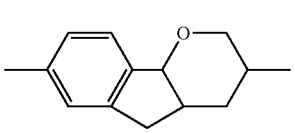 | | | CH₂=CH— |

-continued

| R¹ | A¹ | Z¹ | Tricyclic radical | Z³ | A³ | R² |
|---|---|---|---|---|---|---|
| CN | F-phenyl | OCF₂ | benzopyran-indane | | | C₃H₇ |
| CN | F-phenyl | OCF₂ | benzopyran-indane | | | C₅H₁₁ |
| CN | F-phenyl | OCF₂ | benzopyran-indane | | | CH₂=CH— |
| F | F-phenyl | OCF₂ | F-benzopyran-indane | | | C₃H₇ |
| F | F-phenyl | OCF₂ | F-benzopyran-indane | | | C₅H₁₁ |
| F | F-phenyl | OCF₂ | F-benzopyran-indane | | | CH₂=CH— |
| Cl | F-phenyl | OCF₂ | F-benzopyran-indane | | | C₃H₇ |
| Cl | F-phenyl | OCF₂ | F-benzopyran-indane | | | C₅H₁₁ |
| Cl | F-phenyl | OCF₂ | F-benzopyran-indane | | | CH₂=CH— |
| CF₃ | F-phenyl | OCF₂ | F-benzopyran-indane | | | C₃H₇ |

-continued

| R¹ | A¹ | Z¹ | Tricyclic radical | Z³ | A³ | R² |
|---|---|---|---|---|---|---|
| CF₃ | 2-F-phenyl | OCF₂ | F-substituted tricyclic | | | C₅H₁₁ |
| CF₃ | 2-F-phenyl | OCF₂ | F-substituted tricyclic | | | CH₂=CH— |
| OCF₂H | 2-F-phenyl | OCF₂ | F-substituted tricyclic | | | C₃H₇ |
| OCF₂H | 2-F-phenyl | OCF₂ | F-substituted tricyclic | | | C₅H₁₁ |
| OCF₂H | 2-F-phenyl | OCF₂ | F-substituted tricyclic | | | CH₂=CH— |
| OCF₃ | 2-F-phenyl | OCF₂ | F-substituted tricyclic | | | C₃H₇ |
| OCF₃ | 2-F-phenyl | OCF₂ | F-substituted tricyclic | | | C₅H₁₁ |
| OCF₃ | 2-F-phenyl | OCF₂ | F-substituted tricyclic | | | CH₂=CH— |
| CN | 2-F-phenyl | OCF₂ | F-substituted tricyclic | | | C₃H₇ |

-continued
| R¹ | A¹ | Z¹ | Tricyclic radical | Z³ | A³ | R² |
|---|---|---|---|---|---|---|
| CN | 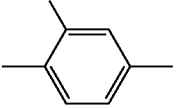 | OCF₂ | 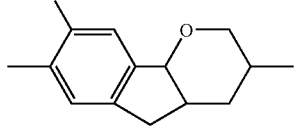 | | | C₅H₁₁ |
| CN | 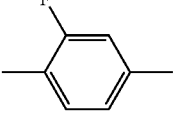 | OCF₂ | 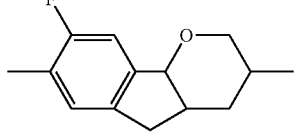 | | | CH₂=CH— |
| F | 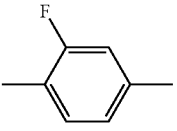 | OCF₂ | 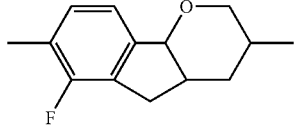 | | | C₃H₇ |
| F | 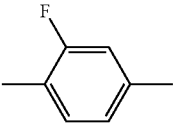 | OCF₂ | 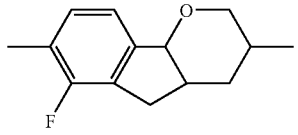 | | | C₅H₁₁ |
| F | 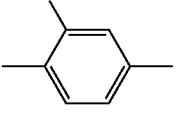 | OCF₂ | 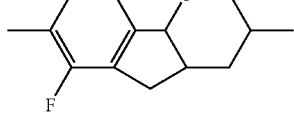 | | | CH₂=CH— |
| Cl | 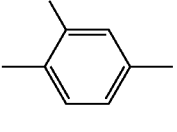 | OCF₂ | 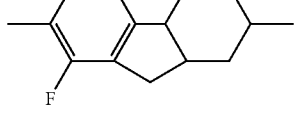 | | | C₃H₇ |
| Cl | 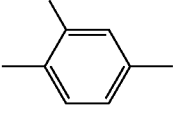 | OCF₂ | 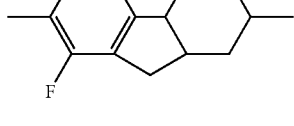 | | | C₅H₁₁ |
| Cl | 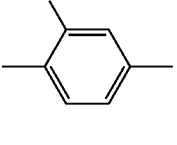 | OCF₂ | 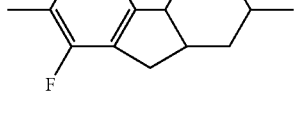 | | | CH₂=CH— |
| CF₃ | 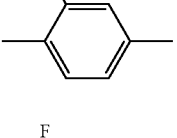 | OCF₂ | 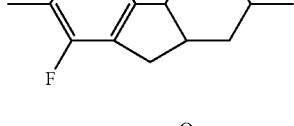 | | | C₃H₇ |
| CF₃ | 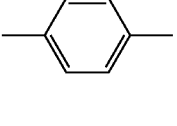 | OCF₂ | 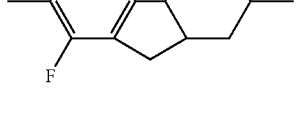 | | | C₅H₁₁ |

-continued

| R¹ | A¹ | Z¹ | Tricyclic radical | Z³ | A³ | R² |
|---|---|---|---|---|---|---|
| CF₃ | (2-F phenyl) | OCF₂ | (tricyclic, F) | | | CH₂=CH— |
| OCF₂H | (2-F phenyl) | OCF₂ | (tricyclic, F) | | | C₃H₇ |
| OCF₂H | (2-F phenyl) | OCF₂ | (tricyclic, F) | | | C₅H₁₁ |
| OCF₂H | (2-F phenyl) | OCF₂ | (tricyclic, F) | | | CH₂=CH— |
| OCF₃ | (2-F phenyl) | OCF₂ | (tricyclic, F) | | | C₃H₇ |
| OCF₃ | (2-F phenyl) | OCF₂ | (tricyclic, F) | | | C₅H₁₁ |
| OCF₃ | (2-F phenyl) | OCF₂ | (tricyclic, F) | | | CH₂=CH— |
| CN | (2-F phenyl) | OCF₂ | (tricyclic, F) | | | C₃H₇ |
| CN | (2-F phenyl) | OCF₂ | (tricyclic, F) | | | C₅H₁₁ |
| CN | (2-F phenyl) | OCF₂ | (tricyclic, F) | | | CH₂=CH— |

-continued
| R¹ | A¹ | Z¹ | Tricyclic radical | Z³ | A³ | R² |
|---|---|---|---|---|---|---|
| F | 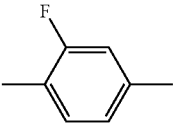 | OCF₂ | 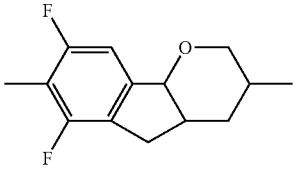 | | | C₃H₇ |
| F | 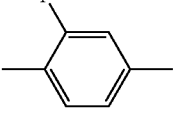 | OCF₂ | 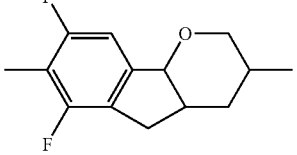 | | | C₅H₁₁ |
| F | 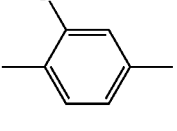 | OCF₂ | 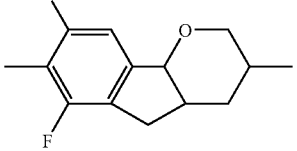 | | | CH₂=CH— |
| Cl | 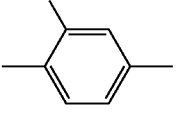 | OCF₂ | 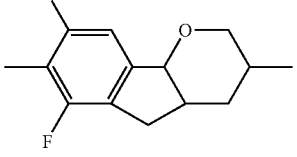 | | | C₃H₇ |
| Cl | 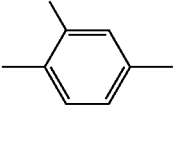 | OCF₂ | 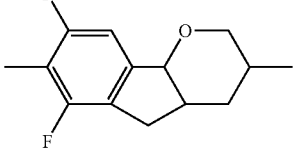 | | | C₅H₁₁ |
| Cl | 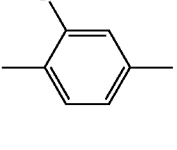 | OCF₂ | 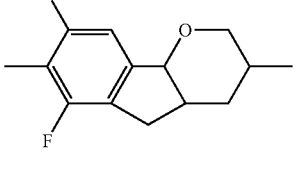 | | | CH₂=CH— |
| CF₃ | 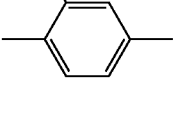 | OCF₂ | 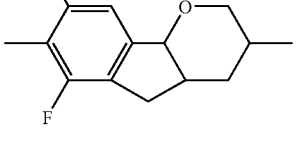 | | | C₃H₇ |
| CF₃ | 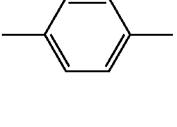 | OCF₂ | 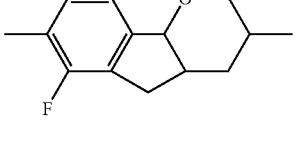 | | | C₅H₁₁ |

-continued

| R¹ | A¹ | Z¹ | Tricyclic radical | Z³ | A³ | R² |
|---|---|---|---|---|---|---|
| CF₃ | 2-F-phenylene | OCF₂ | difluoro-tricyclic | | | CH₂=CH— |
| OCF₂H | 2-F-phenylene | OCF₂ | difluoro-tricyclic | | | C₃H₇ |
| OCF₂H | 2-F-phenylene | OCF₂ | difluoro-tricyclic | | | C₅H₁₁ |
| OCF₂H | 2-F-phenylene | OCF₂ | difluoro-tricyclic | | | CH₂=CH— |
| OCF₃ | 2-F-phenylene | OCF₂ | difluoro-tricyclic | | | C₃H₇ |
| OCF₃ | 2-F-phenylene | OCF₂ | difluoro-tricyclic | | | C₅H₁₁ |
| OCF₃ | 2-F-phenylene | OCF₂ | difluoro-tricyclic | | | CH₂=CH— |
| CN | 2-F-phenylene | OCF₂ | difluoro-tricyclic | | | C₃H₇ |

-continued

| R¹ | A¹ | Z¹ | Tricyclic radical | Z³ | A³ | R² |
|---|---|---|---|---|---|---|
| CN | (2-F phenylene) | OCF₂ | (difluoro tricyclic) | | | C₅H₁₁ |
| CN | (2-F phenylene) | OCF₂ | (difluoro tricyclic) | | | CH₂=CH— |
| F | | | (tricyclic) | | (cyclohexylene) | C₃H₇ |
| F | | | (tricyclic) | | (cyclohexylene) | C₅H₁₁ |
| F | | | (tricyclic) | | (cyclohexylene) | CH₂=CH— |
| Cl | | | (tricyclic) | | (cyclohexylene) | C₃H₇ |
| Cl | | | (tricyclic) | | (cyclohexylene) | C₅H₁₁ |
| Cl | | | (tricyclic) | | (cyclohexylene) | CH₂=CH— |
| CF₃ | | | (tricyclic) | | (cyclohexylene) | C₃H₇ |
| CF₃ | | | (tricyclic) | | (cyclohexylene) | C₅H₁₁ |
| CF₃ | | | (tricyclic) | | (cyclohexylene) | CH₂=CH— |

-continued
| R¹ | A¹ | Z¹ | Tricyclic radical | Z³ | A³ | R² |
|---|---|---|---|---|---|---|
| OCF₂H | | | 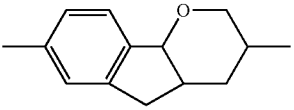 | |  | C₃H₇ |
| OCF₂H | | | 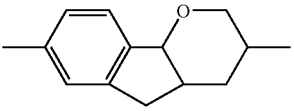 | |  | C₅H₁₁ |
| OCF₂H | | | 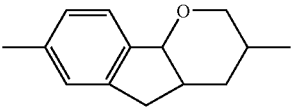 | | 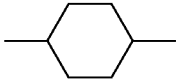 | CH₂=CH— |
| OCF₃ | | | 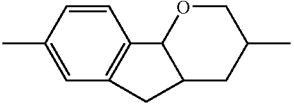 | |  | C₃H₇ |
| OCF₃ | | | 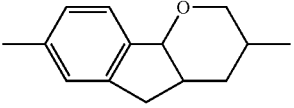 | |  | C₅H₁₁ |
| OCF₃ | | | 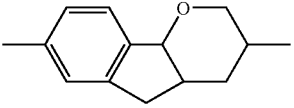 | |  | CH₂=CH— |
| CN | | | 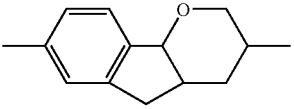 | | 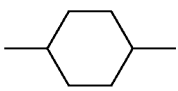 | C₃H₇ |
| CN | | | 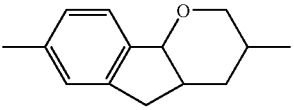 | |  | C₅H₁₁ |
| CN | | | 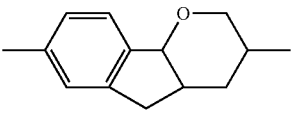 | | 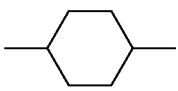 | CH₂=CH— |
| F | | | 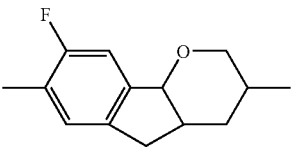 | | 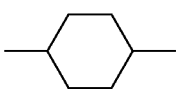 | C₃H₇ |
| F | | | 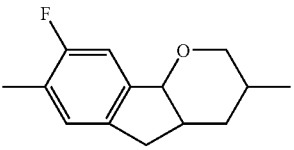 | | 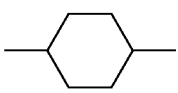 | C₅H₁₁ |

-continued

| R¹ | A¹ | Z¹ | Tricyclic radical | Z³ | A³ | R² |
|---|---|---|---|---|---|---|
| F | | | (tricyclic with F) | | (cyclohexyl) | CH₂=CH— |
| Cl | | | (tricyclic with F) | | (cyclohexyl) | C₃H₇ |
| Cl | | | (tricyclic with F) | | (cyclohexyl) | C₅H₁₁ |
| Cl | | | (tricyclic with F) | | (cyclohexyl) | CH₂=CH— |
| CF₃ | | | (tricyclic with F) | | (cyclohexyl) | C₃H₇ |
| CF₃ | | | (tricyclic with F) | | (cyclohexyl) | C₅H₁₁ |
| CF₃ | | | (tricyclic with F) | | (cyclohexyl) | CH₂=CH— |
| OCF₂H | | | (tricyclic with F) | | (cyclohexyl) | C₃H₇ |
| OCF₂H | | | (tricyclic with F) | | (cyclohexyl) | C₅H₁₁ |

-continued

| R¹ | A¹ | Z¹ | Tricyclic radical | Z³ | A³ | R² |
|---|---|---|---|---|---|---|
| OCF₂H | | | (tricyclic with F) | | (cyclohexyl) | CH₂=CH— |
| OCF₃ | | | (tricyclic with F) | | (cyclohexyl) | C₃H₇ |
| OCF₃ | | | (tricyclic with F) | | (cyclohexyl) | C₅H₁₁ |
| OCF₃ | | | (tricyclic with F) | | (cyclohexyl) | CH₂=CH— |
| CN | | | (tricyclic with F) | | (cyclohexyl) | C₃H₇ |
| CN | | | (tricyclic with F) | | (cyclohexyl) | C₅H₁₁ |
| CN | | | (tricyclic with F) | | (cyclohexyl) | CH₂=CH— |
| F | | | (tricyclic with F) | | (cyclohexyl) | C₃H₇ |
| F | | | (tricyclic with F) | | (cyclohexyl) | C₅H₁₁ |
| F | | | (tricyclic with F) | | (cyclohexyl) | CH₂=CH— |

-continued

| R¹ | A¹ | Z¹ | Tricyclic radical | Z³ | A³ | R² |
|---|---|---|---|---|---|---|
| Cl | | | (tricyclic with F) | | (cyclohexyl) | C₃H₇ |
| Cl | | | (tricyclic with F) | | (cyclohexyl) | C₅H₁₁ |
| Cl | | | (tricyclic with F) | | (cyclohexyl) | CH₂=CH— |
| CF₃ | | | (tricyclic with F) | | (cyclohexyl) | C₃H₇ |
| CF₃ | | | (tricyclic with F) | | (cyclohexyl) | C₅H₁₁ |
| CF₃ | | | (tricyclic with F) | | (cyclohexyl) | CH₂=CH— |
| OCF₂H | | | (tricyclic with F) | | (cyclohexyl) | C₃H₇ |
| OCF₂H | | | (tricyclic with F) | | (cyclohexyl) | C₅H₁₁ |
| OCF₂H | | | (tricyclic with F) | | (cyclohexyl) | CH₂=CH— |
| OCF₃ | | | (tricyclic with F) | | (cyclohexyl) | C₃H₇ |

-continued

| R¹ | A¹ | Z¹ | Tricyclic radical | Z³ | A³ | R² |
|---|---|---|---|---|---|---|
| OCF₃ | | | | | | C₅H₁₁ |
| OCF₃ | | | | | | CH₂=CH— |
| CN | | | | | | C₃H₇ |
| CN | | | | | | C₅H₁₁ |
| CN | | | | | | CH₂=CH— |
| F | | | | | | C₃H₇ |
| F | | | | | | C₅H₁₁ |
| F | | | | | | CH₂=CH— |
| Cl | | | | | | C₃H₇ |

-continued

| R¹ | A¹ | Z¹ | Tricyclic radical | Z³ | A³ | R² |
|---|---|---|---|---|---|---|
| Cl | | | | | (cyclohexyl) | C₅H₁₁ |
| Cl | | | | | (cyclohexyl) | CH₂=CH— |
| CF₃ | | | | | (cyclohexyl) | C₃H₇ |
| CF₃ | | | | | (cyclohexyl) | C₅H₁₁ |
| CF₃ | | | | | (cyclohexyl) | CH₂=CH— |
| OCF₂H | | | | | (cyclohexyl) | C₃H₇ |
| OCF₂H | | | | | (cyclohexyl) | C₅H₁₁ |
| OCF₂H | | | | | (cyclohexyl) | CH₂=CH— |

-continued

| R¹ | A¹ | Z¹ | Tricyclic radical | Z³ | A³ | R² |
|---|---|---|---|---|---|---|
| OCF₃ | | | (tricyclic with 3 F substituents and O) | | cyclohexyl | C₃H₇ |
| OCF₃ | | | (tricyclic with 3 F substituents and O) | | cyclohexyl | C₅H₁₁ |
| OCF₃ | | | (tricyclic with 3 F substituents and O) | | cyclohexyl | CH₂=CH— |
| CN | | | (tricyclic with 3 F substituents and O) | | cyclohexyl | C₃H₇ |
| CN | | | (tricyclic with 3 F substituents and O) | | cyclohexyl | C₅H₁₁ |
| CN | | | (tricyclic with 3 F substituents and O) | | cyclohexyl | CH₂=CH— |
| F | | | (tricyclic with O) | | tetrahydropyranyl | C₃H₇ |
| F | | | (tricyclic with O) | | tetrahydropyranyl | C₅H₁₁ |
| F | | | (tricyclic with O) | | tetrahydropyranyl | CH₂=CH— |
| Cl | | | (tricyclic with O) | | tetrahydropyranyl | C₃H₇ |

-continued
| R¹ | A¹ | Z¹ | Tricyclic radical | Z³ | A³ | R² |
|---|---|---|---|---|---|---|
| Cl | | | 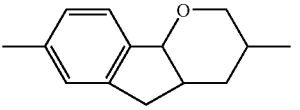 | | 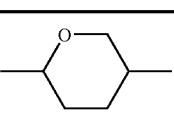 | $C_5H_{11}$ |
| Cl | | | 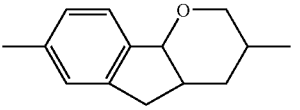 | | 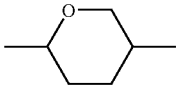 | $CH_2=CH-$ |
| $CF_3$ | | | 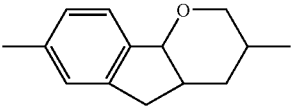 | | 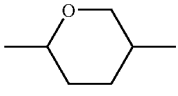 | $C_3H_7$ |
| $CF_3$ | | | 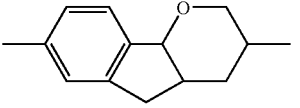 | | 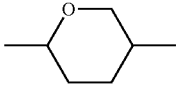 | $C_5H_{11}$ |
| $CF_3$ | | | 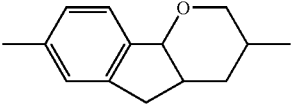 | | 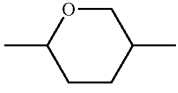 | $CH_2=CH-$ |
| $OCF_2H$ | | | 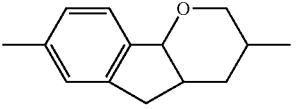 | | 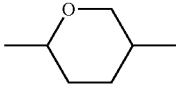 | $C_3H_7$ |
| $OCF_2H$ | | | 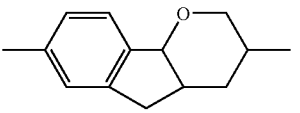 | | 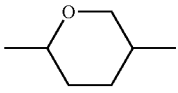 | $C_5H_{11}$ |
| $OCF_2H$ | | | 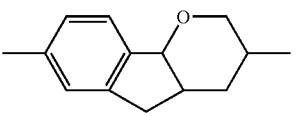 | | 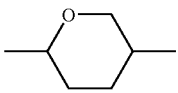 | $CH_2=CH-$ |
| $OCF_3$ | | | 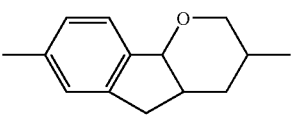 | | 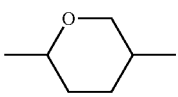 | $C_3H_7$ |
| $OCF_3$ | | | 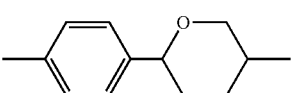 | | 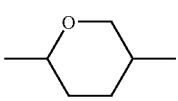 | $C_5H_{11}$ |
| $OCF_3$ | | | 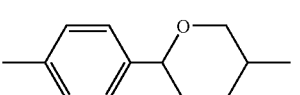 | | 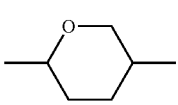 | $CH_2=CH-$ |
| CN | | | 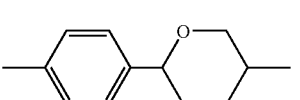 | | 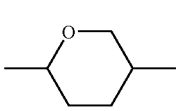 | $C_3H_7$ |

-continued

| R¹ | A¹ | Z¹ | Tricyclic radical | Z³ | A³ | R² |
|---|---|---|---|---|---|---|
| CN | | | | | | C₅H₁₁ |
| CN | | | | | | CH₂=CH— |
| F | | | | | | C₃H₇ |
| F | | | | | | C₅H₁₁ |
| F | | | | | | CH₂=CH— |
| Cl | | | | | | C₃H₇ |
| Cl | | | | | | C₅H₁₁ |
| Cl | | | | | | CH₂=CH— |
| CF₃ | | | | | | C₃H₇ |
| CF₃ | | | | | | C₅H₁₁ |

-continued
| R¹ | A¹ | Z¹ | Tricyclic radical | Z³ | A³ | R² |
|---|---|---|---|---|---|---|
| CF₃ | | | 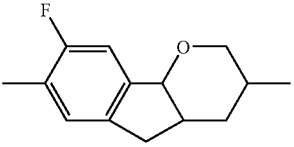 | | 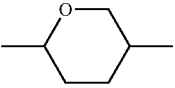 | CH₂=CH— |
| OCF₂H | | | 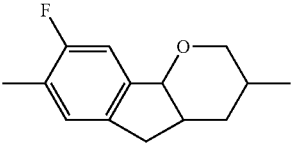 | | 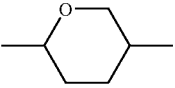 | C₃H₇ |
| OCF₂H | | | 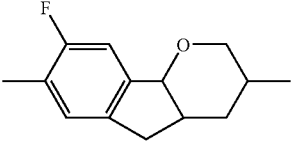 | | 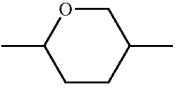 | C₅H₁₁ |
| OCF₂H | | | 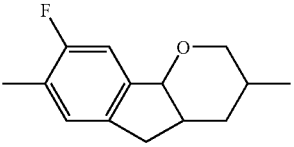 | |  | CH₂=CH— |
| OCF₃ | | | 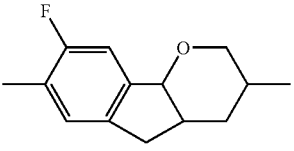 | |  | C₃H₇ |
| OCF₃ | | | 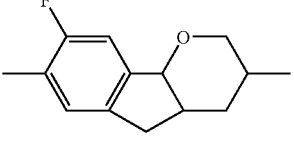 | |  | C₅H₁₁ |
| OCF₃ | | | 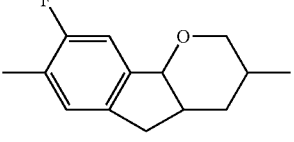 | |  | CH₂=CH— |
| CN | | | 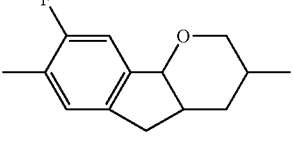 | | 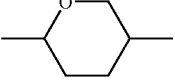 | C₃H₇ |
| CN | | | 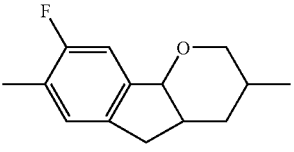 | |  | C₅H₁₁ |

| R¹ | A¹ | Z¹ | Tricyclic radical | Z³ | A³ | R² |
|---|---|---|---|---|---|---|
| CN | | | 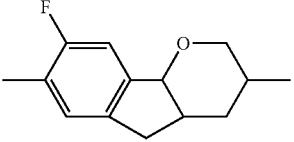 | | 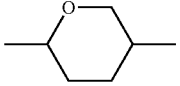 | CH₂=CH— |
| F | | | 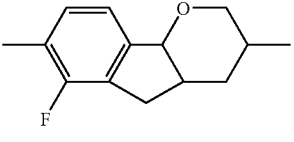 | |  | C₃H₇ |
| F | | | 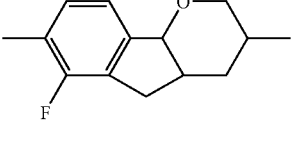 | | 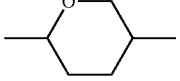 | C₅H₁₁ |
| F | | | 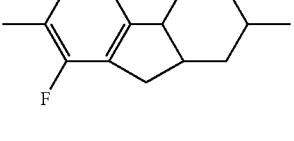 | |  | CH₂=CH— |
| Cl | | | 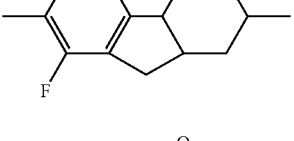 | | 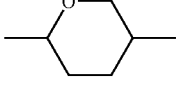 | C₃H₇ |
| Cl | | | 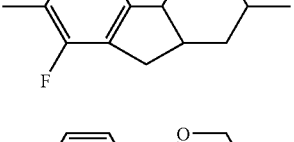 | | 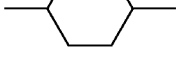 | C₅H₁₁ |
| Cl | | | 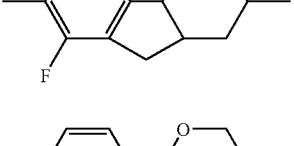 | | 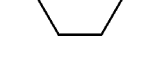 | CH₂=CH— |
| CF₃ | | | 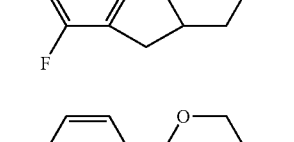 | | 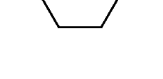 | C₃H₇ |
| CF₃ | | | 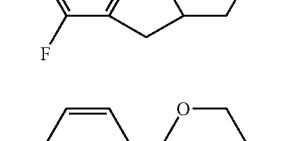 | | 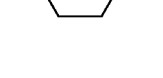 | C₅H₁₁ |
| CF₃ | | |  | |  | CH₂=CH— |

| R¹ | A¹ | Z¹ | Tricyclic radical | Z³ | A³ | R² |
|---|---|---|---|---|---|---|
| OCF₂H | | | tricyclic with F | | pyran | C₃H₇ |
| OCF₂H | | | tricyclic with F | | pyran | C₅H₁₁ |
| OCF₂H | | | tricyclic with F | | pyran | CH₂=CH— |
| OCF₃ | | | tricyclic with F | | pyran | C₃H₇ |
| OCF₃ | | | tricyclic with F | | pyran | C₅H₁₁ |
| OCF₃ | | | tricyclic with F | | pyran | CH₂=CH— |
| CN | | | tricyclic with F | | pyran | C₃H₇ |
| CN | | | tricyclic with F | | pyran | C₅H₁₁ |
| CN | | | tricyclic with F | | pyran | CH₂=CH— |
| F | | | tricyclic with 2F | | pyran | C₃H₇ |

-continued
| R¹ | A¹ | Z¹ | Tricyclic radical | Z³ | A³ | R² |
|----|----|----|-------------------|----|----|----|
| F | | | 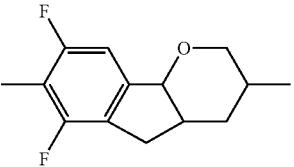 | |  | $C_5H_{11}$ |
| F | | | 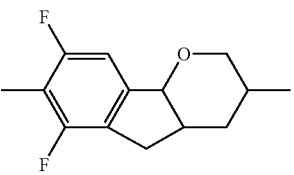 | | 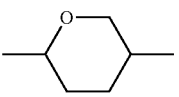 | $CH_2=CH-$ |
| Cl | | | 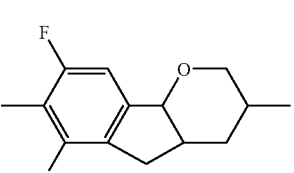 | | 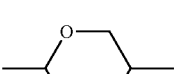 | $C_3H_7$ |
| Cl | | | 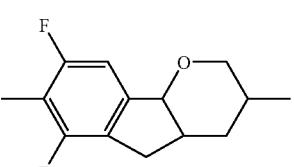 | | 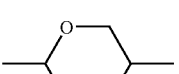 | $C_5H_{11}$ |
| Cl | | | 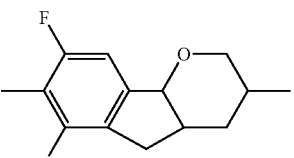 | | 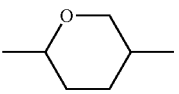 | $CH_2=CH-$ |
| $CF_3$ | | | 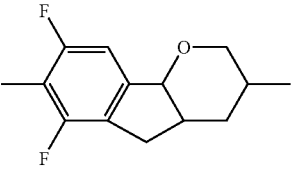 | | 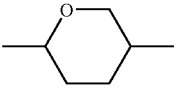 | $C_3H_7$ |
| $CF_3$ | | | 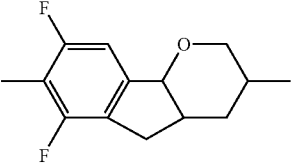 | | 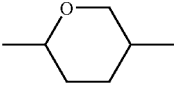 | $C_5H_{11}$ |
| $CF_3$ | | | 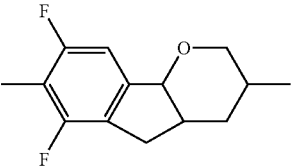 | |  | $CH_2=CH-$ |

-continued

| R$^1$ | A$^1$ | Z$^1$ | Tricyclic radical | Z$^3$ | A$^3$ | R$^2$ |
|---|---|---|---|---|---|---|
| OCF$_2$H | | | difluoro-tricyclic | | tetrahydropyran | C$_3$H$_7$ |
| OCF$_2$H | | | difluoro-tricyclic | | tetrahydropyran | C$_5$H$_{11}$ |
| OCF$_2$H | | | difluoro-tricyclic | | tetrahydropyran | CH$_2$=CH— |
| OCF$_3$ | | | difluoro-tricyclic | | tetrahydropyran | C$_3$H$_7$ |
| OCF$_3$ | | | difluoro-tricyclic | | tetrahydropyran | C$_5$H$_{11}$ |
| OCF$_3$ | | | difluoro-tricyclic | | tetrahydropyran | CH$_2$=CH— |
| CN | | | difluoro-tricyclic | | tetrahydropyran | C$_3$H$_7$ |
| CN | | | difluoro-tricyclic | | tetrahydropyran | C$_5$H$_{11}$ |

-continued

| $R^1$ | $A^1$ | $Z^1$ | Tricyclic radical | $Z^3$ | $A^3$ | $R^2$ |
|---|---|---|---|---|---|---|
| CN | | | 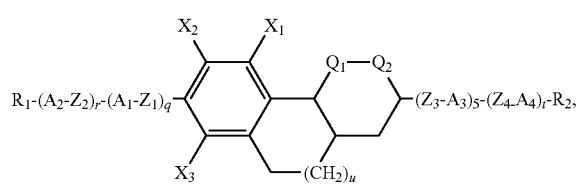 | | | $CH_2=CH-$ |

MIXTURE EXAMPLE 1

A mixture consisting of

10% [structure with Cl]
15% [structure with Cl, F, F, O-CF2, C5H11]
35% [structure with CH3O, F, F, C3H7]
30% [structure with C2H5, F, CH2CH2, C5H11]
10% [structure with C3H7, C2H5, F, F, O, CF2]

is nematic at room temperature and has a DAP threshold of <5 V. It is suitable for VA-type electro-optical display elements.

MIXTURE EXAMPLE 2

A mixture of

10% [structure with Cl]
20% [structure with F, F, F, C3H7]

15% [structure with F, F, F, F, F, C2H5]
25% [structure with F, F, F, CH2CH2, C3H7]
20% [structure with C2H5, F, CH2CH2, C5H11]
5% [structure with C3H7, C5H11]
5% [structure with C3H7, F, C3H7]

is nematic at room temperature and has a Frederiks threshold of <5 volts. It is suitable for IPS-type electro-optical display elements.

The invention claimed is:
1. A tricyclic aromatic compound of formula I:

(I)

$R_1-(A_2-Z_2)_r-(A_1-Z_1)_q-$ [tricyclic core with $X_1, X_2, X_3, Q_1-Q_2, (CH_2)_u$] $-(Z_3-A_3)_5-(Z_4-A_4)_t-R_2$, in which
$A_1$, $A_2$, $A_3$, $A_4$ are each, independently of one another, a 1,4-cyclohexylene, 1,4-cyclohexenylene or 1,4-cyclohexadienylene radical which is unsubstituted or substituted by one to four F atoms and in which, in each case independently of one another, one or two $CH_2$ groups may be replaced by —O— or —S— in such a way that heteroatoms are not linked directly to one another, a 1,4-phenylene radical, which may be substituted by one or two fluorine or chlorine atoms and in which, in addition, one or two CH groups may be replaced by N, or a 1,4-bicyclo[2.2.2]octylene radical or 2,6-spiro[3.3]heptylene radical,
$Q_1-Q_2$ denotes O—$CH_2$ or O—$CF_2$,
$R_1$, $R_2$ are each, independently of one another, an alkyl radical having 1 to 12 C atoms which is unsubstituted or at least monosubstituted by halogen and in which one or more non-adjacent CH$_2$ groups may each, independently of one another, be replaced by —O—, —S— or —CO—, two adjacent CH$_2$ groups may each be replaced by —CH=CH—, —CF=CF—, —COO—, —OOC—, —C≡C— or a 1,2-cyclopropanylene radical or three adjacent CH$_2$ groups may be replaced by a 1,3-cyclobutanylene radical, or denote F, Cl, —OCF$_3$, —OCHF$_2$, —CN, —NCS or H, with the proviso that either only R$_1$ or only R$_2$ may be H, X$_1$, X$_2$ X$_3$ each, independently of one another, denote H, F or Cl, Z$_1$, Z$_2$, Z$_3$, Z$_4$ are each, independently of one another, a single bond, —CH$_2$CH$_2$—, —CH$_2$O—, —OCH$_2$—, —CH$_2$CF$_2$—, —CF$_2$CH$_2$—, —CF$_2$O—, —OCF$_2$—, —COO—, —OOC—, —CH=CH—, —CF=CF—, —C≡C—, and q, r, s, t, u are each, independently of one another, 0 or 1.

2. The tricyclic aromatic compound according to claim 1, wherein Q$_1$-Q$_2$ is O—CH$_2$.

3. The tricyclic aromatic compound according to claim 1, wherein Q$_1$-Q$_2$ is O—CF$_2$.

4. The tricyclic aromatic compound according to claim 1, wherein said compound is of the formula

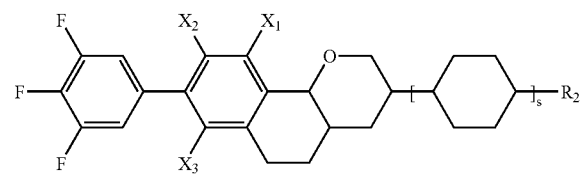

in which R$_2$, s, X$_1$, X$_2$ and X$_3$ have the meanings indicated.

5. The tricyclic aromatic compound according to claim 1, wherein said compound is of the formula

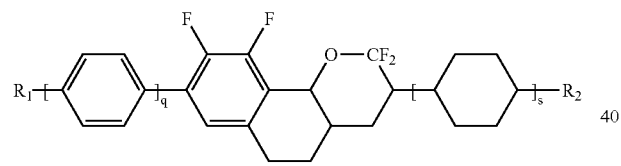

in which R$_1$, R$_2$, q and s have the meanings indicated.

6. A method of generating an electro-optical effect comprising applying an electric field to electrodes between which a liquid-crystalline media containing a compound according to claim 1 is located.

7. A liquid-crystalline medium having at least two liquid-crystalline components, wherein said medium comprises at least one compound according to claim 1.

8. An electro-optical display element comprising electrodes and a liquid-crystalline medium located between the electrodes, wherein said display element, it contains a liquid-crystalline medium according to claim 7.

9. A process for the preparation of a compound of formula I according to claim 1, in which q denotes 1 and Z denotes a single bond, said process comprising:

in one synthesis step, reacting a compound of formula II

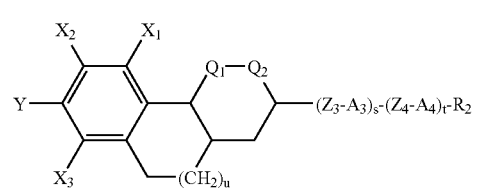

in which Y denotes chlorine or bromine,. and X$_1$, X$_2$, X$_3$, Q$_1$, Q$_2$, Z$_3$, Z$_4$, A$_3$, A$_4$, R$_2$, s, t, and u are defined as in claim 1, with a boronic acid of formula III

R$_1$-(A$_2$-Z$_2$)$_r$-A$_1$-B(OH)$_2$    (III)

in which A$_1$ denotes a 1,4-phenylene radical, which may be substituted by one or two fluorine or chlorine atoms, and R$_1$, A$_2$, Z$_2$, and r are defined as in claim 1, by transition-metal catalysis.

10. The tricyclic aromatic compound according to claim 1, wherein said compound is a 1,2,3,4,4a,9,10,10a-octahydrophenanthrene of the formula:

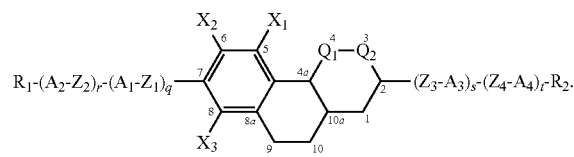

11. The tricyclic aromatic compound according to claim 1, wherein said compound is a 2,3,4,4a,9,9a-hexahydro-1H-fluorene of the formula:

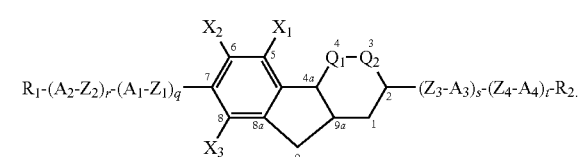

12. The tricyclic aromatic compound according to claim 1, wherein A$_1$, A$_2$, A$_3$, A$_4$ are each, independently of one another, selected from:

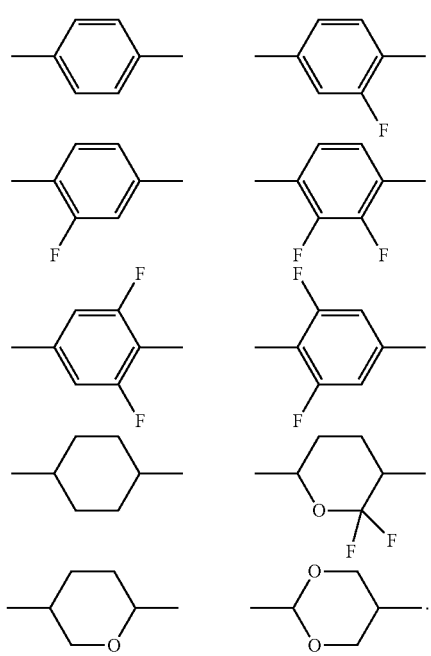

13. The tricyclic aromatic compound according to claim 1, wherein R$_1$ and R$_2$ are each, independently, selected from methyl, ethyl, propyl, butyl, pentyl, hexyl, heptyl, octyl, nonyl, decyl, undecyl, and dodecyl.

14. The tricyclic aromatic compound according to claim 1, wherein $X_1$, $X_2$, and $X_3$ are each, independently of one another, H or F.

15. The tricyclic aromatic compound according to claim 14, wherein one or both of $X_1$ and $X_2$ is F and $X_3$ is hydrogen.

16. The tricyclic aromatic compound according to claim 14, wherein $X_2$ and $X_3$ are each F and $X_1$ is hydrogen.

17. The tricyclic aromatic compound according to claim 1, wherein $Z_1$, $Z_2$, $Z_3$, and $Z_4$ are each, independently of one another, a single bond, —$CH_2CH_2$—, —$OCF_2$— or —$CF_2O$.

18. The tricyclic aromatic compound according to claim 1, wherein the sum of q, r, s and t is equal to 1 or 2.

19. The tricyclic aromatic compound according to claim 1, wherein the sum of q and r is 1 or 2, the sum of s and t is zero or 1, and u is zero or 1.

20. The tricyclic aromatic compound according to claim 1, wherein r is 0,
q is 0 or 1,
s is 0 or 1,
t is 0,
$R_1$ is $CH_3$, $C_3H_7$, $CH_3O$, $C_2H_5O$, F, Cl, $CF_3$, $OCF_2H$, $OCF_3$, or CN,
$A_1$ is absent or is selected from

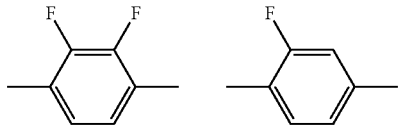

-continued

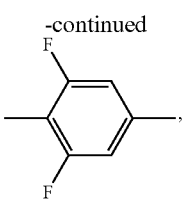

$Z_1$ is absent or is a single bond or $OCF_2$,
$X_1$ is H or F,
$X_2$ is H or F,
$X_3$ is H or F,
$Q_1$-$Q_2$ is O—$CH_2$,
$Z_3$ is absent or is a single bond,
$A_3$ is absent or is selected from

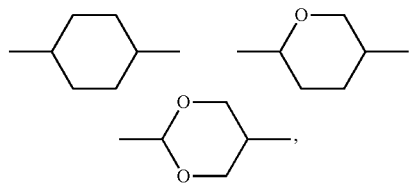

and
$R_2$ is $C_3H_7$, $C_5H_{11}$, or $CH_2$=CH—.

* * * * *

UNITED STATES PATENT AND TRADEMARK OFFICE
CERTIFICATE OF CORRECTION

PATENT NO. : 8,148,551 B2
APPLICATION NO. : 12/162188
DATED : April 3, 2012
INVENTOR(S) : Rudolf Eidenschink et al.

It is certified that error appears in the above-identified patent and that said Letters Patent is hereby corrected as shown below:

Column 291, line 53 (Claim 8), reads: "electrodes, wherein said display element, it contains a liquid-"
It should read: -- electrodes, wherein said display element contains a liquid- --.

Signed and Sealed this
Thirty-first Day of July, 2012

David J. Kappos
*Director of the United States Patent and Trademark Office*